United States Patent
Liu et al.

(10) Patent No.: US 12,470,446 B2
(45) Date of Patent: Nov. 11, 2025

(54) METHOD AND APPARATUS FOR TRANSMITTING PHYSICAL LAYER PROTOCOL DATA UNIT

(71) Applicant: HUAWEI TECHNOLOGIES CO., LTD., Shenzhen (CN)

(72) Inventors: Chenchen Liu, Shenzhen (CN); Xun Yang, Shenzhen (CN); Xiaohui Peng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/631,912

(22) Filed: Apr. 10, 2024

(65) Prior Publication Data
US 2024/0259241 A1  Aug. 1, 2024

Related U.S. Application Data

(63) Continuation of application No. PCT/CN2022/124273, filed on Oct. 10, 2022.

(30) Foreign Application Priority Data

Oct. 13, 2021 (CN) .......................... 202111193199.0
Jul. 8, 2022 (CN) .......................... 202210801569.2

(51) Int. Cl.
*H04L 27/20* (2006.01)
*H04J 3/06* (2006.01)

(52) U.S. Cl.
CPC ........ *H04L 27/2035* (2013.01); *H04J 3/0658* (2013.01)

(58) Field of Classification Search
CPC ..... H04L 27/2035; H04L 69/22; H04J 3/0658
USPC .......................................................... 375/308
See application file for complete search history.

(56) References Cited

U.S. PATENT DOCUMENTS

2009/0116462 A1 * 5/2009 Powell .................... H04L 27/38
                                                   370/328
2017/0126533 A1 * 5/2017 Waheed ................ H04W 24/08

FOREIGN PATENT DOCUMENTS

CN           105589506 A       5/2016

OTHER PUBLICATIONS

V. P. Ipatov, "Ternary Sequences with Ideal Periodic Autocorrelation Properties," 1980 Scripta Publishing Co., total 5 pages (1979).
(Continued)

*Primary Examiner* — Leila Malek
(74) *Attorney, Agent, or Firm* — Leydig, Voit & Mayer, Ltd.

(57) ABSTRACT

A method and an apparatus for transmitting a physical layer protocol data unit (PPDU) are provided. The method includes: generating a synchronization header field based on a first sequence or a third sequence, where a side lobe of a periodic cross-correlation function of the first sequence and a second sequence is a constant value, the first sequence is a binary sequence consisting of 1 and 0, the second sequence is a binary phase shift keying sequence corresponding to the first sequence, a side lobe of a periodic autocorrelation function of the third sequence is a constant value, and the third sequence is a binary phase shift keying sequence consisting of 1 and −1; and sending the PPDU on a target channel, where the PPDU includes the synchronization header field.

14 Claims, 6 Drawing Sheets

(56) References Cited

OTHER PUBLICATIONS

"IEEE Standard for Low-Rate Wireless Networks Amendment 1: Enhanced Ultra Wideband (UWB) Physical Layers (PHYs) and Associated Ranging Techniques," IEEE Std 802.15.4z™—2020, IEEE Computer Society, total 174 pages, Institute of Electrical and Electronics Engineers, New York, New York (Aug. 25, 2020).

"IEEE Standard for Information Technology—Telecommunications and information exchange between systems—Local and metropolitan area networks—Specific requirements; Part 15.4: Wireless Medium Access Control (MAC) and Physical Layer (PHY) Specifications for Low-Rate Wireless Personal Area Networks (WPANs); Amendment 1: Add Alternate PHYs," IEEE Std 802. 15.4a™—2007(Amendment to IEEE Std 802.15.4™—2006), IEEE Computer Society, total 203 pages, Institute of Electrical and Electronics Engineers, New York, New York (Mar. 22, 2007).

Chin et al., "Project: IEEE P802.15 Working Group for Wireless Personal Area Networks (WPANs), Impulse Radio Signaling for Communication and Ranging," IEEE 802.15-05-0231-03-004a, total 47 pages (May 2005).

Chin et al., "Project: IEEE P802.15 Working Group for Wireless Personal Area Networks (WPANs), Proposed Code Sequences for IEEE 802.15.4a Alt-PHY," IEEE 802.15-05-0032-00-004b, total 15 pages (Jan. 2005).

Aldana et al., "Project: IEEE P802.15 Working Group for Wireless Personal Area Networks (WPANs), Preamble codes for Data Communications in 802.15.4ab," IEEE 15-21-0377-01-04ab, Total 50 pages (Sep. 2021).

\* cited by examiner

PAN coordinator (A)

● FFD

○ RFD

↔ Communication flow

PAN coordinator (B)

METHOD AND APPARATUS FOR TRANSMITTING PHYSICAL LAYER PROTOCOL DATA UNIT

CROSS-REFERENCE TO RELATED APPLICATIONS

This application is a continuation of International Application No. PCT/CN2022/124273, filed on Oct. 10, 2020, which claims priority to Chinese Patent Application No. 202111193199.0, filed on Oct. 13, 2021 and Chinese Patent Application No. 202210801569.2, filed on Jul. 8, 2022. All of the aforementioned patent applications are hereby incorporated by reference in their entireties.

TECHNICAL FIELD

Embodiments of this application relate to the communication field, and more specifically, to a method and an apparatus for transmitting a physical layer protocol data unit.

BACKGROUND

An ultra-wideband (UWB) technology is a wireless communication technology in which nanosecond-level non-sinusoidal narrow pulses are used to transmit data. Due to a very narrow pulse and very low radiation spectrum density, a UWB system has advantages of a strong multipath resolution capability, low power consumption, high confidentiality, and the like.

Currently, ultra-wideband wireless communication has become one of popular physical layer technologies for short-distance and high-speed wireless networks. Many world-renowned large companies, research institutes, and standardization organizations are actively engaged in research, development, and standardization of ultra-wideband wireless communication technologies. The institute of electrical and electronics engineers (IEEE) has incorporated the UWB technology into its IEEE 802 series wireless standards, and has released the UWB technology-based high-speed wireless personal area network (WPAN) standard IEEE 802.15.4a and its evolution version IEEE 802.15.4z. Currently, formulation of the next-generation WPAN standard 802.15.4ab of the UWB technology has been put on the agenda.

Because in the UWB technology, data is transmitted by transmitting and receiving very narrow pulses at a level of a nanosecond or less than a nanosecond, synchronization between a transmitting device and a receiving device is very important in the UWB technology.

SUMMARY

Embodiments of this application provide a method and an apparatus for transmitting a physical layer protocol data unit, to implement synchronization of a UWB device.

According to a first aspect, a method for transmitting a physical layer protocol data unit is provided, including: generating a synchronization header field based on a first sequence, where a side lobe of a periodic cross-correlation function of the first sequence and a second sequence is a constant value, the first sequence is a binary sequence consisting of 1 and 0, and the second sequence is a binary phase shift keying sequence corresponding to the first sequence; and sending a physical layer protocol data unit PPDU on a target channel, where the PPDU includes the synchronization header field.

According to the solution in this embodiment of this application, the first sequence used to generate the synchronization header field is the binary sequence consisting of only two types of elements: 0 and 1, and the side lobe of the periodic cross-correlation function of the first sequence and the second sequence is the constant value, so that a receiving end can implement synchronization based on a correlation detection result.

In addition, in the solution in this application, a transmitting end device and a receiving end device can support on-off keying (OOK) modulation and demodulation modes, to help simplify a structure of a transceiver and reduce device power consumption.

According to a second aspect, a method for transmitting a physical layer protocol data unit is provided, including: receiving a physical layer protocol data unit PPDU on a target channel, where the PPDU includes a synchronization header field; and performing correlation detection on the synchronization header field based on a first sequence, where a side lobe of a periodic cross-correlation function of the first sequence and a second sequence is a constant value, the first sequence is a binary sequence consisting of 1 and 0, and the second sequence is a binary phase shift keying sequence corresponding to the first sequence.

According to the solution in this embodiment of this application, the first sequence used to perform correlation detection on the synchronization header field is the binary sequence consisting of only two types of elements: 0 and 1, and the side lobe of the periodic cross-correlation function of the first sequence and the second sequence is the constant value, so that a receiving end can implement synchronization based on a correlation detection result.

In addition, in the solution in this application, a transmitting end device and a receiving end device can support on-off keying (OOK) modulation and demodulation modes, to help simplify a structure of a transceiver and reduce device power consumption.

According to a third aspect, a method for transmitting a physical layer protocol data unit is provided, including: generating a synchronization header field based on a third sequence, where a side lobe of a periodic autocorrelation function of the third sequence is a constant value; and sending a physical layer protocol data unit PPDU on a target channel, where the PPDU includes the synchronization header field, where the third sequence is a binary phase shift keying sequence consisting of 1 and −1; or the third sequence is a sequence consisting of 1, 0, and −1, and the constant value is 0.

According to the method in this embodiment of this application, the third sequence used to generate the synchronization header field may be the binary phase shift keying (BPSK) sequence, that is, includes only two types of elements: −1 and 1, and the side lobe of the periodic autocorrelation function of the third sequence is a constant value, so that a receiving end can implement synchronization based on a correlation detection result.

In addition, because the BPSK sequence has no value 0 compared with an Ipatov sequence, more pulses can be sent during SHR sending by using the BPSK sequence, to help improve receiving performance, reduce a packet error rate, and increase a transmission distance, thereby improving system performance and coverage.

According to the method in this embodiment of this application, the third sequence used to generate the synchronization header field may alternatively be the sequence consisting of 1, 0, and −1, and the side lobe of the periodic autocorrelation function of the third sequence is 0, so that a receiving end can implement synchronization based on a correlation detection result.

In addition, because the side lobe of the periodic autocorrelation function of the third sequence is 0, there is an optimal periodic autocorrelation characteristic. Using the sequence enables the receiving end to have a strong capability of resisting multipath interference, to help improve receiving performance, thereby improving system performance and coverage.

According to a fourth aspect, a method for transmitting a physical layer protocol data unit is provided, including: receiving a physical layer protocol data unit PPDU on a target channel, where the PPDU includes a synchronization header field; and performing correlation detection on the synchronization header field based on a third sequence, where a side lobe of a periodic autocorrelation function of the third sequence is a constant value, where the third sequence is a binary phase shift keying sequence consisting of 1 and −1; or the third sequence is a sequence consisting of 1, 0, and −1, and the constant value is 0.

According to the method in this embodiment of this application, the third sequence used to perform correlation detection on the synchronization header field may be the BPSK sequence, that is, includes only two types of elements: −1 and 1, and the side lobe of the periodic cross-correlation function of the third sequence is a constant value, so that a receiving end can implement synchronization based on a correlation detection result.

In addition, because the BPSK sequence has no value 0 compared with an Ipatov sequence, more pulses can be sent during SHR sending by using the BPSK sequence, to help improve receiving performance, reduce a packet error rate, and increase a transmission distance, thereby improving system performance and coverage.

According to the method in this embodiment of this application, the third sequence used to perform correlation detection on the synchronization header field may alternatively be the sequence consisting of 1, 0, and −1, and the side lobe of the periodic autocorrelation function of the third sequence is 0, so that a receiving end can implement synchronization based on a correlation detection result.

In addition, because the side lobe of the periodic autocorrelation function of the third sequence is 0, there is an optimal periodic autocorrelation characteristic. Using the sequence enables the receiving end to have a strong capability of resisting multipath interference, to help improve receiving performance, thereby improving system performance and coverage.

According to a fifth aspect, an apparatus for transmitting a physical layer protocol data unit is provided, including: a processing unit, configured to generate a synchronization header field based on a first sequence, where a side lobe of a periodic cross-correlation function of the first sequence and a second sequence is a constant value, the first sequence is a binary sequence consisting of 1 and 0, and the second sequence is a binary phase shift keying sequence corresponding to the first sequence; and a sending unit, configured to send a physical layer protocol data unit PPDU on a target channel, where the PPDU includes the synchronization header field.

According to a sixth aspect, an apparatus for transmitting a physical layer protocol data unit is provided, including: a receiving unit, configured to receive a physical layer protocol data unit PPDU on a target channel, where the PPDU includes a synchronization header field; and a processing unit, configured to perform correlation detection on the synchronization header field based on a first sequence, where a side lobe of a periodic cross-correlation function of the first sequence and a second sequence is a constant value, the first sequence is a binary sequence consisting of 1 and 0, and the second sequence is a binary phase shift keying sequence corresponding to the first sequence.

According to a seventh aspect, an apparatus for transmitting a physical layer protocol data unit is provided, including: a processing unit, configured to generate a synchronization header field, where a side lobe of a periodic autocorrelation function of a third sequence is a constant value; and a sending unit, configured to send a physical layer protocol data unit PPDU on a target channel, where the PPDU includes the synchronization header field, where the third sequence is a binary phase shift keying sequence consisting of 1 and −1; or the third sequence is a sequence consisting of 1, 0, and −1, and the constant value is 0.

According to an eighth aspect, an apparatus for transmitting a physical layer protocol data unit is provided, including: a receiving unit, configured to receive a physical layer protocol data unit PPDU on a target channel, where the PPDU includes a synchronization header field; and a processing unit, configured to perform correlation detection on the synchronization header field based on a third sequence, where a side lobe of a periodic autocorrelation function of the third sequence is a constant value, where the third sequence is a binary phase shift keying sequence consisting of 1 and −1; or the third sequence is a sequence consisting of 1, 0, and −1, and the constant value is 0.

With reference to any one of the first aspect, the second aspect, the fifth aspect, and the sixth aspect, in some implementations of any one of the first aspect, the second aspect, the fifth aspect, and the sixth aspect, the synchronization header field includes a synchronization field and a start-of-frame delimiter field, the synchronization field is generated based on a basic symbol, the start-of-frame delimiter field is generated based on the basic symbol and a preset sequence, and the basic symbol is generated based on the first sequence.

Optionally, the preset sequence may also be referred to as a specified sequence.

With reference to any one of the first aspect, the second aspect, the fifth aspect, and the sixth aspect, in some implementations of any one of the first aspect, the second aspect, the fifth aspect, and the sixth aspect, the preset sequence is {0, 1, 0, 1, 1, 0, 0, 1}.

With reference to any one of the first aspect, the second aspect, the fifth aspect, and the sixth aspect, in some implementations of any one of the first aspect, the second aspect, the fifth aspect, and the sixth aspect, the first sequence is an m-sequence.

With reference to any one of the first aspect, the second aspect, the fifth aspect, and the sixth aspect, in some implementations of any one of the first aspect, the second aspect, the fifth aspect, and the sixth aspect, a channel number of the target channel is any one of 0, 1, 2, 3, 5, 6, 8, 9, 10, 12, 13, and 14, and the first sequence is:
{1, 0, 0, 0, 0, 1, 1, 0, 1, 0, 1, 0, 0, 1, 0, 0, 0, 1, 0, 1, 1, 1, 1, 1, 0, 1, 1, 0, 0, 1, 1}.

With reference to any one of the first aspect, the second aspect, the fifth aspect, and the sixth aspect, in some implementations of any one of the first aspect, the second aspect, the fifth aspect, and the sixth aspect, a channel number of the target channel is any one of 4, 7, 11, and 15, and the first sequence is:

{1, 0, 0, 0, 1, 0, 1, 0, 1, 1, 1, 0, 1, 1, 0, 0, 0, 1, 1, 1, 1, 1, 0, 0, 1, 1, 0, 1, 0, 0}; or

{0, 1, 0, 1, 1, 0, 1, 0, 1, 0, 0, 0, 1, 1, 1, 0, 1, 1, 1, 1, 1, 0, 0, 1, 0, 0, 1, 1, 0, 0, 0}.

With reference to any one of the first aspect, the second aspect, the fifth aspect, and the sixth aspect, in some implementations of any one of the first aspect, the second aspect, the fifth aspect, and the sixth aspect, a channel number of the target channel is any one of 1, 2, 3, 4, 5, 6, 7, 8, 9, 10, 11, 12, 13, 14, and 15, and the first sequence is any one of the following:

{0, 1, 0, 1, 0, 1, 1, 0, 0, 1, 1, 0, 1, 1, 1, 0, 1, 1, 0, 1, 0, 0, 1, 0, 0, 1, 1, 1, 0, 0, 0, 1, 0, 1, 1, 1, 1, 0, 0, 1, 0, 1, 0, 0, 0, 1, 1, 0, 0, 0, 0, 1, 0, 0, 0, 0, 0, 1, 1, 1, 1, 1, 1};

{0, 1, 1, 0, 1, 0, 0, 0, 1, 0, 0, 0, 0, 1, 0, 1, 1, 0, 0, 1, 0, 1, 0, 1, 0, 0, 1, 0, 0, 1, 1, 1, 0, 0, 0, 0, 0, 1, 1, 0, 1, 1, 1, 0, 0, 1, 1, 0, 0, 0, 1, 1, 1, 0, 1, 0, 1, 1, 1, 1, 1, 1}; or

{0, 0, 1, 0, 1, 0, 1, 0, 0, 0, 1, 1, 0, 0, 1, 1, 1, 1, 0, 1, 1, 1, 0, 1, 0, 1, 1, 0, 1, 0, 0, 1, 1, 0, 1, 1, 0, 0, 0, 1, 0, 0, 1, 0, 0, 0, 0, 1, 1, 1, 0, 0, 0, 0, 0, 1, 0, 1, 1, 1, 1, 1, 1}.

With reference to any one of the first aspect, the second aspect, the fifth aspect, and the sixth aspect, in some implementations of any one of the first aspect, the second aspect, the fifth aspect, and the sixth aspect, a channel number of the target channel is any one of 0 to 15, and the first sequence is any one of the following:

{1, 1, 1, 1, 1, 1, 1, 0, 0, 1, 0, 0, 1, 0, 0, 0, 0, 1, 1, 0, 0, 0, 0, 0, 0, 1, 0, 1, 1, 0, 1, 1, 0, 0, 0, 1, 0, 1, 0, 0, 0, 0, 0, 1, 1, 1, 0, 1, 1, 0, 1, 0, 0, 1, 1, 1, 1, 0, 0, 0, 0, 1, 0, 0, 1, 1, 0, 1, 1, 1, 0, 1, 0, 0, 0, 1, 0, 0, 0, 1, 1, 0, 1, 0, 1, 0, 1, 1, 0, 0, 1, 1, 0, 0, 1, 1, 0, 0, 1, 0, 1, 1, 1, 1, 1, 0, 1, 0, 1, 0, 0, 1, 0, 1, 0, 1, 1, 1, 0, 0, 0, 0, 1, 1, 1, 1, 1, 0};

{0, 0, 1, 0, 0, 0, 0, 1, 0, 1, 0, 0, 1, 1, 1, 1, 1, 0, 1, 0, 1, 0, 1, 0, 1, 1, 1, 0, 0, 0, 0, 0, 1, 0, 0, 0, 0, 1, 0, 1, 0, 1, 1, 0, 0, 1, 0, 0, 1, 0, 1, 1, 1, 1, 1, 1, 0, 1, 1, 1, 1, 0, 0, 1, 1, 0, 1, 1, 1, 0, 0, 1, 0, 1, 0, 1, 0, 0, 1, 0, 1, 0, 0, 0, 1, 0, 0, 1, 0, 1, 1, 0, 1, 0, 0, 0, 1, 1, 0, 0, 0, 1, 1, 1, 1, 1, 0, 0, 0, 0, 1, 1, 0, 1, 1, 0, 0, 1, 1, 0, 1, 0, 1, 0, 1, 1, 0, 1, 0, 1, 1, 1, 0, 0, 0, 0, 1, 1, 0, 1, 0, 0, 0, 1, 1, 0, 0, 1, 1, 1, 0, 1, 1, 0, 0, 1, 0, 0, 1, 0, 0, 1, 1, 0, 0, 0, 0, 0, 0, 1, 1, 1, 0, 1, 0, 0, 1, 0, 0, 0, 1, 1, 0, 0, 0, 1, 0, 0, 0, 0, 0, 0, 0, 0, 0, 1, 0, 1, 1, 0, 0, 0, 0, 1, 1, 1, 1, 0, 1, 0, 0, 0, 0, 1, 1, 1, 1, 1, 1, 1};

{0, 1, 0, 0, 1, 0, 0, 0, 0, 0, 0, 1, 1, 1, 0, 1, 1, 0, 0, 0, 0, 0, 0, 1, 0, 0, 1, 1, 0, 1, 0, 0, 0, 0, 0, 1, 1, 0, 1, 0, 1, 0, 1, 1, 1, 0, 0, 0, 0, 1, 0, 1, 1, 1, 1, 0, 0, 1, 0, 0, 0, 1, 1, 1, 0, 0, 0, 1, 1, 1, 0, 1, 0, 1, 1, 0, 1, 0, 1, 0, 1, 1, 0, 1, 0, 0, 1, 1, 1, 1, 0, 1, 1, 0, 1, 1, 1, 0, 1, 1, 1, 0, 0, 1, 0, 0, 0, 1, 1, 0, 1, 1, 0, 0, 1, 0, 1, 1, 0, 1, 0, 1, 1, 0, 1, 0, 1, 0, 1, 1, 1, 1, 0, 1, 1, 1, 1, 0, 0, 1, 1, 1, 0, 0, 0, 0, 0, 1, 0, 0, 1, 0, 1, 1, 0, 1, 1, 1, 1, 1, 0, 0, 0, 0, 0, 1, 1, 0, 1, 0, 0, 0, 1, 1, 1, 1, 0, 0, 0, 0, 1, 1, 0, 0, 1, 1, 0, 1, 1, 0, 0, 0, 1, 1, 1, 1, 0, 0, 1, 0, 0, 0, 1, 0, 0, 0, 1, 0, 0, 0, 1, 0, 1, 1, 1, 1, 1, 0, 1, 0, 1, 0, 0, 0, 1, 1, 0, 0, 1, 0, 1, 0, 1, 0, 1, 1, 1, 1, 1};

{0, 1, 1, 1, 1, 0, 0, 0, 0, 0, 0, 1, 0, 1, 0, 0, 1, 1, 0, 0, 0, 0, 1, 0, 0, 0, 1, 1, 1, 1, 0, 0, 1, 0, 1, 0, 1, 1, 0, 0, 0, 1, 1, 0, 0, 0, 0, 1, 1, 1, 0, 1, 1, 0, 1, 1, 0, 1, 1, 0, 0, 1, 1, 0, 1, 0, 1, 1, 0, 1, 0, 1, 1, 1, 1, 0, 0, 0, 1, 0, 0, 0, 0, 1, 1, 1, 0, 1, 0, 1, 0, 0, 0, 1, 0, 1, 0, 1, 1, 1, 0, 0, 0, 0, 0, 0, 0, 1, 1, 0, 0, 0, 1, 0, 0, 0, 1, 0, 0, 0, 0, 0, 1, 0, 1, 1, 1, 1, 1, 1, 0, 1, 0, 0, 0, 0, 1, 1, 0, 0, 1, 0, 0, 0, 1, 0, 0, 0, 0, 0, 1, 0, 1, 1, 1, 0, 1, 0, 1, 0, 1, 1, 1, 1, 0, 1, 1, 0, 0, 0, 0, 1, 0, 0, 1, 0, 1, 1, 1, 0, 0, 0, 0, 1, 0, 1, 1, 0, 0, 1, 0, 1, 1, 1, 0, 1, 0, 0, 1, 1, 1, 1, 0, 0, 1, 1, 0, 0, 1, 1, 1, 0, 0, 1, 1, 1, 1, 1, 1, 1, 1, 1};

{0, 1, 0, 1, 0, 0, 0, 0, 1, 1, 1, 0, 0, 1, 1, 1, 1, 0, 0, 0, 0, 1, 1, 0, 1, 1, 0, 0, 1, 1, 0, 1, 0, 0, 0, 0, 1, 1, 1, 1, 0, 1, 1, 1, 0, 0, 0, 1, 1, 1, 0, 1, 0, 0, 0, 0, 0, 0, 0, 1, 1, 1, 1, 1, 0, 0, 0, 1, 0, 0, 1, 0, 1, 0, 0, 0, 0, 1, 0, 0, 0, 1, 0, 1, 1, 0, 1, 0, 1, 1, 0, 1, 0, 1, 0, 1, 0, 1, 1, 1, 1, 0, 0, 1, 0, 1, 1, 0, 0, 1, 0, 0, 0, 1, 1, 0, 0, 1, 0, 0, 0, 1, 0, 0, 1, 1, 0, 0, 0, 1, 1, 1, 0, 0, 1, 1, 1, 1, 1, 0, 1, 0, 1, 1, 0, 0, 1, 1, 0, 1, 1, 0, 1, 1, 1, 0, 1, 1, 0, 0, 0, 0, 0, 1, 0, 1, 0, 0, 1, 0, 1, 1, 1, 1, 0, 1, 0, 0, 1, 1, 1, 1, 1, 1, 1, 1};

{0, 0, 1, 1, 0, 1, 1, 1, 1, 0, 1, 1, 1, 0, 1, 0, 0, 0, 0, 0, 0, 0, 1, 0, 1, 0, 1, 1, 0, 0, 0, 1, 1, 0, 0, 1, 1, 1, 0, 0, 0, 0, 0, 0, 1, 1, 1, 1, 1, 0, 1, 0, 0, 1, 0, 0, 1, 0, 1, 0, 0, 0, 1, 0, 0, 0, 0, 0, 1, 0, 0, 0, 1, 0, 0, 0, 0, 1, 1, 1, 0, 1, 1, 1, 1, 1, 1, 0, 1, 1, 0, 0, 0, 1, 1, 0, 0, 0, 0, 1, 1, 0, 0, 0, 1, 0, 0, 1, 1, 0, 0, 0, 0, 0, 1, 1, 0, 1, 0, 0, 0, 0, 1, 0, 1, 0, 0, 0, 0, 0, 0, 1, 0, 1, 1, 1, 0, 0, 1, 1, 1, 1, 1, 0, 1, 0, 1, 1, 1, 1, 0, 0, 0, 1, 1, 1, 0, 0, 1, 0, 1, 1, 1, 1, 0, 0, 0, 1, 1, 0, 0, 1, 1, 0, 0, 0, 1, 0, 1, 0, 1, 1, 1, 1, 0, 1, 1, 1, 0, 0, 1, 0, 1, 1, 0, 1, 1, 0, 0, 1, 0, 1, 0, 1, 1, 0, 1, 0, 1, 0, 1, 0, 1, 1, 1, 0, 1, 0, 1, 0, 1, 0, 1, 1, 0, 0, 1, 1, 1, 1, 1, 1, 1, 1};

{0, 0, 0, 1, 1, 0, 0, 0, 1, 0, 1, 0, 1, 0, 1, 0, 0, 0, 0, 1, 0, 0, 0, 0, 1, 1, 0, 0, 1, 1, 0, 0, 0, 0, 0, 1, 1, 1, 1, 1, 1, 0, 1, 1, 1, 0, 1, 1, 1, 1, 1, 1, 0, 1, 0, 1, 0, 0, 0, 1, 0, 1, 1, 1, 0, 1, 0, 1, 0, 1, 1, 1, 0, 0, 0, 1, 0, 0, 0, 1, 1, 1, 0, 0, 1, 0, 0, 0, 1, 0, 0, 0, 1, 0, 0, 1, 0, 0, 0, 0, 1, 0, 1, 1, 1, 0, 0, 0, 1, 0, 0, 0, 0, 1, 1, 1, 0, 1, 0, 1, 0, 1, 1, 1, 0, 1, 0, 1, 1, 1, 1, 0, 1, 1, 1, 0, 0, 0, 0, 1, 0, 1, 1, 1, 1, 0, 1, 0, 1, 0, 1, 0, 0, 1, 0, 0, 1, 1, 1, 0, 1, 0, 0, 0, 1, 1, 1, 1, 0, 0, 1, 1, 1, 0, 1, 1, 1, 1, 0, 0, 1, 1, 1, 0, 1, 0, 1, 0, 1, 1, 1, 0, 1, 1, 1, 1, 1, 1}; or

{0, 1, 1, 0, 1, 0, 0, 1, 1, 0, 0, 0, 1, 0, 1, 0, 1, 0, 0, 0, 0, 0, 0, 1, 0, 1, 1, 0, 0, 1, 1, 1, 0, 1, 1, 0, 0, 1, 0, 0, 0, 0, 0, 1, 0, 0, 0, 0, 1, 1, 1, 1, 1, 0, 1, 0, 1, 1, 1, 1, 0, 1, 0, 0, 0, 1, 0, 0, 0, 1, 0, 1, 1, 0, 0, 0, 1, 0, 0, 0, 0, 0, 1, 1, 1, 0, 0, 0, 1, 0, 1, 0, 0, 1, 1, 1, 0, 0, 0, 1, 0, 1, 1, 0, 1, 0, 1, 0, 1, 1, 0, 1, 1, 0, 0, 0, 0, 1, 0, 1, 1, 0, 0, 1, 1, 1, 1, 0, 1, 1, 0, 0, 1, 0, 1, 1, 1, 1, 0, 1, 1, 1, 0, 1, 1, 0, 0, 1, 1, 0, 0, 0, 0, 0, 0, 1, 1, 0, 1, 1, 1, 0, 1, 0, 0, 1, 0, 0, 0, 0, 1, 1, 0, 1, 0, 1, 0, 1, 0, 1, 1, 0, 0, 0, 0, 0, 1, 1, 1, 0, 0, 0, 0, 1, 0, 1, 1, 1, 1, 0, 0, 0, 1, 1, 1, 1, 0, 1, 1, 1, 0, 0, 1, 0, 0, 1, 1, 0, 0, 1, 1, 0, 1, 1, 0, 1, 1, 1, 1, 0, 0, 1, 0, 1, 0, 1, 1, 1, 0, 1, 1, 1, 1, 1, 1, 1, 1}.

With reference to any one of the third aspect, the fourth aspect, the seventh aspect, and the eighth aspect, in some implementations of any one of the third aspect, the fourth aspect, the seventh aspect, and the eighth aspect, the synchronization header field includes a synchronization field and a start-of-frame delimiter field, the synchronization field is generated based on a basic symbol, the start-of-frame delimiter field is generated based on the basic symbol and a preset sequence, and the basic symbol is generated based on the first sequence.

Optionally, the preset sequence may also be referred to as a specified sequence.

With reference to any one of the third aspect, the fourth aspect, the seventh aspect, and the eighth aspect, in some implementations of any one of the third aspect, the fourth aspect, the seventh aspect, and the eighth aspect, the preset sequence is {0, 1, 0, 1, 1, 0, 0, 1}.

With reference to any one of the third aspect, the fourth aspect, the seventh aspect, and the eighth aspect, in some implementations of any one of the third aspect, the fourth aspect, the seventh aspect, and the eighth aspect, the third sequence is a binary phase shift keying sequence corresponding to an m-sequence.

In other words, the third sequence is a BPSK m-sequence.

With reference to any one of the third aspect, the fourth aspect, the seventh aspect, and the eighth aspect, in some implementations of any one of the third aspect, the fourth aspect, the seventh aspect, and the eighth aspect, a channel number of the target channel is any one of 0, 1, 8, and 12, and the third sequence is:

{−1, −1, 1, 1, −1, 1, −1, −1, 1, −1, −1, −1, −1, 1, −1, 1, −1, 1, 1, 1, −1, 1, 1, −1, −1, −1, 1, 1, 1, 1, 1}; or

{−1, −1, 1, −1, −1, 1, 1, −1, −1, −1, −1, 1, −1, 1, 1, −1, 1, −1, 1, −1, −1, −1, 1, 1, 1, −1, 1, 1, 1, 1, 1}.

With reference to any one of the third aspect, the fourth aspect, the seventh aspect, and the eighth aspect, in some implementations of any one of the third aspect, the fourth aspect, the seventh aspect, and the eighth aspect, a channel number of the target channel is any one of 2, 5, 9, and 13, and the third sequence is:

{1, 1, 1, 1, 1, −1, 1, 1, 1, −1, −1, −1, 1, −1, 1, −1, 1, 1, −1, 1, −1, −1, −1, −1, 1, 1, −1, −1, 1, −1, −1}.

With reference to any one of the third aspect, the fourth aspect, the seventh aspect, and the eighth aspect, in some implementations of any one of the third aspect, the fourth aspect, the seventh aspect, and the eighth aspect, a channel number of the target channel is any one of 3, 6, 10, and 14, and the third sequence is:

{1, 1, 1, 1, 1, −1, −1, −1, 1, 1, −1, 1, 1, 1, −1, 1, −1, 1, −1, −1, −1, −1, 1, −1, −1, 1, −1, 1, 1, −1, −1}; or

{−1, 1, 1, −1, −1, 1, 1, 1, −1, −1, −1, −1, 1, 1, −1, 1, −1, 1, −1, −1, 1, −1, −1, −1, 1, −1, 1, 1, 1, 1, 1}.

With reference to any one of the third aspect, the fourth aspect, the seventh aspect, and the eighth aspect, in some implementations of any one of the third aspect, the fourth aspect, the seventh aspect, and the eighth aspect, a channel number of the target channel is any one of 0, 1, 2, 3, 5, 6, 8, 9, 10, 12, 13, and 14, and the third sequence is:

{−1, 1, 1, 1, −1, 1, 1, −1, 1, 1, 1, 1, −1, 1, −1, −1, −1, 1, −1, 1, 1, −1, −1, 1, −1, 1, 1, 1, 1, 1, −1, −1, −1, 1, −1, −1, −1, −1, −1, −1, 1, 1, −1, −1, 1, 1, −1, −1, 1, 1, −1, 1, 1, −1, −1, 1, −1, 1, 1, 1, 1, −1, 1, 1, 1, −1, −1, 1, 1, 1, −1, 1, −1, 1, 1, 1, 1, −1, −1, −1,
−1, 1, 1, −1, 1, −1, −1, 1, −1, −1, 1, −1, 1, −1, −1, 1, 1, 1, 1, −1, −1, 1, −1, −1, −1, 1, 1, −1, 1, −1, 1, −1, −1, −1, −1, 1, 1, 1, 1, 1, 1, 1}.

With reference to any one of the third aspect, the fourth aspect, the seventh aspect, and the eighth aspect, in some implementations of any one of the third aspect, the fourth aspect, the seventh aspect, and the eighth aspect, a channel number of the target channel is any one of 4, 7, 11, and 15, and the third sequence is:

{1, 1, 1, 1, 1, 1, 1, −1, −1, −1, −1, 1, −1, 1, −1, 1, 1, −1, −1, −1, 1, −1, −1, 1, 1, 1, 1, −1, −1, 1, −1, 1, −1, −1, 1, −1, −1, 1, −1, 1, 1, −1, 1, −1, 1, −1, 1, −1, −1, −1, −1, −1, 1, 1, −1, −1, 1, −1, −1, −1, −1, 1, 1, 1, −1, 1, −1, 1, 1, −1, −1, 1, 1, 1, −1, −1, −1, 1, 1, 1, 1, −1, 1, −1, −1, 1, 1, 1, −1, −1, 1, 1, −1, −1, −1, −1, −1, −1, 1, −1, −1, −1, 1, 1, 1, 1, −1, 1, −1, −1, 1, 1, −1, 1, 1, −1, −1, 1, 1, −1, 1, 1, 1, 1, −1}.

With reference to any one of the third aspect, the fourth aspect, the seventh aspect, and the eighth aspect, in some implementations of any one of the third aspect, the fourth aspect, the seventh aspect, and the eighth aspect, a channel number of the target channel is any one of 0 to 15, and the third sequence is any one of the following:

{−1, 1, −1, 1, −1, 1, 1, 1, −1, −1, 1, 1, −1, 1, 1, 1, −1, 1, 1, −1, 1, −1, 1, −1, −1, 1, 1, 1, −1, −1, −1, 1, −1, 1, 1, 1, 1, −1, −1, 1, −1, 1, −1, −1, −1, 1, 1, −1, −1, −1, −1, 1, −1, −1, −1, −1, −1, 1, 1, 1, 1, 1, 1};

{−1, 1, 1, −1, 1, −1, −1, −1, 1, −1, −1, −1, −1, 1, −1, 1, 1, −1, −1, 1, −1, 1, −1, 1, 1, −1, −1, 1, −1, −1, 1, 1, 1, 1, −1, −1, −1, −1, −1, 1, 1, −1, 1, 1, 1, −1, −1, 1, 1, −1, 1, 1, 1, −1, 1, −1, 1, 1, 1, 1, 1, 1};

{−1, −1, 1, −1, 1, −1, 1, −1, −1, −1, 1, 1, −1, −1, 1, 1, 1, 1, −1, 1, 1, 1, 1, −1, 1, 1, −1, 1, −1, −1, −1, 1, 1, 1, 1, −1, 1, −1, −1, −1, 1, −1, −1, 1, −1, −1, −1, −1, 1, 1, 1, −1, −1, −1, −1, 1, −1, 1, 1, 1, 1, 1};

{−1, −1, 1, −1, −1, −1, −1, 1, −1, 1, −1, −1, 1, 1, 1, 1, −1, 1, −1, 1, −1, 1, −1, 1, 1, 1, −1, −1, −1, −1, −1, 1, 1, −1, −1, −1, 1, −1, 1, −1, 1, 1, 1, −1, −1, −1, −1, −1, 1, 1, −1, 1, −1, 1, −1, −1, 1, 1, 1, 1, 1, 1, 1, 1, −1, 1, 1, 1, 1, −1, −1, 1, 1, −1, 1, 1, 1, 1, −1, 1, 1, 1, 1, −1, 1, −1, 1, −1, 1, −1, −1, 1, −1, −1, −1, −1, 1, 1, 1, 1, 1, 1, −1, 1, 1, 1, 1, 1, 1, 1, −1, −1, −1, 1, −1, 1, 1, 1, 1, −1, 1, 1, 1, 1, 1, 1, 1, −1, −1, −1, 1, 1, 1, −1, 1, −1, 1, −1, −1, 1, 1, 1, 1, −1, 1, 1, 1, −1, 1, 1, 1, 1, 1, 1, 1, −1, 1, 1, 1, 1, 1, 1, −1, 1, 1, 1, −1, −1, 1, 1, 1, 1, 1, −1, 1, −1, −1, 1, 1, 1, −1, −1, 1, −1, −1, −1, −1, 1, −1, 1, −1, 1, 1, 1, 1, 1, −1, −1, −1, 1, −1, 1, 1, 1, 1, 1, 1, 1};

{−1, 1, −1, −1, 1, −1, −1, −1, −1, −1, −1, 1, 1, 1, −1, 1, 1, −1, −1, −1, −1, −1, −1, 1, 1, −1, −1, 1, 1, 1, −1, −1, −1, −1, −1, −1, 1, 1, −1, 1, 1, −1, −1, 1, 1, −1, −1, −1, −1, −1, −1, 1, 1, −1, −1, 1, −1, 1, 1, −1, −1, 1, −1, −1, 1, 1, 1, 1, 1, 1, 1, −1, 1, 1, 1, −1, 1, 1, 1, 1, 1, −1, −1, −1, −1, 1, 1, −1, −1, 1, 1, 1, 1, −1, 1, −1, 1, 1, −1, −1, −1, 1, 1, 1, 1, 1, 1, −1, 1, −1, 1, 1, 1, 1, 1, 1, −1, 1, 1, 1, 1, 1, 1, −1, 1, 1, 1, −1, 1, −1, 1, 1, −1, 1, −1, 1, −1, −1, −1, −1, −1, 1, 1, 1, 1, 1, 1, 1, −1, 1, 1, −1, −1, −1, −1, −1, 1, −1, −1, −1, −1, 1, 1, −1, −1, 1, 1, −1, −1, −1, 1, 1, −1, −1, 1, 1, 1, 1, 1, −1, −1, 1, −1, 1, −1, −1, 1, 1, 1, 1, 1, 1, −1, 1, −1, 1, 1, −1, 1, −1, −1, 1, 1, 1, 1, 1, 1, 1, 1};

{−1, 1, 1, 1, 1, −1, −1, −1, −1, −1, −1, 1, −1, 1, −1, −1, 1,
1, −1, −1, −1, −1, 1, −1, −1, −1, 1, 1, 1, 1, 1, −1, −1, 1,
−1, 1, −1, 1, 1, −1, −1, −1, 1, 1, 1, −1, −1, −1, −1, 1, 1,
1, −1, 1, 1, −1, 1, 1, −1, −1, 1, 1, −1, 1, −1, 1, 1, −1, 1,
1, 1, 1, 1, 1, −1, −1, −1, 1, 1, −1, 1, −1, −1, −1, −1, 1,
1, −1, 1, 1, 1, −1, −1, 1, −1, −1, 1, 1, 1, −1, 1, −1, 1, 1,
1, −1, 1, 1, 1, −1, 1, −1, −1, −1, 1, −1, 1, 1, −1, 1,
−1, −1, 1, −1, 1, −1, −1, −1, −1, −1, −1, −1, 1, 1, −1, −1,
−1, 1, −1, −1, −1, −1, −1, 1, 1, 1, 1, −1, 1, −1, 1, −1, −1,
−1, 1, 1, −1, −1, 1, −1, −1, −1, −1, 1, −1, 1, 1, 1, 1, 1,
−1, 1, −1, −1, 1, −1, −1, 1, −1, −1, −1, 1, −1, −1, 1, 1,
−1, 1, 1, −1, 1, −1, 1, −1, 1, 1, 1, 1, −1, 1, 1, −1, −1,
−1, −1, 1, −1, −1, 1, −1, 1, 1, 1, −1, −1, −1, 1, −1, 1, 1,
−1, −1, 1, −1, 1, 1, −1, 1, −1, −1, 1, 1, 1, 1, 1, −1, 1, 1,
−1, −1, 1, 1, 1, −1, −1, 1, 1, 1, 1, 1, 1, 1, 1};
{−1, 1, −1, 1, −1, −1, −1, −1, 1, 1, 1, −1, −1, 1, 1, 1, 1, −1,
−1, −1, −1, 1, 1, −1, 1, 1, −1, −1, 1, 1, −1, 1, −1, −1, −1,
1, 1, 1, 1, −1, 1, 1, 1, −1, −1, −1, 1, 1, 1, −1, 1, −1, −1,
−1, −1, −1, −1, −1, 1, 1, 1, 1, 1, −1, −1, −1, 1, −1, −1,
1, −1, 1, −1, −1, −1, 1, −1, −1, −1, 1, −1, 1, 1, −1, 1, 1,
1, −1, 1, 1, 1, −1, −1, 1, −1, −1, −1, 1, 1, −1, −1, 1, 1,
−1, 1, −1, −1, 1, 1, 1, −1, −1, −1, −1, 1, −1, 1, −1, 1,
−1, −1, 1, −1, −1, 1, 1, −1, 1, 1, 1, 1, −1, −1, 1, 1, 1,
−1, 1, 1, 1, −1, 1, 1, 1, 1, 1, 1, −1, −1, 1, −1, 1, 1, −1,
−1, 1, −1, 1, 1, −1, 1, −1, 1, 1, 1, −1, −1, 1, 1, −1, −1, −1,
−1, −1, −1, 1, 1, −1, −1, −1, −1, 1, −1, 1, −1, 1, 1, −1,
−1, 1, −1, 1, −1, 1, −1, 1, −1, −1, 1, 1, 1, −1, −1, −1, −1,
−1, 1, −1, 1, 1, 1, −1, 1, −1, 1, 1, 1, 1, 1, −1, 1, 1, −1,
1, 1, 1, −1, 1, 1, −1, −1, −1, −1, 1, −1, 1, 1, −1, 1, −1,
1, 1, 1, 1, −1, 1, −1, −1, 1, 1, 1, 1, 1, 1, 1, 1};
{−1, −1, 1, 1, −1, 1, 1, 1, 1, −1, 1, 1, 1, −1, 1, −1, −1, −1,
−1, −1, −1, −1, 1, −1, 1, −1, 1, 1, −1, −1, −1, 1, 1, −1,
−1, 1, 1, 1, −1, −1, −1, −1, −1, −1, 1, 1, 1, 1, 1, −1, 1,
−1, −1, 1, −1, 1, −1, 1, −1, −1, 1, −1, −1, −1, −1, −1, 1,
−1, −1, −1, −1, 1, 1, 1, −1, 1, 1, 1, 1, 1, −1, 1, 1, −1, 1,
−1, −1, −1, 1, 1, −1, −1, −1, 1, −1, −1, 1, 1, −1, −1, −1,
−1, −1, 1, 1, −1, 1, −1, 1, −1, −1, −1, 1, −1, 1, 1, 1, −1,
1, −1, −1, −1, −1, 1, −1, 1, 1, 1, −1, −1, 1, 1, 1,
1, −1, 1, −1, 1, 1, 1, 1, 1, −1, 1, −1, 1, 1, 1, −1, −1, 1,
−1, 1, −1, −1, −1, 1, 1, 1, 1, −1, −1, −1, −1, 1, −1, 1, −1, 1,
1, −1, −1, 1, −1, 1, 1, 1, 1, 1, −1, 1, −1, −1, −1, 1, −1, 1,
−1, 1, 1, 1, −1, 1, 1, −1, 1, 1, 1, −1, −1, −1, 1, −1, 1, 1,
1, −1, −1, 1, 1, 1, −1, −1, 1, −1, 1, 1, −1, 1, 1, −1, −1, 1,
−1, 1, −1, 1, 1, 1, −1, 1, −1, 1, 1, 1, 1, 1, 1, 1, 1};
{−1, −1, −1, 1, 1, −1, −1, 1, −1, −1, 1, 1, −1, 1, −1, −1, −1,
−1, −1, 1, −1, −1, −1, −1, 1, 1, −1, −1, 1, 1, 1, −1, −1, −1,
−1, −1, 1, 1, 1, 1, 1, −1, 1, 1, 1, −1, 1, 1, 1, 1, 1, 1, −1,
1, −1, 1, −1, −1, 1, −1, 1, 1, −1, 1, −1, 1, −1, 1, 1, −1,
−1, 1, 1, 1, −1, −1, 1, −1, −1, 1, 1, −1, −1, −1, 1, 1, −1,
1, −1, 1, 1, 1, −1, −1, −1, −1, 1, 1, 1, 1, 1, −1, 1, 1, −1,
1, −1, 1, 1, 1, 1, −1, 1, −1, −1, 1, −1, 1, 1, −1, 1, 1, 1,
1, −1, 1, 1, 1, 1, 1, 1, −1, 1, 1, 1, −1, −1, −1, 1, 1, −1, 1,
−1, −1, 1, 1, 1, −1, 1, −1, 1, −1, −1, −1, −1, −1, −1, −1, 1,
−1, 1, −1, −1, 1, 1, 1, 1, 1, 1, −1, −1, −1, −1, −1, −1, −1, 1,
−1, 1, −1, 1, −1, 1, 1, 1, 1, 1, 1, 1, 1, 1, 1};
{−1, 1, −1, 1, −1, 1, 1, 1, −1, −1, 1, 1, 1, −1, −1, 1, −1, −1, 1,
1, 1, −1, 1, −1, 1, −1, −1, −1, −1, 1, 1, −1, 1, 1, 1, −1,
−1, −1, −1, −1, 1, 1, −1, −1, −1, 1, 1, 1, −1, −1, −1,
1, 1, −1, −1, 1, −1, 1, −1, −1, 1, −1, 1, 1, 1, −1, 1,
−1, 1, 1, 1, 1, 1, −1, 1, −1, −1, 1, −1, −1, −1, 1, −1, 1, 1,
−1, 1, 1, −1, 1, 1, −1, −1, −1, −1, −1, −1, −1, −1, 1, 1, 1,
1, 1, −1, 1, 1, −1, −1, −1, 1, −1, 1, −1, −1, −1, −1, 1, 1, 1, 1, 1, 1, 1, −1, −1, −1, 1, −1, 1, 1, −1, −1, 1, −1, −1, −1,
−1, 1, −1, 1, −1, −1, −1, −1, 1, 1, −1, 1, −1, −1, −1, 1, −1, 1, −1,
1, −1, 1, −1, −1, 1, 1, −1, −1, 1, −1, 1, 1, 1, −1, 1, −1,
−1, −1, 1, 1, 1, −1, 1, 1, −1, −1, 1, 1, 1, 1, 1, −1, 1, 1,
−1, 1, −1, −1, −1, −1, −1, −1, −1, 1, −1, −1, −1, −1, −1, 1,
1, 1, 1, 1, −1, 1, 1, −1, 1, 1, 1, 1, −1, −1, −1, −1, −1, 1,
1, −1, 1, 1, 1, −1, 1, −1, −1, 1, 1, 1, 1, 1, 1, 1, 1, 1, 1}; or
{−1, 1, 1, −1, 1, −1, −1, 1, 1, 1, −1, −1, −1, −1, 1, −1, 1,
−1, 1, −1, −1, −1, −1, −1, −1, 1, −1, 1, 1, −1, −1, 1, 1,
1, −1, 1, 1, −1, −1, 1, −1, −1, −1, −1, −1, 1, −1, −1, −1, −1,
−1, 1, −1, −1, 1, 1, 1, 1, 1, −1, 1, −1, 1, 1, 1, 1, −1, 1,
−1, −1, −1, −1, 1, −1, −1, 1, −1, 1, 1, 1, −1, −1, −1, −1,
1, −1, −1, −1, 1, −1, −1, 1, −1, −1, 1, 1, 1, −1, −1, −1, −1,
1, 1, −1, −1, 1, −1, 1, 1, −1, 1, −1, 1, −1, 1, 1, 1, −1,
1, 1, −1, −1, −1, 1, −1, 1, 1, 1, 1, 1, −1, −1, 1, 1, −1, −1,
−1, −1, −1, −1, −1, 1, 1, −1, 1, 1, 1, −1, 1, −1, −1, 1, −1,
−1, −1, 1, 1, 1, 1, 1, −1, −1, −1, −1, −1, 1, 1, 1, −1,
1, −1, 1, −1, −1, 1, 1, −1, 1, −1, 1, 1, −1, −1, −1, −1, 1,
1, −1, −1, −1, 1, 1, −1, 1, −1, −1, −1, −1, 1, 1, 1, 1, −1,
−1, 1, 1, 1, −1, −1, 1, 1, 1, 1, −1, 1, 1, 1, −1, −1, 1,
−1, −1, 1, 1, −1, −1, 1, 1, −1, 1, 1, −1, 1, 1, 1, 1, −1, −1, 1,
1, −1, 1, −1, 1, 1, 1, −1, 1, 1, 1, 1, 1, 1, 1}.

With reference to any one of the third aspect, the fourth aspect, the seventh aspect, and the eighth aspect, in some implementations of any one of the third aspect, the fourth aspect, the seventh aspect, and the eighth aspect, the third sequence is a sequence consisting of 1, 0, and −1, the constant value is 0, the third sequence is represented as [x(0), x(1), x(2), . . . , x(L−1)], and an (i+1)$^{th}$ element x(i) of the third sequence is generated according to the following formula:

$$x(i) = \begin{cases} (-1)^{i+k}, & Tr(\alpha^i) = \alpha^{Lk} \\ 0, & Tr(\alpha^i) = 0 \end{cases} ;$$

and
a length L of the third sequence satisfies the following relationship:

$$L = \frac{p^m - 1}{p - 1},$$

where
m is an odd number, p is an odd prime number, α is any primitive element on a finite field GF($p^m$), $$Tr(\alpha^i) = \sum_{0}^{m-1} \alpha^{iq^n}$$

is a trace function on the finite field GF($p^m$), k enables $Tr(\alpha^i) = \alpha^{Lk}$, a value of k is 0 1 2, . . . , p−1, and a value of i is 0, 1, 2, . . . , L−1.

With reference to any one of the third aspect, the fourth aspect, the seventh aspect, and the eighth aspect, in some implementations of any one of the third aspect, the fourth aspect, the seventh aspect, and the eighth aspect, a channel number of the target channel is any one of 0 to 15, and the third sequence is any one of the following:
{1, 0, 0, 0, −1, 1, 0, 0, −1, 0, 1, 0, −1, −1, 1, 1, −1, 1, 0,
−1, 0, 0, 1, −1, −1, 0, 1, 0, 1, −1, 1, 1, 1, 0, 0, −1, −1,
1, 0, −1, 1, 0, 1, −1, 0, 1, 1, 0, −1, 1, −1, 1, −1, 0, 0, 0, 0, −1, 0, 0, 0, −1, −1, 0, 0, −1, 1, −1, 0, −1, 0, 0, −1, −1,
−1, 0, −1, 1, 1, −1, −1, 0, −1, 0, 1, −1, −1, −1, 1, 0, 1,
1, 0, 1, 1, −1, 1, 1, −1, 0, 0, −1, 0, −1, 0, −1, −1, −1, −1,
−1, 1, 1, 1, 1, 0, −1, −1, −1, 1, −1, 1};
{−1, 0, −1, −1, 1, 1, 1, 1, 1, 1, 1, 0, −1, 1, 1, −1, −1, −1,
0, −1, −1, 1, −1, −1, −1, 1, 1, −1, 1, 0, 1, 0, 1, −1, −1, −1,
1, 1, −1, 1, −1, 1, 1, 1, −1, −1, 1, 0, −1, 1, 1, 1, 0, 0, 1,
0, −1, 1, 1, 1, 1, 1, −1, 1, 1, −1, −1, 1, 0, 1, 1, −1, −1, 1,
1, 1, 1, −1, −1, −1, 1, −1, 1, 1, −1, 1, −1, 1, 1, −1, −1,
1, 1, 1, 1, −1, −1, −1, 1, 0, −1, 1, 1, −1, 1, 1, −1, 1, 1,
1, −1, 1, −1, 1, −1, 1, −1, 1, −1, 1, 1, 1, 1, −1, 0, −1, −1,
1, 0, 1, 1, −1, 1, −1, −1, −1};
{−1, 0, 1, −1, 1, 1, 1, 1, 0, 1, 1, 1, −1, 0, −1, −1, −1, −1,
−1, 1, −1, 1, 1, 1, −1, −1, 1, 0, −1, 1, −1, 1, −1, 1, −1, −1,
1, 1, −1, −1, −1, −1, −1, 1, 1, 1, 1, −1, 1, 1, −1, −1, 1, 1,
1, −1, 1, −1, 1, 1, 1, 1, −1, 0, 1, −1, 1, 1, −1, 0, −1, −1,
−1, 0, 1, −1, 1, −1, −1, −1, 1, 1, 1, −1, −1, 1, −1, 1, 1,
1, −1, 1, 1, 1, −1, 1, −1, −1, 1, 1, −1, 1, 1, 1, 1, 0, −1,
1, −1, 1, −1, −1, 1, 1, 1, −1, −1, 1, 1, −1, 1, 1, −1, 0, 1,
−1, 1, −1, 1, −1, −1, 1, 1, −1, −1, −1, 1, −1, −1, −1, 0,
−1, −1, −1, 1, 1, −1, −1, −1, 1, −1, 1, −1, 1, −1, 1,
−1, −1, −1, 1, 0, 1, 1, 1, 1, −1, −1, −1, 0, 0, −1, 0, −1,
−1, −1, 1, −1, 1, −1, 1, 1, 1, −1, −1};
{1, 0, −1, 1, −1, 1, −1, 1, −1, −1, 1, 1, 1, 0, 1, 1, 1, 0, −1,
1, −1, 1, 1, 1, 1, −1, 1, 1, 1, −1, −1, 1, 1, 1, −1, −1, −1,
−1, 1, 1, 1, −1, 0, −1, −1, −1, 1, −1, 1, 1, 1, −1, −1, 1,
1, 1, 1, 1, −1, 1, −1, 1, 1, 1, −1, −1, −1, 1, −1, 1, −1, 1,
1, 1, 1, 0, −1, 1, −1, −1, 1, −1, −1, −1, 1, 0, 1, 1, 1, −1,
−1, 1, 1, 1, −1, −1, −1, −1, 1, 1, −1, 1, −1, 1, 1, 1,
−1, 0, 1, −1, 1, 1, 1, −1, −1, 1, −1, 1, −1, 1, 1, −1, −1, 1,
−1, 1, 1, −1, −1, 1, 1, −1, 1, 1, 1, −1, −1, 1, −1, 1, 1,
−1, 1, −1, −1, −1, 1, −1, 1, −1, 1, 1, 1, −1, 1, 1, −1,
1, −1, 1, −1, 1, −1, −1, −1, −1, −1, 1, −1, 1, −1, 1, 1,
−1, −1, 1, −1, −1, 1, 0, 1, 1, 1, 1, 0, −1, 1, −1, 1, −1,
−1, −1, 0, 0, −1, 0, −1, −1, −1, −1, 1, −1, 1, −1, 1,
−1, −1, −1, 1, 1, −1, −1, 1, −1, −1, 1, 1, 1, 1, 1, 0,
1, 1, 1, −1, −1, −1, 0, 1, −1, 1, −1, 1, 1, −1, −1, 1, 1, 1,
1, 0, 1, 1, 1, −1, 0, 1, −1, 1, −1, −1, −1, 1, −1, 1, 1, 1,
−1, −1, −1, −1, −1, 1, −1, −1, 1, 0, −1, 1, −1, −1, 1, −1,
1, 1, −1, 1, −1, 1, −1, 1, −1, −1, −1, 1, 1, 1, 1, −1, 0, −1,
−1, −1, −1, 1, 1, −1, 1, −1, 1, −1, −1, 1, 1, 1, −1, −1};
{1, 0, −1, 1, 1, 1, 1, −1, −1, −1, 1, −1, −1, −1, 1, 1, 1, 1,
−1, 0, −1, −1, 1, 0, −1, 1, 1, 1, −1, 1, 1, −1, 1, −1, −1,
−1, −1, 1, −1, 1, −1, 1, −1, 1, 1, 1, −1, −1, −1, −1, 1, 1,
1, −1, 1, 1, 0, 1, 1, −1, −1, 1, −1, −1, 1, 1, 1, 1, −1, 1, 1,
1, 1, 1, 1, 1, −1, 1, 1, 1, 1, 1, −1, 1, 1, 1, 1, 1,
1, 1, 1, −1, 1, 1, 1, 1, −1, 1, 1, 1, 1, −1, 1, 1,
1, 1, −1, −1, 1, 1, 1, 1, 1, −1, 1, 1, −1, 1, −1, 1,
1, 1, 0, 1, 1, −1, −1, 1, −1, 1, 1, −1, 1, −1, 1, 1, 1,
−1, 1, 1, 1, 1, 1, 1, 1, −1, −1, 1, 0, 1, −1, −1, −1, −1, 0,
−1, −1, 1, −1, 1, 1, −1, 1, 1, −1, 1, −1, 1, 1, 1, −1, 1,
1, 1, 1, −1, 1, 1, −1, −1, 1, 1, 1, 1, 1, 1, −1, 0, −1,
1, −1, 1, −1, 1, 1, −1, −1, 1, −1, 1, −1, −1, −1, 1, 1,
−1, −1, 0, 1, −1, −1, −1, −1, 1, −1, 1, −1, 1, 1, 1, 1,
−1, −1, 1, 1, −1, 1, 1, 1, 0, 0, 1, 0, −1, 1, 1, 1, −1, −1,
−1, −1, 0, 1, −1, −1, 1, 0, 1, 1, −1, 1, 1, 1, 1, 1, 1, −1,
−1, 1, 1, 1, −1, 1, 1, −1, 1, 1, −1, −1, −1, −1, 1, 1,
−1, 1, −1, 1, −1, 1, −1, −1, −1, 1, 1, 1, −1, 1, 1, 1,
−1, 1, 1, 1, 0, −1, 1, 1, −1, −1, 1, −1, −1, 0, −1, −1,
1, −1, 1, 1, −1, −1, 1, 1, 1, −1, 1, 1, 1, −1, −1, 1, 0, −1, 1,
1, 1, −1, −1, 1, 1, 1, −1, −1, −1, −1, −1, 1, −1, 1, 1,
1, −1, −1, 1, 0, 1, 1, −1, −1, 1, 0, −1, 1, 1, −1, 1, 1, 1,
1, 0, 1, 1, −1, −1, −1, 1, −1, 1, −1, 1, −1};
{−1, 0, 1, −1, −1, −1, −1, 1, 1, −1, −1, −1, −1, 1, 1, 1, −1,
1, −1, 1, −1, 1, −1, 1, 0, −1, 1, −1, 1, 1, 1, 1, 1, 1,
−1, 1, −1, 1, 1, 1, 1, 1, −1, 1, 1, −1, 1, −1, −1, 1, −1, −1,
1, 0, 1, 1, −1, −1, 1, −1, −1, −1, 1, −1, 1, −1, 1, −1, 1, −1, 1, −1, 1, −1, 1, 1, 1, −1, 1, −1, −1, 1, −1, 1, 1, 1, −1,
1, 1, 1, −1, 0, 1, −1, −1, 1, −1, 1, 1, −1, 1, 1, −1, 1, −1,
1, −1, 1, 1, −1, 0, 1, −1, −1, 1, 1, 1, −1, −1, 1, 1, −1, 0,
−1, −1, 1, 1, −1, 1, −1, 1, −1, −1, 1, 1, 1, −1, −1, 1, 1,
−1, −1, 1, 1, −1, 1, −1, 1, −1, 1, 1, 1, −1, 0, 1, −1, −1,
−1, 1, −1, 1, 1, −1, 0, 1, −1, −1, −1, 1, 1, 1, −1, 1, 1, 1,
0, 1, −1, −1, −1, 0, 1, −1, −1, −1, 1, 1, 0, −1, 1, 1, 1,
−1, 1, 1, −1, 1, −1, −1, −1, 1, −1, 1, 1, 1, 1, −1, 1,
1, −1, −1, −1, 1, 1, −1, 1, 1, 1, 1, 1, −1, 0, −1, 1,
1, −1, −1, −1, −1, 0, 1, −1, −1, 1, −1, 1, 1, 1, 1, −1,
−1, −1, 1, 1, −1, 1, −1, 1, −1, 1, −1, 1, −1, 1, 1, 1, −1,
1, −1, −1, 1, 1, −1, 1, −1, 1, −1, −1, 1, 1, 1, −1, 1,
1, −1, −1, 1, 1, 1, −1, 1, 1, 1, −1, −1, −1, 1, −1, 1, 1,
1, −1, −1, 1, 1, 1, 1, 1, −1, 1, 1, 1, 1, −1, 1, 1, −1,
1, −1, −1, −1, 1, 1, 1, 1, −1, 1, 1, 1, 1, −1, −1, 1,
1, 1, 1, −1, −1, −1, 1, −1, −1, −1, 1, −1, 1, 1, −1, 1, −1,
1, 1, 1, −1, 1, −1, 1, 1, 1, 1, 0, −1, 1, 1, 1, 1, 1, 1, −1,
1, 1, 1, −1, −1, 1, 1, −1, 1, 1, 1, 1, 1, 1, 1, −1,
−1, −1, −1, 1, 1, −1, 1, −1, 1, 1, −1, −1, −1, −1, 1, −1,
−1, −1, 0, −1, −1, 1, 0, 1, 1, −1, 1, 1, −1, −1, 1, −1, 1,
1, −1, 1, 1, 1, 1, −1, −1, −1, 0, −1, −1, 1, 1, 1, −1, 0,
−1, −1, 1, −1, −1, 1, 1, 1, 1, −1, 1, 1, 1, −1, 1, 1, 1, −1,
1, −1, −1, −1, 1, −1, 1, −1, 1, −1, −1, 1, 1, 1, 1, −1,
−1, 1, −1, −1, 1, 1, −1, −1, −1, 1, −1, 1, 1, 1, 1, −1,
1, −1, 1, 1, −1, −1, −1, 1, −1, 1, 1, −1, 1, 1, −1, 1, 1,
1, 1, 1, 0, 0, 1, 0, −1, 1, 1, 1, 1, −1, −1, 1, −1, 1, 1,
−1, −1, 0, −1, 1, −1, 1, −1, −1, −1, 1, −1, 1, −1, 1, 1,
1, −1, 1, 1, 1, 0, 1, 1, −1, −1}; or
{1, 0, 1, 1, −1, 1, −1, −1, 1, 1, 1, −1, 0, 1, −1, −1, −1, 1,
1, −1, −1, −1, 1, 1, 1, 1, 1, 1, 1, 1, −1, 0, −1, −1, 1, −1,
1, −1, 1, 1, 1, −1, 1, −1, 1, 1, 1, 1, −1, 0, 1, −1, 1, −1, 1,
1, −1, 1, −1, 1, 1, 1, 1, 1, −1, 1, 1, 1, −1, 1, 1, −1, 1,
−1, 1, −1, 1, 1, −1, 1, 1, −1, 1, −1, 1, −1, −1, 1, 1, −1, 1,
−1, 1, −1, 1, 1, 1, 0, 1, 1, −1, −1, 1, −1, 1, 1, −1, 1,
1, 1, 1, 1, 1, −1, 1, −1, 1, −1, 1, 1, −1, 1, −1, 1, −1, 1,
−1, 1, 1, 1, −1, 1, −1, 1, −1, −1, −1, 1, 1, 1, 0, 1, 1, −1,
−1, 1, 1, −1, 1, −1, 1, −1, −1, 1, 1, −1, 1, −1, 1,
1, −1, 1, −1, 1, −1, −1, 1, 1, −1, 1, 1, 1, −1, 1, −1, 1,
1, 1, −1, −1, 1, 1, −1, 1, 1, −1, −1, −1, −1, 1,
−1, 1, 1, 1, −1, 1, 1, −1, 1, 1, 1, −1, 1, −1, 1, −1, 1,
1, −1, 1, 1, 1, 1, −1, 1, −1, 1, −1, 1, −1, 1, 1, 1, 1, −1,
1, 1, −1, −1, 1, 1, 1, 1, −1, 1, −1, 1, −1, 1, 1, −1, 1,
1, 1, 1, 1, −1, −1, −1, 1, −1, −1, −1, 1, 1, −1, 1,
1, −1, 1, 1, 1, −1, 1, −1, 1, 1, 1, 1, 1, 1, −1, 1, 1,
1, 1, −1, 1, −1, 1, 1, 1, 1, 1, −1, 1, 1, 1, 1, −1, 1,
1, 1, −1, −1, 1, 1, 1, 0, 1, 1, 1, 1, −1, −1, −1, 1, 0, −1,
1, 1, −1, 1, −1, −1, −1, −1, 1, 1, −1, 1, −1, 1, 1, −1, 1,
−1, −1, 0, 1, −1, −1, 1, 1, −1, 1, −1, 1, 1, −1, 1, −1, 1,
−1, 1, 1, 1, 1, 0, 1, 1, −1, 1, 1, 1, −1, 1, 1, −1, 1, 1,
−1, −1, −1, 1, 1, 1, −1, 1, 1, 1, 1, 1, 1, 1, 1, 1,
1, 1, −1, −1, 1, 1, −1, 0, −1, −1, 1, 1, −1, 1, 0, 1, 1,
−1, 1, 1, −1, −1, −1, 1, −1, −1, 1, −1, 1, −1, −1, 1, 1,
1, −1, −1, −1, 1, −1, 1, −1, 1, 1, −1, −1, 1, 1, 1, −1,
1, 1, 1, −1, −1, 1, 1, 1, 1, 1, 1, −1, 1, 1, 1, −1,
−1, 1, 1, 1, −1, −1, −1, −1, 1, −1, 1, 1, −1, 1, 1,
1, −1, 1, −1, 1, −1, 1, −1, 1, 1, −1, 1, 1, 1, −1, 1,
1, 1, 1, −1, −1, 1, −1, 1, 1, 1, 1, 1, 1, 1, 1,
1, 1, −1, 0, −1, −1, 1, 1, 1, 0, 0, 1, 0, −1, 1, 1, −1, 1, −1,
1, −1, 1, 1, 1, −1, 0, 1, −1, 1, −1, −1, −1, 1, 1, 1, 1,
−1, −1, −1, 1, 1, −1, 1, 1, 1, −1, 1, −1, 1, −1, 1, 1, 1, 1,
1, −1, 1, −1, 1, 1, 1, −1, 1, 1, −1, 1, 1, 1, 0, −1,
1, 1, 1, 1, −1, −1, −1, −1, 1, 1, −1, 1, −1, 1, −1, 1, 1, 1, 1, 1, 0, 1, 1, −1, 1, 1, 1, −1, 1, −1, 1, 1, −1, 0, 1, −1,
−1, 1, −1, −1, 1, 1, 1, −1, −1, −1, 1, 1, −1, 1, 1, 1, −1,
−1, −1, 1, 1, 1, −1, −1, 1, −1, 1, −1, −1, −1, −1, −1, 1,
1, 1, 1, 1, 1, 1, 1, −1, −1, 1, 1, −1, 1, 1, −1, 1, −1, −1,
−1, −1, 0, 1, −1, −1, 1, 1, 1, −1, −1, −1, 1, −1, 1, 1, −1,
−1, 1, 1, −1, −1, −1, 1, 1, −1, −1, −1, −1, −1, 0, −1, −1,
1, 1, 1, −1, 1, 1, 1, 1, −1, 0, 1, 1, −1, 1, −1, 1, −1, −1,
−1, −1, 1, 1, −1, 1, −1, 1, 1, −1, 1, −1, −1, −1, −1, 0, 1,
−1, −1, −1, 1, 1, 1, −1, −1, −1, −1, −1, −1, 1, 1, 1,
1, 1, −1, 1, −1, −1, 1, −1, −1, 1, 1, −1, −1, 1, 0, 1, 1, −1,
1, −1, −1, 1, −1, 1, 1, 1, 1, −1, −1, −1, −1, 1, 1, −1, −1,
−1, −1, 1, −1, −1, −1, 1, 1, 1, 1, −1, 1, 1, −1, 1, −1, −1, 1,
−1, −1, −1, 1, −1, −1, −1, −1, −1, 1, 1, 1, 0, 1, 1, −1, 1,
−1, 1, −1, 1, −1, −1, −1, 1, 1, 1, −1, −1, 1, 1, 1, −1, 1,
−1, −1, −1, −1, 1, −1, 1, 1, −1, −1, 1, −1, −1, −1, −1, −1,
1, 1, −1, 1, −1, 1, −1, −1, 1, −1, −1, −1, 1, 0, 1, 1, −1,
1, 1, −1, 1, 1, 1, 0, −1, 1, 1, −1, −1, −1, 1, −1, 1, 1, −1,
1, 1, 1, 1, −1, −1, 1, −1, −1, 1, 1, 1, −1, 1, −1, −1, −1,
0, −1, −1}.

With reference to any one of the third aspect, the fourth aspect, the seventh aspect, and the eighth aspect, in some implementations of any one of the third aspect, the fourth aspect, the seventh aspect, and the eighth aspect, the third sequence is a sequence consisting of 1, 0, and −1, the constant value is 0, the third sequence is generated based on a sixth sequence and a seventh sequence, a length $L_1$ of the sixth sequence and a length $L_2$ of the seventh sequence are mutually prime, both the sixth sequence and the seventh sequence are sequences including 1, 0, and −1, a $j^{th}$ element in the third sequence is obtained by multiplying a element in an eighth sequence by a $j^{th}$ element in a ninth sequence, the eighth sequence is obtained by using $L_2$ copies of the sixth sequence, the ninth sequence is obtained by using $L_1$ copies of the seventh sequence, lengths of the third sequence, the eighth sequence, and the ninth sequence are all $L_1*L_2$, and a value off is 1, 2, . . . , $L_1*L_2$.

With reference to any one of the third aspect, the fourth aspect, the seventh aspect, and the eighth aspect, in some implementations of any one of the third aspect, the fourth aspect, the seventh aspect, and the eighth aspect, a channel number of the target channel is any one of 0 to 15, and the third sequence is any one of the following:

{−1, 0, −1, 1, 0, 1, −1, 0, −1, −1, 0, 1, −1, 0, −1, 1, 0, −1,
1, 0, 1, −1, 0, 1, −1, 0, −1, 1, 0, 1, 1, 0, 1, 1, 0, −1, 1,
0, 0, 1, 0, −1, 1, 0, 1, −1, 0, 0, 1, 0, −1, 1, 0, −1, −1, 0,
−1, 1, 0, −1, 0, 0, 1, 0, 0, −1, 1, 0, 1, −1, 0, 0, −1, 0, 1,
1, 0, 1, 0, 0, 1, −1, 0, 1, −1, 0, 1, 1, 0, 1, 0, 0, 0, 1, 0,
1, 1, 0, 1, 1, 0, −1, 1, 0, −1, 1, 0, 1, −1, 0, 1, −1, 0, 1,
1, 0, 1, 1, 0, 1, 1, 0, −1, −1, 0, 1, −1, 0, 0, 0, 0, −1, −1,
0, 0, −1, 0, 1, 0, 0, −1, 1, 0, 1, −1, 0, −1, 1, 0, −1, −1,
0, 1, −1, 0, 1, −1, 0, 1, −1, 0, −1, 0, 0, −1, −1, 0, −1, 1,
0, −1, −1, 0, 1, 1, 0, −1, −1, 0, 1, 1, 0, 1, 0, 0, 1, 1, 0,
1, −1, 0, −1, −1, 0, 1, 1, 0, 1, 1, 0, −1, −1, 0, −1, 1, 0,
1, −1, 0, 1, 1, 0, −1, 1, 0, 1, 1, 0, −1, 0, 0, 1, −1, 0, −1,
0, 0, −1, 1, 0, −1, 1, 0, 1, 1, 0, 1, 1, 0, 1, −1, 0, 0, −1,
0, 0, 1, 0, −1, −1, 0, −1, −1, 0, 1, 1, 0, 1, −1, 0, 0, 1, 0,
−1, 1, 0, 1, 1, 0, 1, 1, 0, 0, −1, 0, 1, 1, 0, −1, −1, 0, 1,
−1, 0, −1, −1, 0, 1, 1, 0, 1, 1, 0, −1, −1, 0, −1, −1, 0, 1,
1, 0, −1, 1, 0, −1, 1, 0, 1, 1, 0, 0, 1, 0, 1, 1, 0, −1, −1,
0, 0, 1, 0, 1, 1, 0, 1, −1, 0, 1, 1, 0, 1, 0, 0, −1, 0, 0, 1,
1, 0, −1, −1, 0, 0, −1, 0, −1, 1, 0, −1, 0, 0, −1, −1, 0, −1,
−1, 0, −1, 1, 0, −1, 0, 0, 0, 1, 0, −1, 1, 0, −1, 1, 0, 1, 1,
0, 1, 1, 0, −1, −1, 0, −1, −1, 0, 1, 0, −1, 1, 0, −1, 1, 1,
0, 1, −1, 0, −1, −1, 0, 0, 0, 1, −1, 0, 0, −1, 0, −1, 0, 1, 0,
0, −1, −1, 0, 1, 0, 0, 1, −1, 0, 1, 1, 0, 1, −1, 0, −1, 1, 0,
1, −1, 0, −1, 1, 0, −1, 0, 0, 1, 1, 0, −1, 0, 1, −1, 0,
−1, 1, 0};

{−1, 1, 0, −1, 1, 0, 1, −1, 0, 1, 1, 0, −1, −1, 0, −1, 1, 0,
1, 1, 0, −1, 1, 0, 1, 0, 0, −1, −1, 0, 1, 0, 0, 1, 1, 0, 1, 1,
0, −1, 1, 0, −1, 1, 0, −1, −1, 0, 0, −1, 0, 0, 1, 0, 1, −1,
0, 1, −1, 0, −1, 1, 0, −1, −1, 0, 0, 1, 0, 1, 1, 0, −1, 1, 0,
−1, 1, 0, 0};

{1, 0, 1, 1, 0, 0, 1, −1, −1, −1, −1, 0, 0, 0, 0, 0, 0, 1, 1,
0, 1, 0, 0, 0, 0, 0, 0, −1, 0, 0, −1, 0, 1, 1, 0, 0, 0, 1, −1,
−1, −1, 0, 0, 0, 1, −1, 0, 0, 1, 0, 0, −1, 0, −1, 0, 0, 0, 0,
0, 0, 0, 1, 0, −1, 0, 0, 0, 1, 1, 0, 1, −1, 0, 0, 0, 1, 0, 0,
−1, 0, 0, 0, 0, 0, 1, 0, 0, 0, 0, 1, 0, 0, −1, 0, 1, −1, 0, 0,
1, 1, −1, 1, 0, 0, 0, 0, 1, −1, 0, 0, −1, 1, 0, 0, 0, 0, 0, 0,
0, 0, −1, 0, 0, 1, 0, −1, 1, 0, 0, −1, 0, −1, 1, −1, 0, 0, 0,
1, −1, 0, −1, −1, 0, 0, −1, 0, 0, 0, 0, 0, 0, −1, 0, 0, 0, 0,
1, 0, 0, 0, 1, −1, 1, 0, −1, 0, 0, 0, 0, 1, 0, −1, −1, 1, 0,
0, 0, 1, 0, 0, 0, 0, 1, 0, 0, 1, 0, 0, −1, 0, 0, −1, 1, −1, −1,
1, 0, 0, 0, 1, 1, 0, 1, −1, 1, 0, −1, 0, 0, 0, 0, 0, 0, 1, 0,
0, −1, 0, 1, 1, 0, 0, 1, 0, 1, 1, −1, 0, 0, 0, 1, 1, 0, 1, 0,
−1, 0, −1, 0, 1, 0, 0, 0, 0, 0, 0, 0, 0, 0, −1, 1, 0, 0, 0, −1,
−1, 0, 1, 0, 0, 0, −1, 0, 0, 1, −1, −1, 0, 1, 0, 1, 0, 0, 0, 0,
0, −1, 0, 0, 0, 0, 0, −1, 0, 0, 1, 1, 0, −1, −1, 0, 0, 0, 1,
−1, 0, 0, −1, −1, 0, 1, 0, −1, 0, 0, 0, 0, −1, 0, 0, −1, 0,
0, −1, 0, 0, −1, 1, −1, 1, 0, 0, 0, 0, −1, 1, 0, −1, 1, 0, 0,
1, 0, −1, 0, 0, 0, 0, 1, 0, 0, 0, 0, −1, 0, 0, 0, 0, −1, 1, 1,
−1, 0, 0, 0, 1, 0, 0, 1, −1, 1, 0, 0, 0, −1, 0, 0, 0, 0, −1,
0, 0, 1, 0, 0, 0, 0, 0, −1, 0, −1, 1, 0, 0, 0, 0, 0, −1, 0, 0,
1, −1, 0, −1, 0, 0, 0, 0, 0, 0, 0, −1, 0, −1, 1, 0, 0,
−1, 0, 0, 0, −1, 0, 0, 1, 0, −1, 1, 0, 0, 0, 1, 1, 0, 0, 0, 0, 0,
−1, 1, 0, 1, 0, 1, 0, 0, 0, −1, 0, 0, 0, −1, 0, 0, 1, 0, 1,
1, 0, 0, −1, 1, 0, 1, 1, 0, 0, 0, 0, −1, 0, 1, −1, −1, 0, −1,
0, 0, 0, 0, 0, 1, 0, 0, 1, 0, 1, 0, 0, 0, −1, 1, 1, 1, 0, 0,
0, 0, 0, −1, 0, −1, 1, −1, 0, 1, 0, 1, 0, 0, 0, 0, −1, 0, 0,
0, 0, 1, 1, 0, 0, 1, 1, 1, 1, 1, 1, 0, 0, 0, −1, 0, 0, −1, 0, 1,
0, 1, 0, −1, 0, 0, 0, 0, 1, 0, 0, −1, 0, 0, 1, 0, 0, 1, 0, −1,
1, 1, 0, 0, 0, 0, 1, 0, 0, 0, 1, 0, −1, 0, −1, 0, 0, 0, 0, −1,
0, 0, 1, 0, −1, −1, 0, 0, 1, 1, −1, 0, −1, 0, 0, 0, −1, 1, 0,
1, 1, 0, 0, −1, 0, 1, 0, 0, 0, 0, 0, 0, 0, 1, 1, 0, 0, 0, 0,
1, −1, 1, −1, 0, 0, 0, −1, 1, 0, 1, 0, −1, 0, 0, 0, 0, 1, 0, 0,
0, 0, −1, 0, 0, −1, 0, 0, −1, 0, 0, −1, −1, 0, 1, −1, 0, 0,
0, 1, 1, 0, 1, 1, −1, 0, 1, 0, 0, 0, 0, 0, 1, 0, 0, 1, 0, −1,
1, 0, 0, 1, 1, 1, −1, 0, 0, 0, 0, 1, 0, 0, 1, 1, −1, 0, 1, 0,
−1, 0, 0, 0, 0, 0, 0, 1, 0, 1, 0, 0, 0, 0, −1, −1, 1, 1, 0,
0, 0, 1, 1, 0, 0, −1, −1, 0, 1, 0, −1, 0, 0, 0, 0, 0, 0, 0, −1,
0, 1, 1, 0, 0, −1, 1, 0, −1, −1, 0, 0, 0, 0, 1, 0, 1, −1, 0,
0, 1, 0, −1, 0, 0, 0, 0, 0, 1, 0, −1, 0, −1, −1, 0, 0, 0, 1, 0,
1, 1, 0, 0, 0, 0, −1, −1, 0, 1, −1, −1, 0, 0, 0, −1, 0, 0, 0,
0, 0, 0, 0, 0, −1, 0, 0, 0, 1, 1, −1, 0, 1, 0, 0, 0, 0, 1, 1,
0, −1, 0, −1, 0, 1, 0, 0, 0, 0, 0, 1, 0, 0, 1, 0, 0, 0, 0,
0, −1, −1, −1, 1, −1, 0, 0, 0, 0, −1, 0, 1, 1, 1, 0, 1, 0, −1,
0, 0, 0, 0, 1, 0, 0, 1, 0, 1, −1, 0, 0, −1, 0, 1, −1, −1, 0,
0, 0, −1, 1, 0, −1, −1, −1, 0, −1, 0, 1, 0, 0, 0, 0, −1, 0,
0, 1, 0, 1, 0, 0, 0, 0, 0, 1, 0, 1, 0, 0, 0, 1, 0, 0, 1, 0, 1,
0, 1, 0, 1, 0, 0, 0, 0, −1, 0, 0, 1, 0, 1, −1, 0, 0, 1, −1, 0,
0, 1, 0, 0, 0, 1, 1, 0, 0, 1, −1, 0, −1, 0, −1, 0, 0, 0, 0, −1,
0, 0, 0, 0, 1, −1, 0, 0, 1, 0, −1, −1, 0, 0, 0, 0, −1, −1, 0,
1, −1, 0, 0, 1, 0, 1, 0, 0, 0, 0, 0, 0, 1, 0, 0, 1, 0, 0, 1,
−1, −1, 0, −1, 0, 0, 0, −1, 0, 0, −1, −1, −1, 0, 0, 0, −1,
0, 0, 0, 0, 1, 0, 0}; or

{1, 0, 1, 1, 0, −1, 0, 1, −1, 1, 0, 0, −1, −1, 0, 0, 0, 0, 1, −1,
−1, 1, 1, 0, 1, −1, 0, −1, 1, 0, 0, −1, 0, 1, 1, 1, −1, 0, −1,
−1, 1, 0, −1, −1, 0, 1, 1, 0, 0, 1, 0, 1, −1, 1, 1, −1, 0, −1,
1, 0, 0, 0, 1, 0, −1, 0, 1, −1, 0, −1, 0, −1, 0, −1, −1, −1,
1, 0, 0, −1, 0, 0, 1, 0, −1, −1, −1, 1, 0, −1, 0, 0, −1,
0, 1, −1, −1, 0, 0, −1, −1, 0, 1, −1, 1, 1, 0, 0, −1,
−1, 0, 0, −1, 0, 1, 1, 1, 1, 0, 0, 0, 1, 0, −1, 1, 1, 1, 1, 0, 0,
−1, −1, 0, 1, 0, 1, 1, 1, 0, −1, −1, 0, −1, −1, 0, 0, 1, 0,
−1, −1, 1, 0, 0, 0, 0, 0, 1, 0, −1, −1, 0, 1, 1, 0, 0, 1, −1, 1,

0, −1, 0, −1, −1, −1, −1, 0, 1, −1, 0, 0, −1, 0, −1, 0, 0,
1, 0, 0, −1, 1, 0, 0, −1, −1, 1, 0, 0, −1, 1, 1, −1, 0, 1, −1,
−1, −1, −1, 1, 0, −1, 1, 0, 0, −1, 0, 0, −1, 0, 1, 1, 0, 1,
0, 0, 1, −1, 0, −1, 1, 0, 1, −1, 0, 1, 0, 1, −1, −1, 1, −1,
−1, 0, 1, −1, 0, 0, 0, 0, 0, −1, 1, 1, −1, 0, 1, −1, 0, 0, 1,
−1, −1, −1, 0, 0, 1, −1, 1, 0, 1, 1, −1, −1, 1, 1, 0, 1, 0,
0, 0, 0, 0, −1, −1, −1, 0, −1, 0, 1, 0, 0, 1, 1, 1, 1, 0, 0,
−1, 1, −1, 1, 0, 1, −1, 1, 1, −1, 1, 0, 0, −1, 0, 0, −1, 0,
1, 0, −1, −1, −1, 0, −1, −1, 0, −1, −1, 0, −1, 1, 0, −1, 1,
1, 1, 0, −1, 1, −1, 1, 0, 0, 0, 0, −1, 0, 0, 1, 0, 1, 1, −1,
0, 1, 0, −1, 1, 0, 0, 1, −1, −1, 1, 0, 1, 1, −1, −1, 0, 1, 1,
0, 0, −1, 0, 0, 1, −1, 0, 0, 1, 0, 1, 0, 1, −1, 1, 0, 1, 0, 0,
1, 1, −1, −1, −1, 0, −1, −1, 1, 1, 0, 0, 0, −1, 0, −1, 1, 0,
−1, 0, 0, 0, 1, 0, −1, 1, 1, 1, −1, 0, −1, −1, 0, 1, 1, 1, −1,
1, 0, 1, 1, 1, 0, 0, 1, 0, −1, 1, −1, −1, 0, −1, 1, 0, 0, −1,
0, −1, −1, −1, 0, 1, 0, −1, −1, 0, −1, 1, −1, 1, −1, 0, 1,
0, 0, 1, 0, 1, 1, −1, −1, 0, −1, 0, −1, 0, 0, 0, −1, 0, 1, 0,
1, −1, 1, 0, −1, 1, 0, 1, −1, 1, −1, −1, 0, 0, 1, 0, 1, 0, 1,
−1, 0, −1, 1, −1, 0, 1, 1, 0, 0, 1, 0, −1, 1, 1, −1, 1, 0, −1,
−1, 0, −1, 1, 1, 0, 0, 0, 0, 1, 1, 1, 0, 0, −1, 1, −1, 0, 1,
0, 1, −1, 0, 0, −1, 0, −1, 1, 1, 1, 1, 0, 1, 1, 0, −1, 0, 0,
−1, 0, 0, 1, 1, −1, 0, 0, −1, −1, 0, 1, 1, 1, 0, −1, 0, 0, 0,
−1, 0, −1, −1, 1, −1, 1, 0, −1, 1, 0, 0, 1, 0, −1, −1, 0, −1,
0, −1, −1, 0, 0, 1, 1, 1, −1, −1, 0, 1, 1, 0, 0, −1, 0, −1,
1, −1, 1, 1, 0, 0, 0, 0, 0, 1, 1, −1, 1, 0, −1, −1, −1, 0, 0,
−1, 1, −1, −1, 0, 1, 0, 1, 1, 0, 0, −1, 0, 1, −1, 1, 1, 0, 0,
−1, 0, 0, −1, 1, −1, 0, 1, 0, −1, 0, 1, −1, 0, 1, −1, 0, 1,
1, 1, 0, 1, −1, 0, 0, 1, 0, −1, −1, 0, 0, 1, 0, −1, 1, 0, 1,
0, −1, 1, 1, 0, 1, −1, 1, 1, 0, 0, 1, 1, 1, 1, 1, 0, 1, 1, 0,
0, −1, 0, 0, 0, 1, 0, 1, 0, −1, −1, 0, 1, −1, −1, 0, −1, 0,
1, 1, −1, 0, 0, −1, 1, 1, 1, −1, 1, 0, −1, −1, 0, 0, 0, 0, −1,
0, 1, 1, 1, 0, 0, −1, 0, 1, 0, 1, 1, −1, 0, −1, 0, 1, −1, 0,
−1, 1, −1, 1, 1, −1, 0, 1, −1, 0, 0, −1, 0, −1, −1, 1, −1,
0, 0, 1, −1, 0, −1, −1, 1, −1, 1, 0, 1, −1, 1, −1, 0, 1, 1,
1, −1, −1, 1, 0, 0, 0, 0, 0, −1, 0, −1, 1, 0, 1, −1, 0, 0, 1,
0, −1, 1, −1, 0, −1, 0, 1, −1, 1, 1, 0, −1, −1, −1, 1, −1,
0, 0, 1, 0, 0, 0, −1, 0, 0, 1, 1, −1, 0, 0, 1, 1, 0, 1, 0, 1,
1, −1, 0, 1, 1, 1, −1, 0, 1, 1, −1, 0, 0, 1, 0, 1, −1, 0, 0,
0, 0, 1, 1, 0, 1, −1, 0, −1, −1, 0, −1, −1, 1, 1, −1, 0, 1,
−1, −1, 1, 0, 1, 0, 0, 1, 0, 1, 0, 1, 1, 0, 0, 1, 0, 0, −1, −1,
1, 1, 0, 0, 1, 0, −1, −1, 1, −1, −1, 0, −1, 1, 1, 1, 0, 0, 1,
0, 1, −1, 1, 0, 0, 1, 0, 0, 0, 0, 1, −1, 1, −1, 0, 0, 1, 1, 0,
−1, 1, 1, 1, 1, 0, 1, 1, 0, 0, 0, 0, 1, −1, 1, 1, 0, 0, −1, 1,
0, 0, 1, 0, −1, 1, 0, 1, −1, 0, 1, 1, 0, −1, −1, −1, −1, −1,
0, 0, 0, 1, 0, 0, 1, 1, 1, 0, 1, −1, 0, 0, −1, 0, 0, −1, 0, 0,
−1, −1, 1, −1, 0, −1, 1, 0, 1, 1, 1, −1, 0, 0}.

According to a ninth aspect, an apparatus is provided. The apparatus includes a processor. The processor is coupled to a memory, and may be configured to execute instructions in the memory, so that the apparatus performs the method according to any one of the first aspect to the fourth aspect or the possible implementations of the first aspect to the fourth aspect. Optionally, the apparatus further includes the memory. Optionally, the apparatus further includes an interface circuit, and the processor is coupled to the interface circuit.

According to a tenth aspect, a processor is provided. The processor includes an input circuit, an output circuit, and a processing circuit. The processing circuit is configured to receive a signal through the input circuit, and transmit a signal through the output circuit, so that the processor performs the method according to any one of the first aspect to the fourth aspect or the possible implementations of the first aspect to the fourth aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and various circuits are not limited in this embodiment of this application.

According to an eleventh aspect, an apparatus is provided. The apparatus includes a processor and a memory. The processor is configured to: read instructions stored in the memory, receive a signal through a receiver, and transmit a signal through a transmitter, to perform the method according to any one of the first aspect to the fourth aspect or the possible implementations of the first aspect to the fourth aspect.

Optionally, there are one or more processors, and there are one or more memories.

Optionally, the memory may be integrated with the processor, or the memory and the processor are separately disposed.

The processing apparatus according to the eleventh aspect may be a chip. The processor may be implemented by using hardware or software. When the processor is implemented by using hardware, the processor may be a logic circuit, an integrated circuit, or the like; or when the processor is implemented by using software, the processor may be a general-purpose processor, and is implemented by reading software code stored in the memory. The memory may be integrated into the processor, or may exist independently outside the processor.

According to a twelfth aspect, a computer program product is provided. The computer program product includes a computer program (also referred to as code or instructions). When the computer program is run, a computer is enabled to perform the method according to any one of the first aspect to the fourth aspect or the possible implementations of the first aspect to the fourth aspect.

According to a thirteenth aspect, a computer-readable medium is provided. The computer-readable medium stores a computer program (also referred to as code or instructions). When the computer program is run on a computer, the computer is enabled to perform the method according to any one of the first aspect to the fourth aspect or the possible implementations of the first aspect to the fourth aspect.

According to a fourteenth aspect, this application provides a chip system. The chip system includes a processor and an interface, and is configured to support a communication apparatus in implementing the functions according to any one of the first aspect to the fourth aspect or the possible implementations of the first aspect to the fourth aspect. In a possible design, the chip system further includes a memory. The memory is configured to store information and data that are necessary for the communication apparatus. The chip system may include a chip, or may include a chip and another discrete component.

According to a fifteenth aspect, a communication system is provided, including the apparatus according to any one of the fifth aspect and the sixth aspect or the possible implementations of the fifth aspect and the possible implementations of the sixth aspect, or including the apparatus according to any one of the seventh aspect and the eighth aspect or the possible implementations of the seventh aspect and the possible implementations of the eighth aspect.

DESCRIPTION OF EMBODIMENTS

Figure 1:
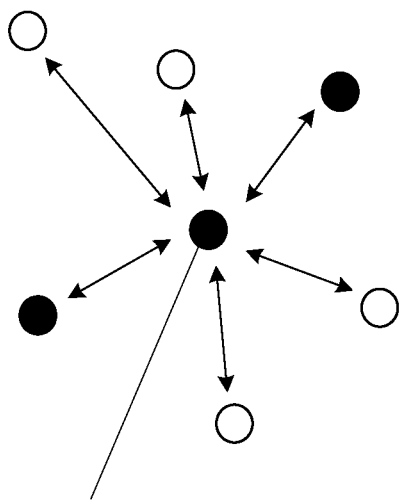
FIG. 1 is a schematic diagram of two application scenarios according to this application.
Figure 1:
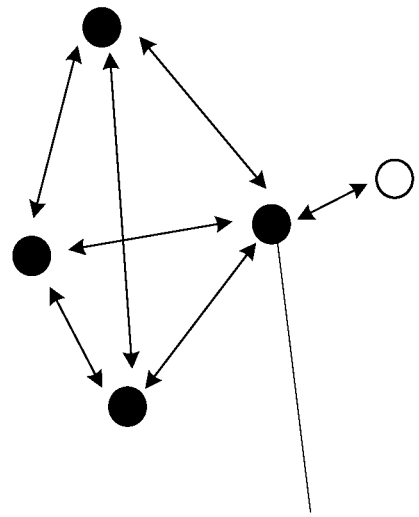

The following describes technical solutions in embodiments of this application with reference to the accompanying drawings.

Embodiments of this application may be applied to a wireless personal area network (WPAN). Currently, a standard used for the WPAN is the institute of electrical and electronics engineers (IEEE) 802.15 series. The WPAN may be used for communication between digital auxiliary devices in a small range, such as a telephone, a computer, and an auxiliary device, and a working range of the WPAN is usually within 10 m. Technologies supporting the wireless personal area network include Bluetooth, ZigBee, ultra-wideband (UWB), IrDA infrared connection technology (infrared), HomeRF, and the like. From a perspective of network composition, the WPAN is located at a bottom layer of an entire network architecture and is used for a wireless connection between devices in a small range, that is, a point-to-point short-distance connection. The WPAN may be considered as a short-distance wireless communication network. Based on different application scenarios, WPANs are further classified into a high rate (HR)—WPAN and a low rate—WPAN. The HR-WPAN may be used to support various high-rate multimedia applications, including high-quality sound image delivery, multi-megabyte music and image document transmission, and the like. The LR-WPAN may be used for common services in daily life.

In the WPAN, devices may be classified into a full-function device (FFD) and a reduced-function device (RFD) based on communication capabilities of the devices. The FFD can communicate with each other, and the FFD and the RFD can communicate with each other. The RFD cannot directly communicate with each other, and can only communicate with the FFD, or forward data to the outside through one FFD. The FFD associated with the RFD is referred to as a coordinator of the RFD. The RFD is mainly used for a simple control application, such as a light switch and a passive infrared sensor. A small amount of data is transmitted, and a small quantity of transmission resources and communication resources are occupied. Therefore, costs of the RFD are low. The coordinator may also be referred to as a personal area network (PAN) coordinator, a central control node, or the like. The PAN coordinator is a main control node of an entire network, and each ad hoc network can have only one PAN coordinator which has member identity management, link information management, and a packet forwarding function. Optionally, the device in embodiments of this application may be a device that supports a plurality of WPAN standards, such as 802.15.4a, 802.15.4z, and a currently discussed version or a later version.

In embodiments of this application, the device may be a communication server, a router, a switch, a bridge, a computer, a mobile phone, a home smart device, a vehicle-mounted communication device, or the like.

In embodiments of this application, the device includes a hardware layer, an operating system layer running above the hardware layer, and an application layer running above the operating system layer. The hardware layer includes hardware such as a central processing unit (CPU), a memory management unit (MMU), and a memory (also referred to as a main memory). An operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of the method provided in embodiments of this application is not specially limited in embodiments of this application, provided that a program that records code of the method provided in embodiments of this application can be run to perform communication according to the method provided in embodiments of this application. For example, the method provided in embodiments of this application may be performed by the FFD or the RFD, or a functional module that can invoke and execute the program in the FFD or the RFD.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk or a magnetic tape), an optical disc (for example, a compact disc (CD), a digital versatile disc (DVD)), a smart card and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel, and various other media that can store, contain and/or carry instructions and/or data.

Embodiments of this application is further applicable to a wireless local area network system, for example, an internet of things (IoT) network or a vehicle-to-everything (Vehicle to X, V2X) network. Certainly, embodiments of this application are further applicable to other possible communication systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) communication system, and a future sixth generation (6G) communication system.

The foregoing communication systems to which this application is applicable are merely examples for description, and communication systems to which this application is applicable are not limited thereto. This is stated herein once for all, and is not repeated below.

FIG. 1 is a schematic diagram of two application scenarios according to this application. In a system 101 shown in (A) in FIG. 1, a plurality of FFD and a plurality of RFD form a communication system with a star topology, where one FFD is a PAN controller. In the communication system with the star topology, the PAN controller performs data transmission with one or more other devices, that is, a one-to-many or many-to-one data transmission architecture may be established between a plurality of devices. In a system 102 shown in (B) in FIG. 1, a plurality of FFD and one RFD form a communication system with a peer-to-peer topology, where one FFD is a PAN controller. In the communication system with the peer-to-peer topology, a many-to-many data transmission architecture may be established between a plurality of different devices.

It should be understood that (A) in FIG. 1 and (B) in FIG. 1 are merely simplified schematic diagrams for ease of understanding, and do not constitute a limitation on an application scenario of this application. For example, the system 101 and/or the system 102 may further include another FFD and/or another RFD.

In a WPAN, in a UWB technology, nanosecond-level non-sinusoidal wave narrow pulses are used to transmit data, and occupy a wide frequency spectrum range. Due to a very narrow pulse and very low radiation spectrum density, the UWB technology has advantages of a strong multipath resolution capability, low power consumption, high confidentiality, and the like. Currently, the UWB technology has been written into the IEEE 802 series wireless standards, and the UWB technology-based WPAN standard IEEE 802.15.4a and its evolution version IEEE 802.15.4z have been released. Currently, formulation of the next-generation WPAN standard 802.15.4ab of the UWB technology has been put on the agenda.

In the UWB technology, there is no need to use a carrier in a conventional communication standard, but data is transmitted by transmitting and receiving very narrow pulses at the level of a nanosecond or less than a nanosecond. Therefore, synchronization between a transmitting device and a receiving device is very important in the UWB technology. The synchronization between the transmitting device and the receiving device may be understood as that a PPDU is sent in a form of a pulse signal, and a receiving end determines a specific pulse signal that is from a plurality of received pulse signals and from which a PPDU to be received by the receiving end starts. Currently, the synchronization between the transmitting device and the receiving device is mainly implemented by using a synchronization header (SHR) in a physical layer protocol data unit (PPDU). Specifically, the receiving end may perform correlation detection on the synchronization header based on a synchronization sequence, to determine the specific pulse signal that is from the plurality of received pulse signals and from which the PPDU to be received by the receiving end starts.

Figure 2:
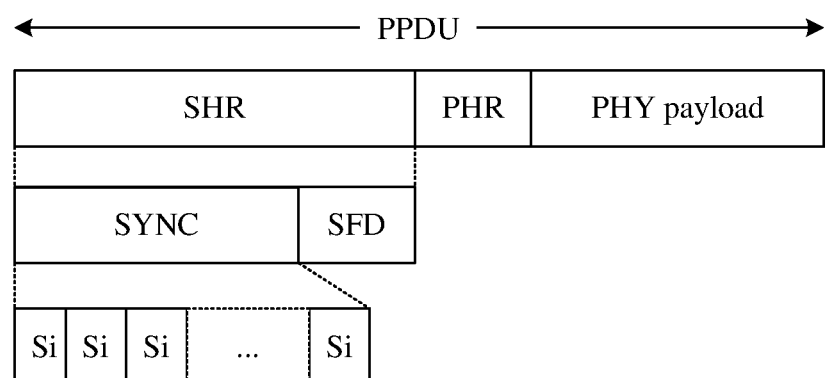
FIG. 2 is a schematic diagram of a structure of a PPDU according to an embodiment of this application.

FIG. 2 is a schematic diagram of a structure of a PPDU defined in a standard in a UWB system. As shown in FIG. 2, the PPDU includes an SHR, a physical header (PHR), and a physical layer (PHY) payload field. The SHR is used by a receiving end to perform PPDU detection and synchronization. Specifically, the receiving end may detect, based on the SHR, whether a transmitting end sends a PPDU and a start location of the PPDU, where the PHR carries physical layer indication information, for example, modulation and coding information, a PPDU length, and a receiver of the PPDU, to assist the receiving end in correctly demodulating data, and the physical layer payload field carries transmitted data. FIG. 2 further shows a specific structure of the SHR. The SHR includes a synchronization (SYNC) field and a start-of-frame delimiter (SFD) field. The SYNC field includes a plurality of repeated basic symbols $S_i$. The basic symbol $S_i$ is generated based on a preamble sequence. The preamble sequence is a ternary sequence consisting of three values $\{-1, 0, 1\}$, and is also referred to as an Ipatov sequence. Currently, lengths of the preamble sequence defined in the standard 802.15 include 31, 91, and 127. Table 1, Table 2, and Table 3 show some Ipatov sequences with lengths of 31, 91, and 127 respectively.

TABLE 1

Some Ipatov sequences with a length of 31

| Code index | Code sequence | Channel number |
|---|---|---|
| 1 | $\{-1, 0, 0, 0, 1, 0, -1, 0, 1, 1, 1, 0, 1, -1, 0, 0, 0,$ $1, -1, 1, 1, 1, 0, 0, -1, 1, 0, -1, 0, 0\}$ | 0, 1, 8, and 12 |
| 2 | $\{0, 1, 0, 1, -1, 0, 1, 0, 1, 0, 0, 0, -1, 1, 1, 0, -1,$ $1, -1, -1, -1, 0, 0, 1, 0, 0, 1, 1, 0, 0, 0\}$ | 0, 1, 8, and 12 |
| 3 | $\{-1, 1, 0, 1, 1, 0, 0, 0, -1, 1, -1, 1, 1, 0, 0, 1, 1, 0,$ $1, 0, 0, -1, 0, 0, 0, 0, -1, 0, 1, 0, -1\}$ | 2, 5, 9, and 13 |
| 4 | $\{0, 0, 0, 0, 1, -1, 0, 0, -1, 0, 0, -1, 1, 1, 1, 1, 0,$ $1, -1, 1, 0, 0, 0, 1, 0, -1, 0, 1, 1, 0, -1\}$ | 2, 5, 9, and 13 |
| 5 | $\{-1, 0, 1, -1, 0, 0, 1, 1, 1, -1, 1, 0, 0, 0, -1, 1,$ $0, 1, 1, 1, 0, -1, 0, 1, 0, 0, 0, 0, -1, 0, 0\}$ | 3, 6, 10, and 14 |
| 6 | $\{1, 1, 0, 0, 1, 0, 0, -1, -1, -1, 1, -1, 0, 1,$ $1, -1, 0, 0, 0, 1, 0, 1, 0, -1, 1, 0, 1, 0, 0, 0, 0\}$ | 3, 6, 10, and 14 |

TABLE 2

Some Ipatov sequences with a length of 91

| Code index | Code sequence | Channel number |
|---|---|---|
| 25 | $\{-1, 0, 1, 1, 1, 1, -1, -1, 1, -1, -1,$ $1, -1, 1, 1, 1, 1, -1, 1, -1, -1, -1,$ $1, 1, -1, -1, 1, 1, 1, 1, 1, -1, 1, 1, -1,$ $1, 0, 0, 1, -1, -1, 1, 0, -1, -1,$ $1, 0, 1, 1, 1, 1, -1, -1, 1, 1, 1, -1, -1,$ $0, -1, -1, 0, 1, -1, 1, -1, -1, -$ $1, -1, 0, -1, 1, -1, 1, -1, 1, 0, 1, -1, -1,$ $1, 1, -1, 1, -1, 1, 1, 1, 0\}$ | 0 to 15 |
| 26 | $\{1, 1, 0, 1, -1, 1, -1, -1, -1, 1, 1, 1,$ $1, 1, -1, 1, -1, 1, 1, -1, -1, 1, 1, -1, -1,$ $1, 1, -1, -1, -1, 1, -1, 0, 1, 1, 1,$ $0, -1, 1, 1, 1, 1, -1, 1, 0, 1, 0, -1, -1,$ $0, 1, -1, 1, 1, -1, 1, 1, 1, 1, 1, -1, -1,$ $1, -1, 1, 1, 0, 0, 1, 1, 1, -1, -1,$ $0, 1, -1, -1, -1, -1, -1, 1, -1,$ $0, 1, -1, 1, -1, 1, -1, -1, -1\}$ | 0 to 15 |

TABLE 3

Some Ipatov sequences with a length of 127

| Code index | Code sequence | Channel number |
|---|---|---|
| 9 | {1, 0, 0, 1, 0, 0, 0, −1, 0, −1, −1, 0, 0, −1, −1, 1, 0, 1, 0, 1, 0, 0, −1, 1, −1, 1, 1, 0, 1, 0, 0, 0, 0, 1, 1, −1, 0, 0, 0, 1, 0, 0, −1, 0, 0, −1, −1, 0, −1, 1, 0, 1, 0, −1, −1, 0, −1, 1, 1, 1, 0, 1, 1, 0, 0, 0, 1, −1, 0, 1, 0, 0, −1, 0, 1, 1, −1, 0, 1, 1, 1, 0, 0, −1, 1, 0, 0, 1, 0, 1, 0, −1, 0, 1, 1, −1, 1, −1, −1, 1, 0, 0, 0, 0, 0, 0, 1, 0, 0, 0, 0, 0, −1, 1, 0, 0, 0, 0, −1, 0, −1, 0, 0, 0, −1, −1, 1} | 0 to 3, 5, 6, 8 to 10, and 12 to 14 |
| 10 | {1, 1, 0, 0, 1, 0, −1, 1, 0, 0, 1, 0, 0, 1, 0, 0, 0, 0, 0, 0, 0, −1, 0, 0, 0, −1, 0, 0, −1, −1, 0, 0, 0, −1, 0, 1, −1, 1, 0, −1, 0, 1, −1, 0, −1, 1, 0, 0, 0, 0, 1, −1, 0, 0, 1, 1, 0, −1, 0, 1, 0, 0, −1, −1, 1, 0, 0, 1, 1, −1, 1, 0, 1, −1, 0, 1, 0, 0, 0, 0, −1, 0, −1, 0, −1, 0, −1, 1, 1, −1, 1, 0, 1, 0, 0, 0, 1, 0, 1, 0, 0, 0, −1, 1, 0, 1, 1, 1, 0, 0, 0, −1, −1, −1, −1, 1, 1, 1, 0, 0, 0, 0, 1, 1, 1, 0, −1, −1} | 0 to 3, 5, 6, 8 to 10, and 12 to 14 |
| 11 | {−1, 1, −1, 0, 0, 0, 0, 1, 0, 0, −1, −1, 0, 0, 0, 0, 0, −1, 0, 1, 0, 1, 0, 1, −1, 0, 1, 0, 0, 1, 0, 0, 1, 0, −1, 0, 0, −1, 1, 1, 1, 1, 0, 0, 1, 0, 0, 0, 0, −1, 1, 0, 1, 0, −1, 0, 0, 0, 0, 1, 1, 1, 1, 1, −1, 1, 0, 1, −1, −1, 0, 1, −1, 0, 1, 1, −1, −1, 0, −1, 0, 0, 0, 1, 0, −1, 1, 0, 0, 1, 0, 1, −1, −1, −1, −1, 0, 0, 0, −1, 0, 0, 0, 0, 0, 0, −1, 1, 0, 0, 1, −1, 0, 1, 1, 0, 0, 0, 1, 1, −1, 0, 0, 1, 1, −1, 0, −1, 0} | 0 to 3, 5, 6, 8 to 10, and 12 to 14 |
| 12 | {−1, 1, 0, 1, 1, 0, 0, 0, 0, 0, −1, 0, 1, 0, −1, 1, 0, −1, −1, −1, 1, −1, 1, 1, 0, 0, −1, 1, 0, 1, 1, 0, 1, 0, 1, 0, 0, 0, 0, −1, 0, 0, −1, 0, 0, −1, 1, 0, 0, 1, −1, 1, 1, 0, 0, −1, 1, −1, 0, −1, 1, 1, 0, −1, 0, 1, 1, 1, 1, 0, −1, 0, 0, −1, 0, 1, 1, 0, 0, 1, 0, 1, 0, 0, 1, 1, −1, 0, 0, 1, 0, 0, 0, 1, −1, 0, 0, 0, −1, 0, −1, −1, 1, 0, 0, 0, 0, −1, 0, 0, 0, 0, −1, −1, 0, 1, 0, 0, 0, 0, 0, 1, −1, −1} | 0 to 3, 5, 6, 8 to 10, and 12 to 14 |

Figure 3:
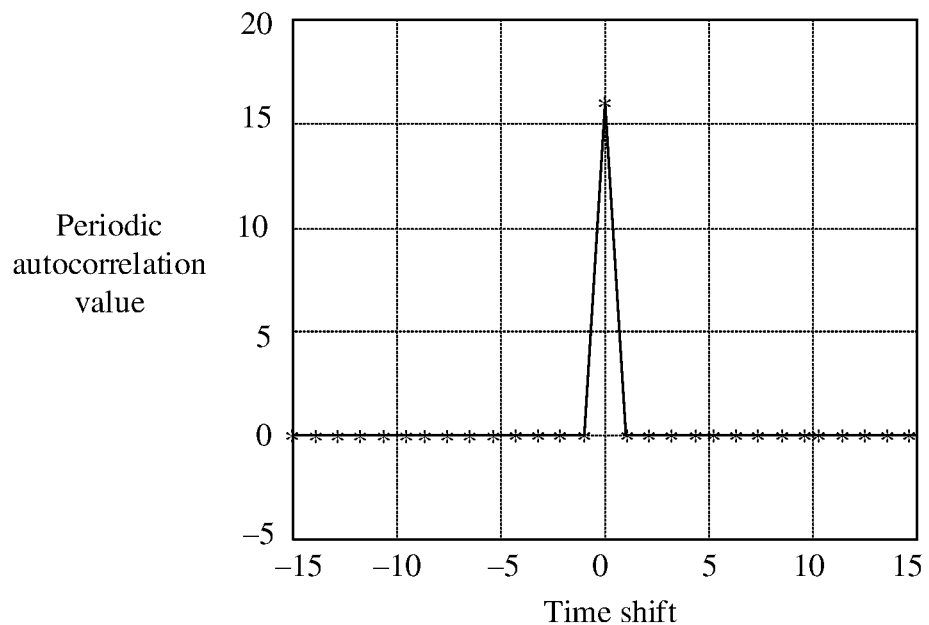
FIG. 3 shows a periodic autocorrelation function of an Ipatov sequence with a length of 31 according to an embodiment of this application.

FIG. 3 is a periodic autocorrelation function of an Ipatov sequence with a length of 31 according to an embodiment of this application. It can be learned from FIG. 3 that the periodic autocorrelation function of the Ipatov sequence with the length of 31 has a value only at an origin, and is 0 at other locations. Based on an autocorrelation characteristic, a receiving end may use a same sequence to correlate with received signals, and implement synchronization based on information such as a correlation peak value location. For example, the receiving end detects a correlation result between a predefined sequence and a received signal. When a periodic peak value occurs in the correlation result, a synchronization header of a PPDU is received, and the receiving end may determine a start location of the PPDU based on a location of the peak value. The receiving end may determine, based on a PHR field, a length of the PPDU and whether data in the PPDU is data transmitted by a transmitting end to the receiving end. When the data in the PPDU is the data transmitted to the receiving end, the receiving end may further parse a physical layer payload field in the PPDU, and obtain the data sent by the transmitting end. When the data in the PPDU is not the data transmitted to the receiving end, the receiving end does not parse a physical layer payload field in the PPDU.

However, Ipatov sequences of different lengths shown in Table 1, Table 2, and Table 3 are all ternary sequences, including three values: −1, 0, and 1. A receiving end that uses OOK modulation and demodulation cannot distinguish between values: −1 and 1. Therefore, the Ipatov sequence is not suitable for a device that uses OOK modulation. In addition, a currently used Ipatov sequence includes a plurality of values 0. Ipatov sequences with lengths of 31 and 127 are used as an example, half of elements in the sequences are 0. In a UWB device, 0 means that no signal is transmitted. In this way, when no signal is transmitted, interference from another signal is more likely to occur. In other words, the Ipatov sequence corresponds to a small quantity of pulses having energy, and is vulnerable to interference.

In view of this, this application provides a method and an apparatus for transmitting a physical layer protocol data unit. A generation sequence of a synchronization header in a PPDU is designed, so that synchronization of a UWB device can be implemented.

Figure 4:
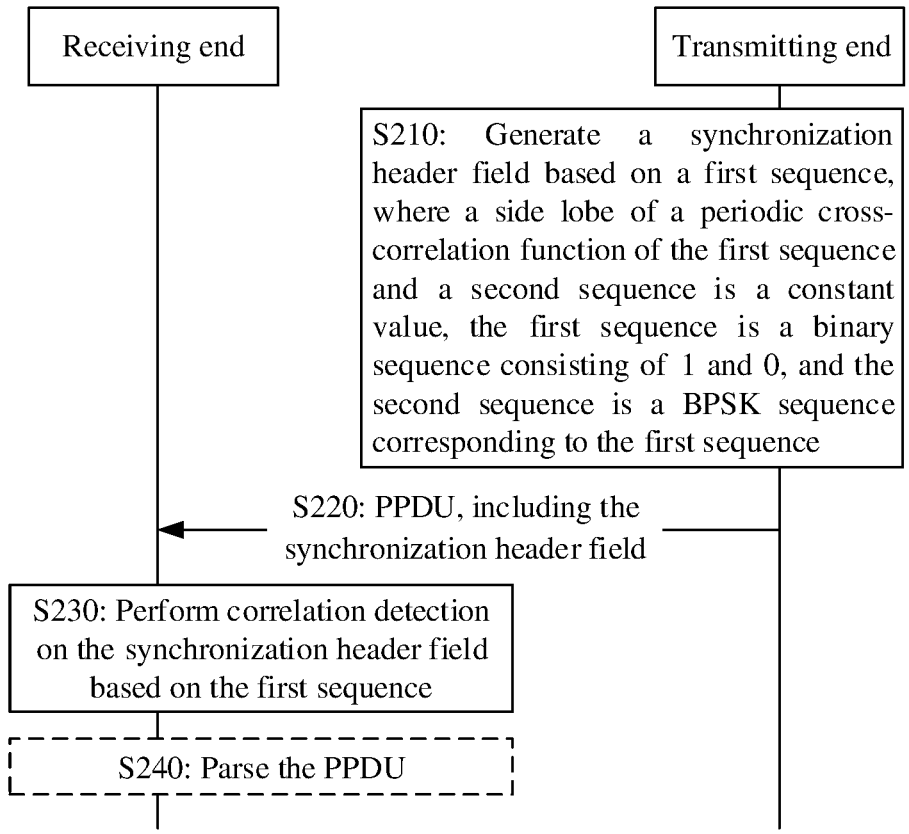
FIG. 4 is a schematic flowchart of a method for transmitting a physical layer protocol data unit according to an embodiment of this application.

FIG. 4 is a schematic flowchart of a method 200 for transmitting a physical layer protocol data unit according to an embodiment of this application.

S210: A transmitting end generates a synchronization header field based on a first sequence, where a side lobe of a periodic cross-correlation function of the first sequence and a second sequence is a constant value, the first sequence is a binary sequence including 1 and 0, and the second sequence is a binary phase shift keying (BPSK) sequence corresponding to the first sequence.

The transmitting end may generate a PPDU based on the predefined first sequence. The generated PPDU may have a structure similar to that shown in FIG. 2, and includes an SHR field, a PHR field, and a PHY payload field. The SHR field includes a SYNC field and an SFD field. The SYNC field includes a plurality of repeated basic symbols $S_i$. The SFD field is obtained by extending the basic symbol and a specified sequence. $S_i$ is generated based on the first sequence, and the first sequence may also be referred to as a preamble sequence.

It should be understood that, that $S_i$ is generated based on the first sequence may mean that $S_i$ is directly generated based on the first sequence, or may mean that equivalent deformation is first performed on the first sequence and $S_i$ is generated based on a deformed sequence.

It should be further understood that "generating a synchronization header field based on a first sequence" may also be understood as "generating a basic symbol based on the first sequence", where the synchronization header field includes the basic symbol, or may be understood as "generating the PPDU based on the first sequence", where the PPDU includes the synchronization header field.

For example, the equivalent deformation may be performing a cyclic shift operation on the first sequence, performing a reversal operation on the first sequence, or performing a cyclic shift operation and a reversal operation on the first sequence to form a new sequence. The reversal operation may also be understood as a head-to-tail inversion operation or an inverted operation. For example, a result of the reversal operation on a sequence {a, b, c, d, e} is {e, d, c, b, a}. It is assumed that a length of the first sequence is L, and there are 2L types of equivalent deformation of the first sequence, including the first sequence.

The first sequence is the binary sequence consisting of 1 and 0, in other words, the first sequence includes only two types of elements: 1 and 0, and the second sequence is the BPSK sequence corresponding to the first sequence. If the first sequence is denoted as $\vec{C}$, the second sequence is $2\vec{C}-1$. It may also be understood as that the second sequence is a sequence obtained after all elements 0 in the first sequence are replaced with elements −1.

In this application, the side lobe of the periodic cross-correlation (periodic cross-correlation) function of the first sequence and the second sequence is the constant value. In other words, the periodic cross-correlation function has a unique peak value, and the peak value is greater than the constant value. For example, the constant value may be −1 or 0. Optionally, the constant value may alternatively be another value. This is not limited in this application.

It should be understood that, after periodic cross-correlation is performed on two sequences with a same length, a sum of energy of a main lobe and energy of all side lobes in a cross-correlation output result is a fixed value, the fixed value is related to a sequence length, and the energy of the main lobe is greater than a sum of the energy of all the side lobes, where the energy is determined based on a cross-correlation value. When the side lobe of the periodic cross-correlation function of the first sequence and the second sequence is the constant value, the periodic cross-correlation function has the unique peak value, and the peak value is greater than the constant value.

Optionally, that the side lobe is the constant value may also indicate that a cross-correlation value of the side lobe is a constant value.

S220: The transmitting end sends the PPDU on a target channel, and correspondingly, a receiving end receives the PPDU on the target channel, where the PPDU includes the synchronization header field.

Optionally, the PPDU is sent in a form of a pulse signal, and the receiving end receives, on the target channel, the PPDU sent by the transmitting end. The target channel may be a channel defined in a protocol, or may be a channel preconfigured by a transmitting end device and a receiving end device.

In an optional implementation, channel numbers are 0 to 15, and the target channel may be any one of channels 0 to 15.

S230: The receiving end performs correlation detection on the synchronization header field based on the first sequence, where the side lobe of the periodic cross-correlation function of the first sequence and the second sequence is the constant value, the first sequence is the binary sequence consisting of 1 and 0, and the second sequence is the binary phase shift keying sequence corresponding to the first sequence.

Optionally, the correlation detection may be autocorrelation detection, or may be cross-correlation detection. A specific method for correlation detection is not limited in this application.

The receiving end may determine, based on a correlation detection result, whether the PPDU is detected and a location of the PPDU.

In an example, the receiving end may generate the second sequence based on the predefined first sequence, where the second sequence is the BPSK sequence corresponding to the first sequence, and perform cross-correlation on the second sequence and the first sequence in the received synchronization header field. When a periodic peak value occurs in a cross-correlation result, a synchronization header of the PPDU is received, or it may be understood as that the PPDU is detected. In addition, the receiving end may determine a start location of the PPDU based on a location of the peak value, to implement synchronization between the transmitting end device and the receiving end device.

In an example, the receiving end may also perform autocorrelation on the predefined first sequence and the first sequence in the received synchronization header field. Similarly, when a periodic peak value occurs in an autocorrelation result, a synchronization header of the PPDU is received, and the receiving end may determine a start pulse location of the PPDU based on a location of the peak value. In other words, synchronization between the transmitting end device and the receiving end device is implemented by using a periodic autocorrelation characteristic of the first sequence.

It should be understood that the foregoing is merely an example. A technology known to or newly developed by a person skilled in the art may be used for a specific method for determining synchronization based on a correlation detection result. This is not limited in this application.

It should be further understood that the predefinition in this application may be understood as definition in a standard.

Optionally, the method 200 further includes S240: The receiving end parses the PPDU. For a specific parsing manner, refer to existing descriptions. This is not limited.

For example, when receiving the synchronization header field, the receiving end may continue to receive a pulse, that is, receive a PHR field and a physical layer payload field of the PPDU. The receiving end may determine, by parsing the PHR field, a length of the PPDU and whether data in the PPDU is data transmitted by the transmitting end to the receiving end. When the data in the PPDU is the data transmitted to the receiving end, the receiving end parses the physical layer payload field in the PPDU, and obtains the data sent by the transmitting end. When the data in the PPDU is not the data transmitted to the receiving end, the receiving end does not parse the physical layer payload field in the PPDU.

It should be understood that, when an aperiodic peak value occurs in the correlation detection result, the receiving end determines that the PPDU is not received, and continues to receive a pulse, but does not parse the received pulse.

According to the method in this embodiment of this application, the first sequence used to generate the synchronization header field and the first sequence used by the receiving end to perform correlation detection are binary sequences, that is, include only two types of elements: 0 and 1, and the side lobe of the periodic cross-correlation function of the first sequence and the BPSK sequence corresponding to the first sequence is the constant value, so that the receiving end can implement synchronization based on the correlation detection result.

In addition, in this application, both a received signal and a transmitted signal are generated based on a binary sequence, so that the transmitting end device and the receiving end device can support on-off keying (OOK) modulation and demodulation modes, to help simplify a structure of a transceiver and reduce device power consumption.

In an implementation, the first sequence is an m-sequence, and the m-sequence is also referred to as a longest linear feedback shift register sequence.

Figure 5:
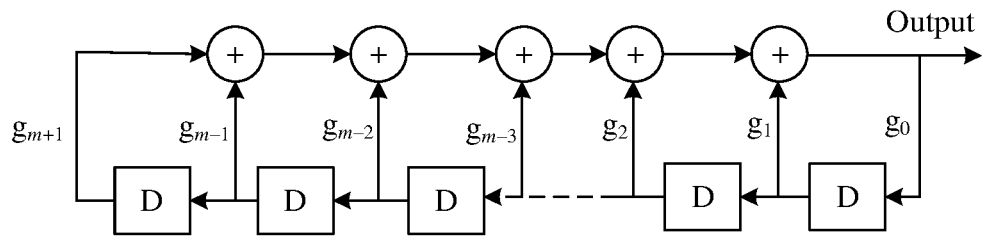
FIG. 5 is a schematic diagram of a basic structure of a linear feedback shift register according to an embodiment of this application.

In this application, the in-sequence is a sequence, with a longest periodicity, generated by a linear feedback shift register (LFSR). A basic structure of the LFSR is shown in FIG. 5. In FIG. 5, D represents a shift register, and + represents a binary addition. Generally, an output result G(X) of the LFSR shown in FIG. 5 may be represented by using the following polynomial:

$$G(X) = g_m X^m + g_{m-1} X^{m-1} + \cdots + g_1 X + g_0$$

$g_i$ is a feedback coefficient, and a value is 0 or 1, which is a binary number. When the value is 0, it indicates that a feedback branch does not exist; or when the value is 1, it indicates that a feedback branch exists, where i=0, 1, 2, 3, ..., m. It can be learned from FIG. 5 that an output of the LFSR depends on a current status of the shift register. When factorization cannot be performed on a polynomial corresponding to the output, that is, G(X) cannot be written as a product of two polynomials, the LFSR may traverse all $2^m-1$ non-zero states starting from a non-zero initial state, and output a binary sequence with a length of $2^m-1$ in this period, where the sequence is a binary in-sequence.

Optionally, the first sequence in this application may alternatively be obtained through traversal or search. This is not limited in this application.

For example, Table 4 to Table 7 show binary in-sequences with lengths of 31, 63, 127, and 255 respectively, and the binary in-sequences are respectively denoted as sequences $\vec{C}_1, \vec{C}_2, \vec{C}_3, \vec{C}_4, \vec{C}_5, \vec{C}_6, \vec{C}_7, \vec{C}_8, \vec{C}_9, \vec{C}_{10}, \vec{C}_{11}, \vec{C}_{12}, \vec{C}_{13}, \vec{C}_{14}$, and $\vec{C}_{15}$, where each may be considered as an example of the first sequence. Table 4 to Table 7 further show channel numbers of target channels respectively corresponding to $\vec{C}_1, \vec{C}_2, \vec{C}_3, \vec{C}_4, \vec{C}_5, \vec{C}_6, \vec{C}_7, \vec{C}_8, \vec{C}_9, \vec{C}_{10}, \vec{C}_{11}, \vec{C}_{12}, \vec{C}_{13}, \vec{C}_{14}$, and $\vec{C}_{15}$. The channel numbers mean transmission channels that may be used for each sequence.

TABLE 4

Binary sequence with a length of 31

| Sequence name | Binary sequence | Channel number |
|---|---|---|
| $\vec{C}_1$ | {1, 0, 0, 0, 0, 1, 1, 0, 1, 0, 1, 0, 0, 1, 0, 0, 0, 0, 1, 0, 1, 1, 1, 1, 1, 0, 1, 1, 0, 0, 1, 1} | 0, 1, 2, 3, 5, 6, 8, 9, 10, 12, 13, and 14 |
| $\vec{C}_2$ | {1, 0, 0, 0, 0, 1, 0, 1, 0, 1, 1, 1, 0, 1, 1, 0, 0, 0, 1, 1, 1, 1, 1, 0, 0, 1, 1, 0, 1, 0, 0} | 4, 7, 11, and 15 |
| $\vec{C}_3$ | {0, 1, 0, 1, 1, 0, 1, 0, 1, 0, 0, 0, 1, 1, 1, 0, 1, 1, 1, 1, 1, 0, 0, 1, 0, 0, 1, 1, 0, 0, 0} | 4, 7, 11, and 15 |

TABLE 5

Binary sequence with a length of 63

| Sequence name | Binary sequence | Channel number |
|---|---|---|
| $\vec{C}_4$ | {0, 1, 0, 1, 0, 1, 1, 0, 0, 1, 1, 0, 1, 1, 1, 0, 1, 1, 0, 1, 0, 0, 0, 1, 0, 0, 1, 1, 1, 0, 0, 0, 0, 1, 0, 1, 1, 1, 1, 1, 0, 0, 0, 1, 0, 1, 0, 0, 0, 0, 1, 1, 0, 0, 0, 0, 1, 0, 0, 0, 0, 1, 1, 1, 1, 1, 1} | 1, 2, 3, 4, 5, 6, 7, 8, 9, 10, 11, 12, 13, 14, and 15 |
| $\vec{C}_5$ | {0, 1, 1, 0, 1, 0, 0, 0, 1, 0, 0, 0, 0, 1, 0, 1, 1, 0, 0, 0, 1, 0, 1, 0, 1, 0, 0, 1, 0, 0, 1, 1, 1, 1, 0, 0, 0, 0, 0, 0, 1, 1, 0, 1, 1, 1, 0, 0, 1, 1, 0, 0, 0, 1, 1, 1, 0, 1, 0, 1, 1, 1, 1, 1, 1, 1} | 1, 2, 3, 4, 5, 6, 7, 8, 9, 10, 11, 12, 13, 14, and 15 |
| $\vec{C}_6$ | {0, 0, 1, 0, 1, 0, 1, 0, 0, 0, 0, 1, 1, 0, 0, 1, 1, 1, 1, 0, 1, 1, 1, 0, 1, 0, 1, 1, 0, 1, 0, 0, 1, 1, 0, 0, 1, 1, 0, 0, 0, 1, 1, 1, 0, 0, 0, 0, 1, 0, 0, 0, 0, 1, 0, 1, 1, 1, 1, 0, 1, 1, 1, 1, 1} | 1, 2, 3, 4, 5, 6, 7, 8, 9, 10, 11, 12, 13, 14, and 15 |

TABLE 6

Binary sequence with a length of 127

| Sequence name | Binary sequence | Channel number |
|---|---|---|
| $\vec{C}_7$ | {1, 1, 1, 1, 1, 1, 1, 0, 0, 1, 0, 0, 1, 0, 0, 0, 0, 1, 1, 0, 0, 0, 0, 0, 0, 1, 0, 1, 1, 0, 1, 1, 0, 0, 0, 1, 0, 1, 0, 0, 0, 0, 0, 1, 1, 0, 0, 1, 1, 0, 1, 0, 1, 1, 1, 0, 1, 1, 1, 0, 1, 0, 0, 1, 1, 1, 1, 0, 1, 0, 0, 0, 0, 0, 1, 0, 0, 1, 0, 1, 1, 0, 0, 1, 1, 1, 0, 1, 1, 1, 1, 0, 1, 1, 0, 0, 0, 1, 1, 1, 1, 1, 0, 1, 0, 1, 0, 0, 1, 0, 0, 1, 1, 1, 0, 1, 0, 0, 0, 1, 0, 1, 0, 1, 1, 1, 1, 1, 0} | 0 to 15 |

TABLE 7

Binary sequence with a length of 255

| Sequence name | Binary sequence | Channel number |
|---|---|---|
| $\vec{C}_8$ | {0, 0, 1, 0, 0, 0, 0, 1, 0, 1, 0, 0, 1, 1, 1, 1, 1, 0, 1, 0, 0, 1, 0, 1, 0, 1, 1, 1, 1, 0, 0, 0, 0, 0, 1, 1, 0, 0, 0, 0, 1, 0, 1, 0, 1, 1, 0, 0, 1, 1, 0, 0, 1, 0, 1, 1, 1, 1, 1, 1, 0, 1, 1, 1, 1, 1, 0, 0, 1, 1, 0, 1, 1, 1, 0, 1, 1, 0, 0, 0, 1, 0, 1, 0, 1, 0, 1, 0, 0, 1, 0, 1, 1, 0, 1, 1, 0, 0, 0, 1, 0, 0, 1, 1, 1, 0, 1, 0, 1, 0, 0, 0, 1, 0, 0, 0, 1, 1, 0, 1, 1, 1, 1, 0, 0, 1, 0, 0, 0, 0, 0, 1, 0, 1, 1, 1, 1, | 0 to 15 |

TABLE 7-continued

Binary sequence with a length of 255

| Sequence name | Binary sequence | Channel number |
|---|---|---|
| | 0, 1, 0, 1, 1, 1, 1, 0, 1, 1, 0, 1, 1, 1, 1, 1, 0, 0, 0, 0, 1, 1, 0, 1, 0, 0, 1, <br> 1, 0, 1, 0, 1, 1, 0, 1, 1, 0, 1, 0, 1, 0, 0, 0, 0, 0, 1, 0, 0, 1, 1, 1, 0, 1, 1, <br> 0, 0, 1, 0, 0, 1, 0, 0, 1, 1, 0, 0, 0, 0, 0, 0, 1, 1, 1, 0, 1, 0, 0, 1, 0, 0, 0, <br> 1, 1, 1, 0, 0, 0, 1, 0, 0, 0, 0, 0, 0, 0, 0, 1, 0, 1, 1, 0, 0, 0, 1, 1, 1, 1, 0, 1, <br> 0, 0, 0, 0, 1, 1, 1, 1, 1, 1, 1, 1} | |
| $\vec{C}_9$ | {0, 1, 0, 0, 1, 0, 0, 0, 0, 0, 0, 0, 1, 1, 1, 0, 1, 1, 0, 0, 0, 0, 0, 0, 1, 0, 0, <br> 1, 1, 0, 1, 0, 0, 0, 0, 0, 1, 1, 0, 1, 0, 1, 1, 1, 0, 0, 0, 0, 0, 1, 0, 1, 1, 1, 1, <br> 0, 0, 1, 0, 0, 0, 1, 1, 1, 0, 0, 0, 1, 0, 1, 1, 0, 0, 1, 0, 0, 1, 0, 1, 1, 1, 1, <br> 0, 1, 0, 1, 1, 0, 1, 1, 0, 1, 0, 0, 1, 1, 1, 1, 0, 1, 1, 0, 1, 1, 1, 0, 1, 0, 0, <br> 0, 1, 1, 0, 1, 1, 0, 0, 1, 1, 1, 0, 0, 1, 0, 1, 1, 0, 1, 0, 1, 0, 0, 1, 0, 1, 1, <br> 1, 0, 1, 1, 1, 1, 1, 0, 1, 1, 1, 0, 0, 1, 1, 0, 0, 0, 0, 1, 1, 0, 0, 1, 0, 1, 0, <br> 1, 0, 0, 0, 1, 0, 1, 0, 1, 1, 1, 1, 1, 1, 0, 0, 1, 1, 1, 1, 1, 0, 0, 0, 0, 0, 1, <br> 0, 1, 0, 0, 0, 0, 1, 0, 0, 0, 0, 1, 1, 1, 1, 0, 0, 0, 1, 1, 0, 0, 0, 0, 0, 0, 0, <br> 1, 0, 0, 1, 0, 1, 0, 0, 1, 1, 0, 0, 1, 1, 0, 1, 1, 1, 1, 0, 1, 0, 1, 0, 1, 0, 1, <br> 1, 0, 0, 0, 1, 1, 1, 1, 1, 1, 1, 1} | 0 to 15 |
| $\vec{C}_{10}$ | {0, 1, 1, 1, 0, 0, 0, 0, 0, 0, 1, 0, 1, 0, 0, 1, 1, 0, 0, 0, 0, 1, 0, 0, 0, 1, <br> 1, 1, 1, 0, 0, 1, 0, 1, 0, 1, 1, 0, 0, 0, 1, 1, 1, 0, 0, 0, 0, 1, 1, 1, 0, 1, <br> 1, 0, 1, 1, 0, 0, 1, 1, 0, 1, 0, 1, 1, 0, 1, 1, 1, 1, 1, 1, 1, 0, 0, 0, 0, 1, 1, 0, 1, <br> 0, 0, 0, 0, 1, 1, 0, 1, 1, 1, 0, 0, 0, 1, 0, 0, 0, 1, 1, 1, 0, 1, 0, 1, 1, 1, 0, 1, 1, <br> 1, 0, 1, 0, 0, 0, 1, 0, 1, 0, 1, 0, 0, 1, 0, 1, 0, 0, 0, 0, 0, 0, 1, 1, <br> 0, 0, 0, 1, 0, 0, 0, 0, 0, 0, 1, 1, 1, 1, 0, 1, 0, 1, 0, 0, 0, 1, 1, 0, 0, 1, 0, 0, <br> 0, 0, 1, 0, 1, 1, 1, 1, 0, 1, 0, 0, 1, 0, 1, 0, 0, 0, 1, 0, 0, 0, 1, 0, 1, 0, 1, <br> 1, 0, 1, 0, 1, 0, 1, 1, 1, 1, 0, 1, 1, 0, 0, 0, 0, 0, 1, 0, 0, 0, 1, 0, 1, 1, 1, 0, <br> 0, 0, 1, 0, 1, 1, 0, 0, 0, 1, 0, 1, 1, 0, 1, 0, 0, 0, 1, 1, 1, 1, 0, 0, 0, 1, 1, 0, 0, 0, 1, <br> 1, 1, 0, 0, 1, 1, 1, 1, 1, 1, 1, 1} | 0 to 15 |
| $\vec{C}_{11}$ | {0, 1, 0, 1, 0, 0, 0, 0, 1, 1, 1, 0, 0, 1, 1, 1, 1, 1, 0, 0, 0, 0, 1, 1, 0, 1, 1, 0, <br> 0, 1, 1, 0, 1, 0, 0, 0, 0, 1, 1, 1, 1, 1, 0, 1, 1, 1, 0, 0, 0, 1, 1, 1, 0, 1, 0, 0, 0, <br> 0, 0, 0, 0, 1, 1, 1, 1, 1, 1, 0, 0, 0, 1, 0, 0, 1, 0, 1, 0, 0, 0, 0, 1, 0, 0, 0, 0, 1, 0, <br> 1, 1, 0, 1, 0, 1, 0, 1, 1, 1, 0, 0, 0, 1, 0, 0, 0, 0, 1, 1, 0, 0, 1, 0, 0, 0, 1, 0, 0, 0, 1, <br> 1, 1, 0, 0, 0, 0, 0, 0, 0, 1, 0, 0, 0, 0, 0, 1, 0, 0, 1, 1, 1, 1, 1, 1, 0, 0, 0, 1, 1, <br> 0, 0, 1, 1, 1, 0, 1, 1, 1, 1, 1, 1, 0, 0, 1, 0, 1, 1, 0, 0, 1, 0, 1, 1, 0, <br> 1, 1, 0, 1, 0, 0, 1, 0, 0, 0, 0, 0, 1, 1, 0, 0, 0, 0, 1, 1, 0, 1, 0, 1, 1, 0, 0, 0, 0, <br> 1, 0, 1, 0, 1, 0, 1, 0, 0, 1, 1, 0, 0, 0, 0, 0, 1, 0, 1, 1, 1, 0, 1, 0, 1, 1, 1, 1, <br> 1, 1, 0, 1, 1, 0, 1, 1, 1, 0, 1, 1, 0, 0, 0, 0, 1, 0, 1, 0, 0, 0, 1, 0, 1, 1, 1, 1, 1, <br> 0, 1, 0, 0, 1, 1, 1, 1, 1, 1, 1, 1} | 0 to 15 |
| $\vec{C}_{12}$ | {0, 0, 1, 1, 0, 1, 1, 1, 1, 0, 0, 1, 1, 1, 0, 1, 0, 0, 0, 0, 0, 0, 0, 1, 0, 1, 0, 1, <br> 1, 0, 0, 0, 1, 1, 0, 0, 1, 1, 1, 0, 0, 0, 0, 0, 0, 1, 1, 1, 1, 1, 0, 1, 0, 0, 0, 1, <br> 0, 1, 0, 1, 0, 0, 1, 0, 0, 0, 0, 0, 1, 0, 0, 0, 0, 1, 1, 1, 0, 1, 1, 1, 1, 1, 1, 1, <br> 0, 1, 1, 0, 0, 0, 0, 1, 1, 0, 0, 0, 0, 1, 0, 0, 1, 1, 0, 0, 0, 0, 0, 1, 1, 0, 1, 0, 0, <br> 0, 0, 1, 0, 1, 0, 0, 1, 1, 0, 1, 0, 1, 0, 1, 0, 0, 0, 0, 1, 0, 1, 1, 1, 0, 0, 1, 1, 1, 1, <br> 1, 0, 1, 0, 1, 1, 1, 1, 1, 0, 0, 0, 1, 1, 1, 0, 0, 1, 0, 1, 0, 0, 0, 1, 1, 1, 1, 1, <br> 0, 0, 0, 0, 1, 0, 0, 1, 0, 0, 1, 0, 1, 1, 1, 1, 0, 0, 1, 0, 0, 0, 1, 0, 0, 0, 1, <br> 1, 0, 1, 1, 0, 1, 1, 1, 0, 0, 0, 1, 0, 1, 1, 0, 0, 1, 0, 1, 0, 0, 0, 1, 0, 1, 1, 0, 1, <br> 1, 0, 0, 1, 0, 0, 1, 1, 1, 0, 1, 0, 1, 0, 1, 1, 1, 0, 1, 1, 0, 1, 0, 0, 1, 1, <br> 0, 1, 0, 0, 1, 1, 1, 1, 1, 1, 1, 1} | 0 to 15 |
| $\vec{C}_{13}$ | {0, 0, 1, 1, 0, 0, 0, 1, 0, 1, 0, 1, 0, 1, 0, 0, 0, 0, 1, 0, 0, 0, 0, 1, 1, 0, <br> 0, 1, 1, 0, 0, 0, 0, 0, 1, 1, 1, 1, 1, 0, 1, 1, 1, 0, 1, 1, 1, 1, 1, 1, 0, 1, 0, <br> 1, 0, 0, 1, 0, 1, 1, 0, 1, 0, 0, 1, 0, 1, 1, 0, 0, 1, 1, 1, 0, 0, 1, 1, 0, 1, 0, <br> 0, 1, 0, 0, 0, 1, 0, 1, 1, 0, 0, 0, 1, 0, 0, 1, 1, 1, 1, 0, 0, 1, 0, 1, 1, <br> 1, 1, 0, 0, 0, 0, 1, 0, 1, 0, 0, 0, 1, 1, 0, 1, 0, 1, 1, 1, 1, 1, 0, 0, 1, 1, 1, <br> 1, 0, 1, 1, 0, 0, 1, 0, 1, 0, 1, 1, 1, 0, 1, 0, 1, 1, 1, 0, 0, 1, 1, 0, <br> 1, 0, 0, 1, 0, 1, 1, 0, 1, 0, 0, 0, 0, 1, 0, 0, 1, 1, 1, 0, 1, 1, 0, 0, 1, 1, 0, 0, <br> 0, 0, 1, 1, 1, 0, 0, 1, 0, 0, 0, 1, 0, 0, 0, 0, 0, 1, 0, 1, 1, 0, 0, 0, 1, 1, <br> 1, 0, 0, 0, 0, 0, 0, 1, 1, 0, 1, 1, 1, 1, 0, 1, 0, 0, 0, 0, 0, 0, 0, 1, 0, 0, 0, 1, <br> 0, 1, 0, 0, 1, 1, 1, 1, 1, 1, 1, 1} | 0 to 15 |
| $\vec{C}_{14}$ | {0, 1, 0, 1, 0, 1, 1, 1, 0, 0, 1, 1, 1, 0, 0, 1, 0, 0, 1, 1, 0, 1, 0, 1, 0, 0, 0, <br> 0, 1, 1, 0, 1, 1, 1, 0, 0, 0, 0, 0, 1, 1, 0, 0, 0, 0, 1, 1, 1, 0, 0, 0, 0, 1, 1, 0, <br> 0, 1, 1, 0, 0, 1, 0, 0, 0, 0, 1, 1, 0, 1, 0, 0, 1, 1, 1, 1, 0, 1, 0, 0, 0, 1, 0, 0, <br> 0, 1, 0, 1, 0, 1, 1, 0, 1, 1, 0, 0, 0, 0, 0, 0, 1, 1, 1, 1, 1, 1, 0, 0, 0, 1, 0, <br> 1, 0, 0, 1, 0, 1, 1, 0, 1, 0, 1, 1, 1, 1, 1, 0, 0, 0, 1, 0, 1, 1, 0, 0, 1, 0, 0, <br> 0, 0, 0, 1, 0, 1, 0, 0, 0, 0, 1, 0, 0, 1, 0, 1, 0, 1, 0, 1, 0, 0, 0, 1, 1, 0, 0, <br> 1, 0, 1, 1, 1, 1, 0, 1, 0, 0, 0, 1, 1, 1, 1, 0, 1, 1, 0, 0, 1, 1, 1, 1, 0, <br> 1, 0, 0, 0, 0, 0, 0, 1, 0, 0, 0, 0, 0, 1, 0, 1, 1, 1, 1, 1, 0, 1, 1, 1, 0, 1, 1, 1, 1, <br> 1, 0, 0, 0, 0, 1, 0, 0, 1, 1, 1, 0, 1, 0, 1, 1, 0, 0, 0, 1, 1, 1, 1, 0, 0, 1, 1, <br> 0, 1, 1, 0, 1, 1, 1, 1, 1, 1, 1, 1} | 0 to 15 |
| $\vec{C}_{15}$ | {0, 1, 1, 0, 1, 0, 0, 1, 1, 0, 0, 0, 0, 1, 0, 1, 0, 1, 0, 0, 0, 0, 0, 0, 1, 0, <br> 1, 1, 0, 0, 0, 1, 1, 1, 0, 0, 1, 1, 0, 0, 1, 0, 0, 0, 0, 0, 1, 0, 0, 0, 0, 0, 1, 0, 0, 0, 1, <br> 1, 1, 1, 1, 0, 1, 0, 1, 1, 1, 1, 1, 0, 1, 0, 0, 0, 1, 0, 1, 0, 1, 1, 1, 0, <br> 0, 0, 1, 0, 0, 0, 1, 0, 0, 0, 1, 0, 1, 0, 0, 0, 1, 1, 0, 0, 0, 1, 1, 0, <br> 1, 0, 1, 0, 1, 0, 1, 1, 0, 1, 1, 0, 0, 0, 1, 0, 1, 1, 1, 1, 1, 1, 0, 0, 1, 1, 0, 0, <br> 0, 0, 0, 0, 0, 1, 1, 0, 1, 1, 1, 0, 1, 0, 0, 1, 0, 0, 0, 1, 1, 1, 1, 1, 1, 1, 0, 0, <br> 0, 0, 0, 1, 1, 1, 0, 1, 1, 0, 1, 0, 0, 1, 1, 0, 1, 0, 1, 1, 0, 0, 0, 0, 1, 1, 0, 0, <br> 0, 1, 1, 0, 1, 0, 0, 0, 0, 1, 1, 1, 1, 0, 0, 0, 1, 1, 1, 0, 0, 1, 1, 1, 1, 0, 1, | 0 to 15 |

TABLE 7-continued

Binary sequence with a length of 255

| Sequence name | Binary sequence | Channel number |
|---|---|---|
| | 1, 1, 0, 0, 1, 0, 0, 1, 1, 0, 0, 1, 1, 0, 1, 1, 0, 1, 1, 1, 1, 0, 0, 1, 0, 1, 0, 1, 1, 1, 0, 1, 1, 1, 1, 1, 1, 1} | |

It should be understood that, in an actual application process, available transmission channels may be grouped, and different groups are respectively used for different equivalent deformation sequences of the sequence. For example, for the sequence $\vec{C}_1$, channel numbers of available channels are 0, 1, 2, 3, 5, 6, 8, 9, 10, 12, 13 and 14, that is, 12 channels in total. The 12 channels may be grouped as follows: A group 1 includes channels numbered 0, 1, 8, and 12, a group 2 includes channels numbered 2, 5, 9, and 13, and a group 3 includes channels numbered 3, 6, 10, and 14. The group 1, the group 2, and the group 3 are respectively used for different equivalent deformation sequences of the sequence $\vec{C}_1$.

In an implementation, the first sequence may alternatively be a binary sequence with a length of 35, 39, 47, 79, 95, 159, 191, or 319. Table 8 to Table 15 show some binary sequences with lengths of 35, 39, 47, 79, 95, 159, 191, and 319 respectively, and the binary sequences are respectively denoted as sequences $\vec{C}_{16}$, $\vec{C}_{17}$, $\vec{C}_{18}$, $\vec{C}_{19}$, $\vec{C}_{20}$, $\vec{C}_{21}$, $\vec{C}_{22}$, and $\vec{C}_{23}$, where each may be considered as an example of the first sequence.

TABLE 8

Binary sequence with a length of 35

| Sequence name | Binary sequence | Channel number |
|---|---|---|
| $\vec{C}_{16}$ | {0, 1, 1, 1, 0, 0, 1, 0, 0, 0, 0, 1, 0, 1, 0, 1, 1, 0, 0, 1, 0, 0, 1, 0, 1, 1, 1, 0, 0, 0, 1, 1, 1, 1, 1} | 0 to 15 |

TABLE 9

Binary sequence with a length of 39

| Sequence name | Binary sequence | Channel number |
|---|---|---|
| $\vec{C}_{17}$ | {1, 1, 0, 0, 1, 1, 1, 1, 0, 1, 0, 1, 0, 0, 0, 0, 1, 1, 0, 0, 1, 1, 0, 0, 1, 1, 1, 1, 0, 1, 0, 1, 0, 0, 0, 0, 1, 1, 0} | 0 to 15 |

TABLE 10

Binary sequence with a length of 47

| Sequence name | Binary sequence | Channel number |
|---|---|---|
| $\vec{C}_{18}$ | {1, 0, 1, 0, 0, 0, 1, 1, 1, 0, 1, 0, 1, 0, 1, 0, 0, 0, 1, 1, 1, 0, 1, 0, 1, 0, 1, 0, 0, 0, 1, 1, 1, 0, 1, 0, 1, 0, 1, 0, 0, 0, 1, 1, 1, 0, 1} | 0 to 15 |

TABLE 11

Binary sequence with a length of 79

| Sequence name | Binary sequence | Channel number |
|---|---|---|
| $\vec{C}_{19}$ | {1, 1, 0, 0, 1, 1, 1, 1, 0, 1, 0, 1, 0, 0, 0, 0, 1, 1, 0, 0, 1, 1, 0, 0, 1, 1, 1, 1, 0, 1, 0, 1, 0, 1, 0, 0, 0, 0, 1, 1, 0, 0, 1, 1, 1, 1, 1, 0, 1, 0, 1, 0, 0, 0, 1, 1, 1, 0, 0, 1, 1, 0, 0, 1, 1, 1, 0, 1, 0, 1, 0, 0, 0, 0, 1, 1, 0} | 0 to 15 |

TABLE 12

Binary sequence with a length of 95

| Sequence name | Binary sequence | Channel number |
|---|---|---|
| $\vec{C}_{20}$ | {1, 0, 1, 0, 0, 0, 1, 1, 1, 0, 1, 0, 1, 0, 1, 0, 0, 0, 1, 1, 1, 0, 1, 0, 1, 0, 1, 0, 0, 0, 1, 1, 1, 0, 1, 0, 1, 0, 1, 0, 0, 0, 1, 1, 1, 0, 1, 0, 0, 0, 1, 1, 1, 1, 0, 1, 0, 1, 0, 1, 0, 0, 0, 1, 1, 0, 1, 0, 1, 0, 1, 0, 0, 0, 0, 1, 1, 1, 0, 1, 0, 1, 0, 1, 0, 0, 0, 0, 1, 1, 1, 0, 1} | 0 to 15 |

TABLE 13

Binary sequence with a length of 159

| Sequence name | Binary sequence | Channel number |
|---|---|---|
| $\vec{C}_{21}$ | {1, 1, 0, 0, 1, 1, 1, 1, 0, 1, 0, 1, 0, 0, 0, 0, 1, 1, 0, 0, 1, 1, 0, 0, 1, 1, 1, 1, 0, 1, 0, 1, 0, 1, 0, 0, 0, 0, 1, 1, 0, 0, 1, 1, 1, 1, 1, 0, 1, 0, 1, 0, 0, 0, 1, 1, 1, 0, 0, 1, 1, 0, 0, 1, 1, 1, 0, 1, 0, 1, 0, 1, 1, 1, 0, 1, 0, 1, 0, 0, 0, 0, 1, 1, 0, 0, 1, 1, 0, 0, 0, 1, 1, 0, 0, 1, 1, 1, 1, 0, 1, 0, 1, 0, 1, 0, 0, 0, 0, 1, 1, 0, 0, 1, 1, 0, 0, 0, 1, 1, 1, 1, 1, 0, 1, 0, 1, 0, 1, 0, 0, 0, 1, 1, 0, 0, 0, 1, 1, 1, 1, 0, 1, 0, 1, 0, 0, 0, 0, 1, 1, 0} | 0 to 15 |

TABLE 14

Binary sequence with a length of 191

| Sequence name | Binary sequence | Channel number |
|---|---|---|
| $\vec{C}_{22}$ | {1, 0, 1, 0, 0, 0, 1, 1, 1, 0, 1, 0, 1, 0, 1, 0, 0, 0, 1, 1, 1, 0, 1, 0, 1, 0, 1, 0, 0, 0, 1, 1, 1, 0, 1, 0, 1, 0, 1, 0, 1, 0, 0, 0, 0, 1, 1, 1, 0, 1, 0, 0, 0, 1, 0, 1, 0, 1, 0, 0, 0, 0, 1, 1, 1, 0, 1, 0, 1, 0, 1, 0, 0, 0, 0, 1, 1, 1, 0, 1, 0, 1, 0, 0, 1, 1, 0, 1, 0, 1, 0, 1, 0, 0, 0, 1, 1, | 0 to 15 |

TABLE 14-continued

Binary sequence with a length of 191

| Sequence name | Binary sequence | Channel number |
| --- | --- | --- |
| | 1, 0, 1, 0, 1, 0, 1, 0, 0, 0, 1, 1, 1, 0, 1, 0, 1, 0, 1, 0, 0, 0, 1, 1, 1, 0, 1, 0, 1, 0, 1, 0, 0, 0, 1, 1, 1, 1, 0, 1, 0, 1, 0, 1, 0, 0, 0, 1, 1, 1, 0, 0, 0, 1, 1, 1, 0, 1, 0, 1, 0, 1, 0, 0, 0, 1, 1, 1, 0, 1, 0, 1, 0, 1, 0, 0, 0, 1, 1, 1, 0, 1, 0, 1, 0, 1, 0, 0, 0, 0, 1, 1, 1, 0, 1, 0, 1, 0, 1, 0, 0, 0, 1, 0, 1, 1, 0, 1, 0, 1, 0, 1, 0, 0, 0, 0, 1, 1, 1, 0, 1, 0, 1, 0, 0, 0, 1, 1, 1} | |

TABLE 15

Binary sequence with a length of 319

| Sequence name | Binary sequence | Channel number |
| --- | --- | --- |
| $\vec{C}_{23}$ | {1, 1, 0, 0, 1, 1, 1, 1, 0, 1, 0, 1, 0, 0, 0, 0, 1, 1, 0, 0, 1, 1, 0, 0, 1, 1, 1, 1, 0, 1, 0, 1, 0, 1, 0, 1, 0, 1, 0, 0, 0, 0, 0, 1, 1, 0, 0, 1, 1, 0, 0, 1, 1, 1, 1, 0, 1, 0, 1, 0, 1, 0, 0, 0, 0, 0, 1, 1, 0, 0, 1, 1, 0, 0, 1, 1, 0, 0, 1, 1, 1, 1, 0, 1, 0, 1, 0, 0, 0, 0, 0, 1, 1, 0, 0, 1, 1, 0, 0, 1, 1, 1, 1, 0, 1, 0, 1, 0, 0, 0, 0, 0, 1, 1, 0, 0, 1, 1, 0, 0, 1, 1, 0, 1, 1, 0, 0, 0, 0, 1, 1, 0, 0, 1, 1, 0, 0, 0, 1, 1, 0, 0, 1, 1, 1, 1, 1, 0, 1, 0, 1, 0, 0, 0, 1, 1, 0, 0, 1, 1, 0, 0, 1, 1, 1, 1, 0, 1, 0, 1, 0, 1, 0, 0, 0, 0, 1, 1, 0, 0, 1, 0, 1, 0, 0, 0, 1, 1, 1, 1, 0, 0, 0, 0, 1, 0, 1, 1, 0, 0, 1, 1, 0, 0, 0, 0, 0, 1, 1, 0, 0, 1, 0, 1, 1, 0, 0, 1, 1, 0, 0, 1, 1, 1, 1, 0, 1, 0, 1, 0, 1, 0, 0, 0, 0, 0, 1, 1, 1, 0, 0, 1, 1, 0, 0, 1, 1, 1, 1, 0, 1, 0, 1, 0, 1, 0, 0, 0, 0, 1, 1, 0, 0, 1, 1, 0, 0, 0, 0, 1, 0, 1, 1, 0, 0, 1, 1, 0, 0, 0, 0, 1, 0, 0, 1, 1, 0, 1, 0, 1, 1, 1, 0, 1, 0, 1, 0, 1, 0, 0, 0, 0, 0, 1, 1, 0, 0, 1, 1, 1, 1, 0, 1, 0, 1, 0, 0, 0, 0, 0, 1, 1, 0} | 0 to 15 |

It should be noted that 0 to 15 in Table 6 to Table 15 indicate that any one of the channels 0 to 15 is an available transmission channel of the sequence. It can be learned from Table 4 to Table 15 that, in this application, available channels of some sequences are limited. This manner helps avoid a false alarm problem caused by an existing device, that is, helps be compatible with an existing device. Specifically, if the first sequence in this application is applied to all channels, because some first sequences are highly correlated with sequences including absolute values of Ipatov sequences used on some existing channels, where for ease of description, these first sequences are collectively referred to as fourth sequences, and these channels are collectively referred to as first channels below, when a new device generates a PPDU #1 based on the predefined fourth sequence and sends the PPDU #1 through the first channel, if an existing receiving end device uses an OOK demodulation mode, correlation detection is performed based on the predefined Ipatov sequence. Because the fourth sequence is highly correlated with the Ipatov sequence, the existing receiving end device considers, based on the received fourth sequence, that the PPDU #1 is a signal frame sent by the transmitting end to the existing receiving end device, and may further parse a PHR field and a physical layer payload field. However, the PPDU #1 is not sent to the existing receiving end device. In other words, false detection is caused, and overheads and energy are wasted. When an existing transmitting end device generates a PPDU #2 based on the predefined Ipatov sequence and sends the PPDU #2 through the first channel, the new device still performs cross-correlation detection by using the predefined fourth sequence. A case is similar. Therefore, this case can be avoided by limiting available channels of some sequences.

It should be understood that the sequences in Table 4 to Table 15 are merely examples. The first sequence may be any sequence in Table 4 to Table 15, or may be equivalent deformation of any sequence in Table 4 to Table 15, provided that the side lobe of the periodic cross-correlation function of the first sequence and the second sequence is the constant value. This is not limited in this application.

For example, the equivalent deformation may be performing a cyclic shift operation on any sequence in Table 4 to Table 15, performing a reversal operation on any sequence in Table 4 to Table 15, or performing a cyclic shift operation and a reversal operation on any sequence in Table 4 to Table 15 to form a new sequence. The reversal operation may also be understood as a head-to-tail inversion operation or an inverted operation. For example, a result of the reversal operation on a sequence {a, b, c, d, e} is {e, d, c, b, a}. It is assumed that a length of a sequence $\vec{C}$ is L, and there are 2L types of equivalent deformation of the sequence, including the sequence $\vec{C}$.

Optionally, when the sequence is represented, a symbol "+" may alternatively be used to represent 1, that is, 1 in Table 4 to Table 15 may be replaced with the symbol "+".

Optionally, in S210, that the transmitting end generates the PPDU includes: generating the SYNC field and the SFD field based on the basic symbol $S_i$, where the PPDU includes the SHR, and the SHR includes the SYNC field and the SFD field. The SYNC field includes K basic symbols, K is a positive integer, and the SFD field is generated based on the basic symbol $S_i$ and the preset sequence.

For example, a sequence may be first selected from Table 4 to Table 15, the selected sequence is denoted as $\vec{C}_i$ (an example of the first sequence), and then the SHR is constructed according to the following steps:

(1) The selected sequence $\vec{C}_i$ is extended to generate the basic symbol $S_i$ to adapt to a corresponding average pulse repetition frequency (PRF). The pulse repetition frequency means a quantity of pulses transmitted per second, and is the reciprocal of a pulse repetition interval (PRI). The pulse repetition interval is a time interval between a pulse and a next pulse. A process of generating $S_i$ is expressed by using a mathematical formula as follows:

$$S_i = \vec{C}_i \otimes \delta_L(n)$$

⊗ represents a Kronecker product. $\delta_L(n)$ is a Delta function, and may also be referred to as a unit pulse function.

$$\delta_L(n) = \begin{cases} 1 & n = 0 \\ 0 & n = 1, 2, \cdots, L-1 \end{cases}$$

(2) According to a specification in a standard, the basic symbol is repeated for a specified quantity K of times, to obtain the synchronization field SYNC. That is, SYNC={$S_i$, $S_i$, ..., $S_i$}. K is a positive integer.

(3) The SFD field is added. The SFD field may be obtained by extending the basic symbol $S_i$ by using the preset sequence. For example, the preset sequence may be {0, 1, 0, 1, 1, 0, 0, 1}, that is, SFD=$S_i$⊗{0, 1, 0, 1, 1, 0, 0, 1}.

The SHR that is finally obtained is $$SHR = [SYNC, SFD] = [S_i, S_i, \cdots, S_i, SFD].$$

It should be understood that, in step (1), when the basic symbol $S_i$ is generated based on the sequence $\vec{C}_i$, equivalent deformation may be first performed on the sequence $\vec{C}_i$ to obtain an equivalent deformation sequence of the sequence $\vec{C}_i$, and then $S_i$ is generated based on the equivalent deformation sequence. The equivalent deformation includes performing the cyclic shift operation and/or the reversal operation on the sequence $\vec{C}_i$.

It should be further understood that the SFD may have many different designs, and step (3) is merely used as an example. This is not limited in this application.

According to the method in this embodiment of this application, the first sequence used to generate the basic symbol is the binary sequence, that is, includes only two types of elements: 0 and 1, and the side lobe of the periodic cross-correlation function of the first sequence and the BPSK sequence corresponding to the first sequence is the constant value, so that the receiving end can implement synchronization based on the correlation detection result.

In addition, in this application, both a received signal and a transmitted signal are generated based on a binary sequence, so that the transmitting end device and the receiving end device can support on-off keying (OOK) modulation and demodulation modes, to help simplify a structure of a transceiver and reduce device power consumption.

Figure 6:
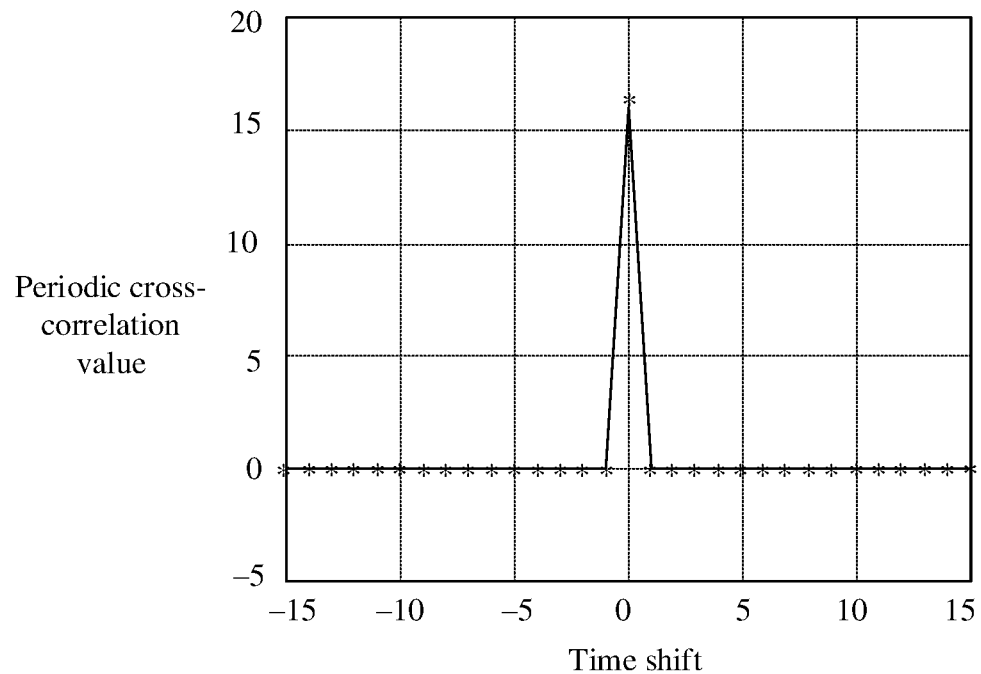
FIG. 6 shows a periodic cross-correlation function of a binary sequence with a length of 31 and a BPSK sequence corresponding to the binary sequence according to an embodiment of this application.

For example, a binary m-sequence with a length of 31 is used as an example. If the transmitting end sends a binary m-sequence, and the receiving end uses a corresponding BPSK m-sequence to perform periodic cross-correlation, a cross-correlation output result is shown in FIG. 6. It can be learned from FIG. 6 that a cross-correlation value after a shift is 0, and a cross-correlation value without a shift is 16, which has high partition, that is, a side lobe is a constant value 0, and there is only one peak value. Therefore, in this application, the SHR is designed by using good cross-correlation between the binary m-sequence and the BPSK sequence corresponding to the binary m-sequence. The binary m-sequence may be considered as an OOK modulated signal, so that a good correlation characteristic can be maintained to implement synchronization between the transmitting device and the receiving device, and an OOK modulation and demodulation technology is also supported to simplify the structure of the transceiver.

Figure 7:
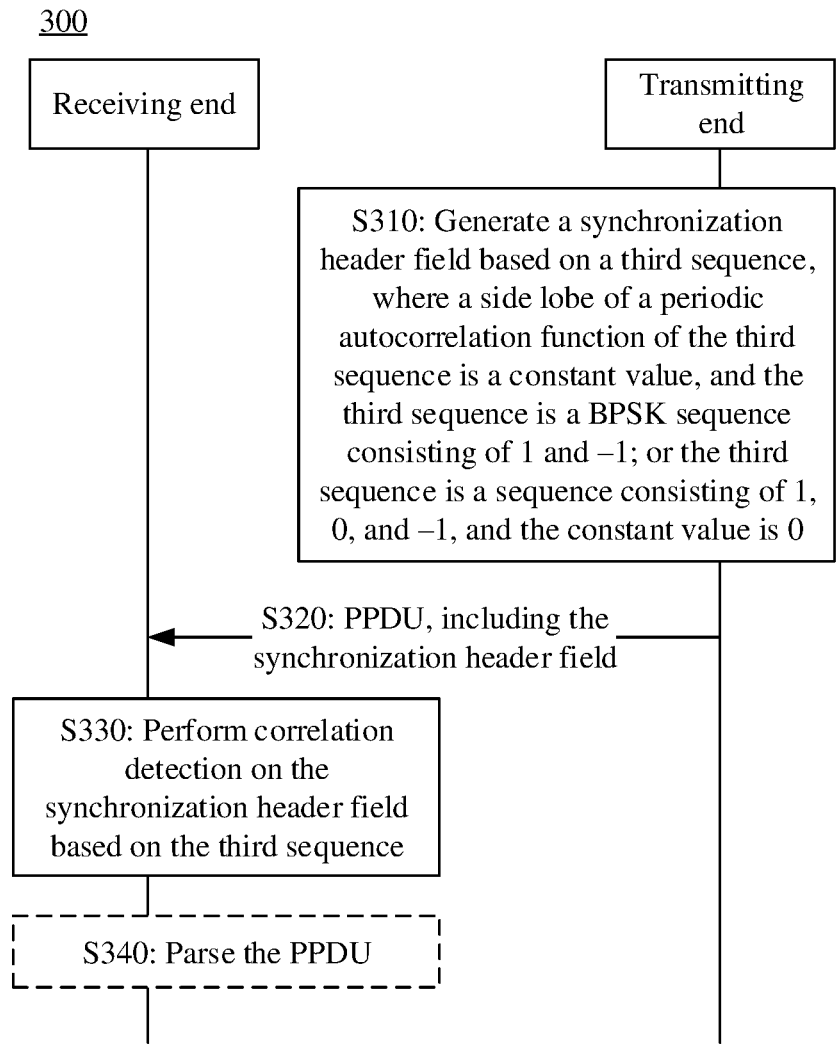
FIG. 7 is a schematic flowchart of a method for transmitting a physical layer protocol data unit according to an embodiment of this application.

FIG. 7 is a schematic flowchart of a method 300 for transmitting a physical layer protocol data unit according to an embodiment of this application. The method 300 shown in FIG. 7 may include the following steps.

S310: A transmitting end generates a synchronization header field based on a third sequence, where a side lobe of a periodic autocorrelation function of the third sequence is a constant value.

The transmitting end may generate a PPDU based on the predefined third sequence. The generated PPDU may have a structure similar to that shown in FIG. 2, and includes an SHR field, a PHR field, and a PHY payload field. The SHR field includes a SYNC field and an SFD field. The SYNC field includes a plurality of repeated basic symbols $S_i$. The SFD field is obtained by extending the basic symbol and a specified sequence. $S_i$ is generated based on the third sequence, and the third sequence may also be referred to as a preamble sequence.

It should be understood that, that $S_i$ is generated based on the third sequence may mean that $S_i$ is directly generated based on the third sequence, or may mean that equivalent deformation is first performed on the third sequence and $S_i$ is generated based on a deformed sequence.

It should be further understood that "generating a synchronization header field based on a third sequence" may also be understood as generating a basic symbol based on the third sequence, where the synchronization header field includes the basic symbol, or may be understood as generating the PPDU based on the third sequence, where the PPDU includes the synchronization header field.

For example, the equivalent deformation may be performing a cyclic shift operation on the third sequence, performing a reversal operation on the third sequence, or performing a cyclic shift operation and a reversal operation on the third sequence to form a new sequence. The reversal operation may also be understood as a head-to-tail inversion operation or an inverted operation. It is assumed that a length of the third sequence is 1, and there are 2/types of equivalent deformation of the third sequence, including the third sequence.

In this application, the side lobe of the periodic autocorrelation (periodic autocorrelation) function of the third sequence is the constant value. In other words, the periodic autocorrelation function has a unique peak value, and the peak value is greater than the constant value. For example, the constant value may be −1 or 0. Optionally, the constant value may alternatively be another value. This is not limited in this application.

It should be understood that, after periodic autocorrelation is performed on any sequence, a sum of energy of a main lobe and energy of all side lobes in an autocorrelation output result is a fixed value, the fixed value is related to a sequence length, and the energy of the main lobe is greater than a sum of the energy of all the side lobes, where the energy is determined based on an autocorrelation value. When the side lobe of the periodic autocorrelation function of the third sequence is the constant value, the periodic autocorrelation function has the unique peak value, and the peak value is greater than the constant value.

Optionally, that the side lobe is the constant value may also indicate that a cross-correlation value of the side lobe is a constant value.

It should be further understood that the periodic autocorrelation function of the third sequence may also be understood as a periodic cross-correlation function of the third sequence and the third sequence.

S320: The transmitting end sends the PPDU on a target channel, and correspondingly, a receiving end receives the PPDU on the target channel, where the PPDU includes the synchronization header field.

Optionally, the PPDU is sent in a form of a pulse signal, and the receiving end receives, on the target channel, the PPDU sent by the transmitting end. The target channel may be a channel defined in a protocol, or may be a channel preconfigured by a transmitting end device and a receiving end device.

In an optional implementation, channel numbers are 0 to 15, and the target channel may be any one of channels 0 to 15.

S330: The receiving end performs correlation detection on the synchronization header field based on the third sequence, where the side lobe of the periodic autocorrelation function of the third sequence is the constant value.

Optionally, the correlation detection may be autocorrelation detection, or may be cross-correlation detection. A specific method for correlation detection is not limited in this application.

The receiving end may determine, based on a correlation detection result, whether the PPDU is detected and a location of the PPDU.

In an example, the receiving end may perform autocorrelation based on the predefined third sequence. When a periodic peak value occurs in an autocorrelation result, a synchronization header of the PPDU is received, or it may be understood as that the PPDU is detected. In addition, the receiving end may determine a start location of the PPDU based on a location of the peak value, to implement synchronization between the transmitting end device and the receiving end device.

It should be understood that the foregoing is merely an example. A technology known to or newly developed by a person skilled in the art may be used for a specific method for determining synchronization based on a correlation detection result. This is not limited in this application.

It should be further understood that the predefinition in this application may be understood as definition in a standard.

Optionally, the method 300 may further include step S340: The receiving end parses the PPDU. For a specific parsing manner, refer to existing descriptions. This is not limited.

In an implementation, when receiving the synchronization header field, the receiving end may continue to receive a pulse, that is, receive a PHR field and a physical layer payload field of the PPDU. The receiving end may determine, by parsing the PHR field, a length of the PPDU and whether data in the PPDU is data transmitted by the transmitting end to the receiving end. When the data in the PPDU is the data transmitted to the receiving end, the receiving end parses the physical layer payload field in the PPDU, and obtains the data sent by the transmitting end. When the data in the PPDU is not the data transmitted to the receiving end, the receiving end does not parse the physical layer payload field in the PPDU.

It should be understood that, when an aperiodic peak value occurs in the correlation detection result, the receiving end determines that the PPDU is not received, and continues to receive a pulse, but does not parse the received pulse.

In an embodiment, the third sequence in the method 300 is a BPSK sequence consisting of 1 and −1.

The third sequence is the BPSK sequence consisting of 1 and −1, that is, the third sequence includes only two types of elements: 1 and −1.

Optionally, in this embodiment, the side lobe of the periodic autocorrelation function of the third sequence is −1, that is, the constant value in S310 is −1.

According to the method in the foregoing embodiment, the third sequence used to generate the synchronization header field and used by the receiving end to perform correlation detection is the BPSK sequence, that is, includes only two types of elements: −1 and 1, and the side lobe of the periodic autocorrelation function of the third sequence is the constant value, so that the receiving end can implement synchronization based on the correlation detection result.

In addition, because the BPSK sequence has no value 0 compared with an Ipatov sequence, more pulses can be sent during SHR sending by using the BPSK sequence, to help improve receiving performance, reduce a packet error rate, and increase a transmission distance, thereby improving system performance and coverage.

In an implementation of this embodiment, the third sequence is a BPSK m-sequence, where the m-sequence is a sequence, with a longest periodicity, generated by an LFSR. In other words, the third sequence may be obtained by performing phase shift keying modulation on a binary sequence generated by the LFSR. Optionally, the third sequence may alternatively be obtained through traversal or search. This is not limited in this application.

For example, Table 16 to Table 19 show BPSK m-sequences with lengths of 31, 63, 127, and 255 respectively, and the BPSK m-sequences are respectively denoted as sequences $\vec{Z}_1, \vec{Z}_2, \vec{Z}_3, \vec{Z}_4, \vec{Z}_5, \vec{Z}_6, \vec{Z}_7, \vec{Z}_8, \vec{Z}_9, \vec{Z}_{10}, \vec{Z}_{11}, \vec{Z}_{12}, \vec{Z}_{13}, \vec{Z}_{14}, \vec{Z}_{15}, \vec{Z}_{16}, \vec{Z}_{17}$, and $\vec{Z}_{18}$, where each may be considered as an example of the third sequence. Table 16 to Table 19 further show channel numbers of target channels respectively corresponding to $\vec{Z}_1, \vec{Z}_2, \vec{Z}_3, \vec{Z}_4, \vec{Z}_5, \vec{Z}_6, \vec{Z}_7, \vec{Z}_8, \vec{Z}_9, \vec{Z}_{10}, \vec{Z}_{11}, \vec{Z}_{12}, \vec{Z}_{13}, \vec{Z}_{14}, \vec{Z}_{15}, \vec{Z}_{16}, \vec{Z}_{17}$, and $\vec{Z}_{18}$. The channel numbers mean transmission channels that may be used for each sequence.

TABLE 16

| Sequence name | BPSK sequence with a length of 31 | Channel number |
|---|---|---|
| | BPSK sequence | |
| $\vec{Z}_1$ | {−1, −1, 1, 1, −1, 1, −1, −1, 1, −1, −1, −1, −1, 1, −1, 1, −1, 1, 1, 1, −1, 1, 1, −1, −1, −1, 1, 1, 1, 1, 1} | 0, 1, 8, and 12 |
| $\vec{Z}_2$ | {−1, −1, 1, −1, −1, 1, 1, −1, −1, −1, −1, 1, −1, 1, 1, −1, 1, −1, 1, −1, −1, −1, 1, 1, 1, −1, 1, 1, 1, 1, 1} | 0, 1, 8, and 12 |
| $\vec{Z}_3$ | {1, 1, 1, 1, 1, −1, 1, 1, 1, −1, −1, −1, 1, −1, 1, −1, 1, 1, 1, −1, −1, −1, −1, −1, 1, 1, −1, −1, 1, −1, −1} | 2, 5, 9, and 13 |
| $\vec{Z}_4$ | {1, 1, 1, 1, 1, −1, −1, −1, 1, 1, −1, 1, 1, 1, −1, 1, −1, 1, −1, −1, −1, −1, 1, −1, 1, 1, −1, −1} | 3, 6, 10, and 14 |
| $\vec{Z}_5$ | {−1, 1, 1, −1, −1, 1, 1, 1, −1, −1, −1, −1, 1, 1, −1, 1, −1, 1, −1, −1, 1, −1, −1, −1, 1, −1, 1, 1, 1, 1, 1} | 3, 6, 10, and 14 |

TABLE 17

BPSK sequence with a length of 63

| Sequence name | BPSK sequence | Channel number |
|---|---|---|
| $\vec{Z}_6$ | {−1, 1, −1, 1, −1, 1, 1, −1, −1, 1, 1, −1, 1, 1, 1, −1, 1, 1, −1, 1, −1, −1, 1, −1, −1, 1, 1, 1, −1, −1, −1, 1, −1, 1, 1, 1, 1, −1, −1, 1, −1, 1, −1, −1, −1, 1, 1, −1, −1, −1, −1, 1, −1, −1, −1, −1, −1, 1, 1, 1, 1, 1, 1} | 0 to 15 |
| $\vec{Z}_7$ | {−1, 1, 1, −1, 1, −1, −1, −1, 1, −1, −1, −1, −1, 1, −1, 1, 1, −1, −1, 1, −1, 1, −1, 1, −1, −1, 1, −1, −1, 1, 1, 1, 1, −1, −1, −1, −1, −1, 1, 1, −1, 1, 1, 1, −1, −1, 1, 1, −1, −1, −1, 1, 1, 1, 1, −1, 1, 1, −1, 1, 1, 1, 1} | 0 to 15 |
| $\vec{Z}_8$ | {−1, −1, 1, −1, 1, −1, 1, −1, −1, −1, 1, 1, −1, −1, 1, 1, 1, 1, −1, 1, 1, 1, −1, 1, −1, 1, 1, −1, 1, −1, −1, 1, 1, −1, 1, 1, −1, −1, −1, 1, −1, −1, 1, −1, −1, −1, −1, −1, −1, 1, 1, 1, −1, −1, −1, −1, −1, 1, −1, 1, 1, 1, 1, 1, 1} | 0 to 15 |

TABLE 18

BPSK sequence with a length of 127

| Sequence name | BPSK sequence | Channel number |
|---|---|---|
| $\vec{Z}_9$ | {−1, 1, 1, 1, −1, 1, 1, −1, 1, 1, 1, 1, −1, 1, −1, −1, −1, 1, −1, 1, 1, −1, −1, 1, −1, 1, 1, 1, 1, 1, −1, −1, −1, 1, −1, −1, −1, −1, −1, −1, 1, 1, −1, −1, 1, 1, −1, 1, 1, −1, −1, −1, 1, 1, 1, −1, −1, 1, 1, 1, −1, 1, −1, 1, 1, 1, −1, −1, −1, 1, −1, −1, 1, 1, −1, −1, −1, −1, 1, −1, 1, −1, 1, −1, 1, 1, 1, −1, 1, 1, −1, −1, 1, −1, −1, 1, 1, 1, −1, 1, −1, 1, 1, 1, −1, −1, 1, −1, −1, −1, −1, 1, 1, 1, 1, 1, 1, 1} | 0 to 3, 5, 6, 8 to 10, and 12 to 14 |
| $\vec{Z}_{10}$ | {1, 1, 1, 1, 1, 1, −1, −1, −1, −1, 1, −1, 1, −1, 1, 1, −1, −1, −1, 1, −1, −1, 1, 1, 1, 1, −1, −1, 1, −1, 1, −1, 1, −1, 1, −1, 1, −1, 1, 1, 1, −1, 1, −1, 1, −1, −1, −1, −1, −1, 1, 1, −1, −1, 1, −1, −1, −1, −1, 1, 1, 1, −1, 1, −1, 1, 1, 1, −1, −1, −1, 1, 1, −1, 1, 1, −1, −1, 1, 1, −1, −1, −1, −1, −1, −1, 1, −1, −1, −1, 1, 1, 1, 1, 1, −1, 1, −1, −1, 1, 1, −1, 1, −1, −1, −1, 1, −1, 1, 1, 1, 1, −1, 1, 1, −1, 1, 1, 1, −1} | 4, 7, 11, and 15 |

TABLE 19

BPSK sequence with a length of 255

| Sequence name | BPSK sequence | Channel number |
|---|---|---|
| $\vec{Z}_{11}$ | {−1, −1, 1, −1, −1, −1, −1, 1, −1, 1, −1, −1, 1, 1, 1, 1, 1, −1, 1, −1, 1, −1, 1, −1, 1, 1, 1, 1, −1, −1, −1, −1, −1, 1, 1, −1, −1, −1, 1, −1, 1, −1, 1, −1, 1, 1, −1, −1, 1, 1, −1, −1, 1, −1, 1, 1, 1, 1, 1, 1, −1, 1, 1, 1, 1, −1, 1, 1, −1, 1, 1, −1, −1, 1, −1, −1, −1, 1, −1, −1, 1, −1, 1, −1, 1, −1, −1, 1, 1, −1, −1, 1, −1, 1, −1, 1, 1, −1, −1, 1, 1, 1, 1, −1, −1, 1, 1, −1, 1, 1, −1, −1, −1, −1, 1, −1, −1, 1, −1, 1, 1, 1, 1, −1, −1, 1, −1, −1, 1, 1, 1, −1, 1, −1, 1, 1, 1, 1, −1, −1, −1, −1, 1, 1, −1, 1, −1, −1, −1, 1, 1, 1, −1, 1, 1, −1, 1, −1, −1, −1, −1, −1, 1, −1, 1, 1, −1, 1, 1, 1, −1, −1, 1, −1, 1, −1, −1, 1, −1, −1, 1, −1, −1, 1, −1, −1, −1, −1, −1, −1, 1, 1, 1, −1, 1, 1, 1, 1, −1, −1, −1, 1, 1, −1, −1, −1, 1, 1, −1, 1, −1, −1, −1, 1, −1, −1, −1, −1, 1, 1, 1, 1, −1, −1, −1, −1, 1, 1, 1, 1, 1, 1, 1} | 0 to 15 |
| $\vec{Z}_{12}$ | {−1, 1, −1, −1, 1, −1, −1, −1, −1, −1, −1, 1, 1, 1, −1, 1, 1, −1, −1, −1, −1, −1, 1, −1, −1, 1, 1, −1, 1, −1, −1, −1, −1, 1, 1, −1, 1, −1, 1, 1, 1, 1, −1, −1, −1, 1, 1, 1, 1, 1, 1, −1, −1, 1, 1, −1, 1, −1, −1, −1, 1, 1, 1, 1, 1, −1, 1, −1, 1, 1, −1, −1, −1, 1, 1, 1, −1, 1, 1, 1, 1, 1, −1, 1, −1, −1, 1, 1, −1, 1, 1, 1, −1, 1, 1, −1, 1, 1, −1, −1, 1, 1, −1, 1, 1, 1, −1, −1, 1, 1, −1, 1, 1, −1, 1, −1, −1, −1, 1, 1, 1, 1, 1, 1, 1, 1, 1, −1, −1, 1, 1, −1, 1, 1, 1, 1, 1, −1, 1, 1, −1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1, 1} | 0 to 15 |

TABLE 19-continued

BPSK sequence with a length of 255

| Sequence name | BPSK sequence | Channel number |
|---|---|---|
| $\vec{Z}_{13}$ | {−1, 1, 1, 1, 1, −1, −1, −1, −1, −1, 1, 1, −1, 1, −1, −1, 1, 1, −1, −1, −1, −1, 1, −1, −1, −1, 1, 1, 1, 1, 1, −1, −1, 1, −1, 1, −1, 1, 1, −1, −1, −1, 1, 1, 1, −1, −1, −1, −1, 1, 1, 1, −1, 1, 1, −1, 1, 1, −1, −1, 1, 1, −1, 1, −1, 1, 1, −1, 1, 1, 1, 1, −1, −1, −1, 1, 1, 1, −1, −1, −1, −1, −1, 1, 1, 1, −1, 1, 1, −1, −1, −1, −1, −1, 1, 1, 1, −1, −1, 1, −1, −1, 1, 1, 1, −1, 1, −1, 1, 1, 1, −1, 1, 1, 1, −1, 1, −1, −1, −1, 1, −1, 1, −1, 1, −1, 1, −1, −1, 1, −1, 1, −1, −1, −1, −1, −1, −1, −1, 1, 1, −1, −1, −1, 1, −1, −1, −1, −1, −1, 1, 1, 1, 1, 1, −1, 1, −1, 1, −1, −1, −1, 1, 1, 1, −1, 1, −1, 1, 1, −1, −1, −1, 1, 1, 1, 1, 1, 1, 1, 1, −1, 1, −1, −1, 1, −1, −1, −1, 1, 1, −1, −1, 1, 1, −1, 1, 1, −1, 1, −1, 1, −1, 1, 1, 1, 1, 1, 1, −1, −1, 1, 1, 1, −1, −1, −1, −1, 1, 1, −1, −1, 1, 1, 1, −1, −1, −1, 1, −1, 1, 1, −1, −1, 1, −1, 1, 1, −1, 1, −1, −1, 1, 1, 1, 1, −1, −1, 1, 1, −1, −1, 1, 1, 1, −1, 1, 1, 1, 1, 1, 1, 1, 1} | 0 to 15 |
| $\vec{Z}_{14}$ | {−1, 1, 1, −1, 1, 1, −1, −1, −1, 1, 1, 1, −1, −1, 1, 1, 1, 1, −1, −1, −1, −1, 1, 1, −1, 1, 1, −1, −1, 1, 1, 1, −1, −1, −1, 1, 1, 1, 1, −1, 1, 1, 1, −1, −1, −1, 1, 1, 1, −1, 1, −1, −1, −1, −1, −1, −1, −1, 1, 1, 1, 1, 1, −1, −1, −1, 1, −1, −1, 1, −1, 1, −1, 1, −1, 1, −1, −1, −1, 1, −1, −1, 1, 1, −1, 1, −1, 1, −1, −1, −1, −1, 1, −1, −1, −1, 1, −1, 1, 1, −1, 1, 1, 1, 1, −1, −1, −1, 1, 1, −1, −1, −1, −1, −1, 1, 1, −1, −1, −1, −1, −1, 1, 1, 1, 1, −1, −1, 1, 1, 1, 1, −1, −1, 1, 1, −1, −1, 1, −1, 1, −1, 1, 1, 1, −1, 1, 1, 1, 1, 1, −1, −1, 1, −1, 1, 1, −1, −1, 1, −1, 1, 1, 1, −1, 1, 1, 1, −1, −1, −1, 1, −1, −1, 1, −1, 1, −1, 1, −1, 1, −1, 1, 1, 1, −1, 1, −1, 1, 1, 1, −1, 1, −1, 1, 1, 1, 1, −1, −1, −1, 1, 1, 1, −1, 1, −1, −1, −1, −1, −1, 1, −1, 1, 1, 1, 1, 1, −1, 1, −1, 1, 1, 1, 1, 1, 1, −1, 1, 1, 1, 1, 1, 1, 1, 1, 1, 1, 1, 1, 1, 1, 1, 1} | 0 to 15 |
| $\vec{Z}_{15}$ | {−1, −1, 1, 1, −1, 1, 1, 1, 1, −1, 1, 1, 1, −1, 1, −1, −1, −1, −1, −1, −1, −1, 1, −1, 1, 1, −1, 1, 1, −1, −1, −1, 1, 1, 1, 1, 1, 1, −1, 1, −1, 1, 1, 1, 1, −1, −1, 1, −1, 1, −1, 1, 1, 1, −1, 1, −1, 1, −1, −1, −1, −1, 1, −1, −1, −1, −1, 1, 1, 1, −1, 1, 1, 1, 1, 1, 1, −1, 1, 1, −1, −1, −1, −1, −1, 1, 1, −1, −1, −1, 1, −1, −1, 1, 1, −1, −1, −1, −1, −1, 1, 1, 1, −1, 1, 1, −1, 1, 1, 1, −1, 1, 1, 1, −1, 1, −1, −1, −1, −1, 1, −1, 1, −1, 1, 1, −1, −1, 1, 1, 1, 1, −1, −1, 1, 1, 1, 1, −1, 1, −1, 1, 1, 1, 1, −1, 1, 1, 1, −1, 1, 1, 1, −1, 1, −1, −1, −1, 1, 1, 1, 1, −1, −1, −1, −1, 1, −1, 1, 1, −1, 1, −1, 1, 1, 1, 1, −1, −1, −1, 1, −1, −1, −1, 1, 1, 1, −1, 1, 1, −1, −1, 1, 1, 1, −1, 1, −1, 1, 1, −1, 1, −1, 1, −1, 1, 1, 1, −1, 1, 1, −1, 1, 1, 1, 1, 1, −1, 1, −1, 1, −1, 1, 1, 1, −1, 1, 1, 1, 1, −1, 1, 1, 1, 1, −1, 1, −1, 1, 1, 1, 1, 1, 1, 1, 1, 1} | 0 to 15 |
| $\vec{Z}_{16}$ | {−1, −1, −1, 1, 1, −1, −1, 1, 1, −1, 1, 1, −1, 1, 1, −1, −1, −1, 1, −1, −1, 1, −1, −1, 1, 1, −1, −1, 1, 1, −1, −1, −1, −1, 1, 1, 1, 1, 1, −1, 1, 1, 1, −1, 1, 1, 1, 1, 1, −1, −1, 1, 1, −1, 1, 1, −1, −1, −1, −1, 1, 1, 1, 1, 1, −1, 1, 1, 1, −1, −1, 1, 1, −1, −1, 1, −1, −1, 1, 1, 1, −1, 1, −1, 1, −1, −1, −1, 1, 1, 1, 1, 1, 1, 1, −1, −1, −1, −1, −1, 1, 1, 1, 1, 1, −1, 1, 1, 1, 1, −1, 1, 1, 1, −1, −1, 1, −1, −1, 1, −1, 1, 1, 1, 1, −1, −1, −1, 1, 1, 1, −1, −1, 1, −1, −1, 1, −1, 1, 1, 1, 1, −1, −1, 1, 1, −1, 1, 1, 1, 1, 1, 1, 1, 1, 1, 1, 1, 1, 1, −1, 1, 1, 1, 1, 1, 1, 1, 1, 1, −1, 1, 1, 1, 1, 1, 1, 1, −1, 1, 1, −1, −1, −1, 1, −1, −1, 1, −1, 1, 1, −1, 1, 1, 1, −1, −1, 1, −1, 1, 1, 1, 1, −1, 1, 1, −1, 1, −1, 1, −1, −1, −1, 1, −1, −1, −1, −1, −1, 1, 1, −1, 1, 1, 1, 1, −1, −1, −1, −1, −1, −1, −1, 1, −1, 1, −1, −1, −1, 1, 1, 1, 1, 1, 1, 1, 1} | 0 to 15 |
| $\vec{Z}_{17}$ | {−1, 1, −1, 1, −1, 1, 1, 1, −1, −, 1, 1, 1, −1, −1, 1, −1, −1, 1, 1, −1, 1, −1, 1, −1, −1, −1, 1, 1, 1, −1, 1, 1, 1, −1, −1, −1, −1, 1, 1, −1, 1, −1, −1, 1, 1, 1, −1, −1, −1, −1, 1, 1, −1, −1, −1, 1, 1, −1, −1, 1, 1, −1, −1, 1, 1, −1, 1, 1, 1, −1, 1, 1, 1, 1, −1, −1, 1, 1, −1, −1, −1, 1, −1, 1, 1, 1, −1, −1, −1, −1, 1, 1, 1, 1, −1, 1, 1, 1, 1, 1, 1, 1, 1, −1, −1, 1, 1, −1, −1, 1, −1, 1, 1, −1, −1, −1, −1, 1, 1, 1, 1, 1, 1, −1, 1, −1, 1, 1, 1, 1, −1, −1, 1, 1, 1, −1, 1, 1, −1, 1, −1, −1, −1, −1, −1, 1, −1, 1, 1, 1, −1, −1, 1, −1, 1, 1, −1, 1, −1, −1, 1, 1, −1, 1, −1, 1, −1, −1, 1, 1, 1, 1, −1, 1, −1, 1, 1, 1, 1, 1, 1, −1, 1, 1, 1, 1, −1, 1, 1, 1, 1, 1, 1, −1, −1, 1, 1, 1, 1, −1, −1, −1, −1, 1, −1, −1, 1, −1, 1, 1, 1, −1, 1, 1, 1, −1, −1, 1, −1, −1, −1, 1, 1, 1, 1, −1, 1, 1, 1, 1, −1, −1, −1, −1, 1, −1, 1, 1, 1, 1, −1, 1, 1, 1, 1, 1, 1, 1, 1, 1, 1, 1, 1} | 0 to 15 |
| $\vec{Z}_{18}$ | {−1, 1, 1, −1, 1, −1, −1, 1, 1, 1, −1, −1, −1, −1, 1, −1, 1, −1, 1, −1, −1, −1, −1, −1, 1, −1, 1, 1, 1, 1, −1, −1, 1, 1, 1, −1, 1, −1, −1, −1, −1, −1, 1, −1, −1, 1, 1, 1, 1, 1, 1, 1, 1, 1, 1, 1, 1, 1, 1, −1, −1, 1, 1, 1, 1, 1, −1, 1, −1, 1, 1, −1, 1, 1, 1, 1, −1, 1, 1, 1, −1, 1, −1, 1, 1, −1, 1, −1, 1, −1, −1, 1, 1, 1, −1, −1, 1, −1, −1, 1, 1, 1, −1, 1, 1, 1, −1, 1, 1, 1, 1, 1, −1, 1, −1, −1, −1, −1, −1, 1, 1, −1, 1, 1, 1, 1, 1, 1, −1, −1, 1, −1, 1, 1, 1, 1, 1, 1, 1, 1, 1, 1, 1, −1, 1, 1, −1, 1, 1, 1, 1, 1, 1, −1, 1, −1, −1, 1, 1, 1, 1, 1, 1, −1, 1, 1, 1, −1, 1, 1, 1, 1, 1, 1, 1, 1, −1, 1, 1, 1, 1, −1, 1, −1, −1, −1, 1, 1, 1, −1, 1, 1, 1, −1, −1, 1, −1, 1, 1, 1, −1, 1, 1, 1, −1, −1, 1, 1, 1, 1, 1, 1, −1, 1, −1, 1, 1, −1, 1, 1, 1, 1, 1, −1, −1, 1, −1, 1, −1, −1, 1, 1, 1, −1, 1, 1, 1, 1, 1, −1, 1, 1, 1, 1, −1, −1, 1, −1, 1, −1, 1, 1, 1, −1, 1, 1, 1, 1, 1, 1, 1, 1} | 0 to 15 |

It should be understood that, in an actual application process, available transmission channels may be grouped, and different groups are respectively used for different equivalent deformation sequences of the sequence. For example, for the sequence $\vec{Z}_6$, channel numbers of available channels are 0 to 15, that is, 16 channels in total. The 16 channels may be grouped as follows: A group 1 includes channels numbered 0, 1, 8, and 12, a group 2 includes channels numbered 2, 5, 9, and 13, a group 3 includes channels numbered 3, 6, 10, and 14, and a group 4 includes channels numbered 4, 7, 11, and 15. The group 1, the group 2, the group 3, and the group 4 are respectively used for different equivalent deformation sequences of the sequence $\vec{Z}_6$.

In an implementation of this embodiment, the third sequence may alternatively be a BPSK sequence with a length of 35, 39, 47, 79, 95, 159, 191, or 319. Table 20 to Table 27 show some BPSK sequences with lengths of 35, 39, 47, 79, 95, 159, 191, and 319 respectively, and the BPSK sequences are respectively denoted as sequences $\vec{Z}_{19}$, $\vec{Z}_{20}$, $\vec{Z}_{21}$, $\vec{Z}_{22}$, $\vec{Z}_{23}$, $\vec{Z}_{24}$, $\vec{Z}_{25}$, and $\vec{Z}_{26}$, where each may be considered as an example of the third sequence.

TABLE 20

BPSK sequence with a length of 35

| Sequence name | BPSK sequence | Channel number |
|---|---|---|
| $\vec{Z}_{19}$ | {−1, 1, 1, 1, −1, −1, 1, −1, −1, −1, −1, 1, −1, 1, −1, 1, 1, −1, −1, 1, −1, −1, 1, −1, 1, 1, 1, −1, −1, −1, 1, 1, 1, 1, 1} | 0 to 15 |

TABLE 21

BPSK sequence with a length of 39

| Sequence name | BPSK sequence | Channel number |
|---|---|---|
| $\vec{Z}_{20}$ | {1, 1, −1, −1, 1, 1, 1, 1, −1, 1, −1, 1, −1, −1, −1, −1, 1, 1, −1, −1, 1, 1, −1, −1, 1, 1, 1, 1, −1, 1, −1, 1, −1, −1, −1, −1, 1, 1, −1} | 0 to 15 |

TABLE 22

BPSK sequence with a length of 47

| Sequence name | BPSK sequence | Channel number |
|---|---|---|
| $\vec{Z}_{21}$ | {1, −1, 1, −1, −1, −1, 1, 1, 1, −1, 1, 1, 1, −1, 1, −1, −1, −1, 1, 1, 1, −1, 1, −1, 1, −1, 1, −1, −1, −1, 1, 1, 1, −1, 1, −1, 1, −1, 1, −1, −1, −1, 1, 1, 1, −1, 1} | 0 to 15 |

TABLE 23

BPSK sequence with a length of 79

| Sequence name | BPSK sequence | Channel number |
|---|---|---|
| $\vec{Z}_{22}$ | {1, 1, −1, −1, 1, 1, 1, 1, −1, 1, −1, 1, −1, −1, −1, −1, 1, 1, −1, −1, 1, 1, −1, −1, 1, 1, 1, 1, −1, 1, −1, 1, −1, −1, −1, −1, 1, 1, −1, −1, 1, 1, −1, −1, 1, 1, 1, 1, −1, 1, −1, 1, −1, −1, −1, −1, 1, 1, −1, −1, 1, 1, −1, −1, 1, 1, 1, 1, −1, 1, −1, 1, −1, −1, −1, −1, 1, 1, −1} | 0 to 15 |

TABLE 24

BPSK sequence with a length of 95

| Sequence name | BPSK sequence | Channel number |
|---|---|---|
| $\vec{Z}_{23}$ | {1, −1, 1, −1, −1, −1, 1, 1, 1, −1, 1, −1, 1, −1, 1, −1, −1, −1, 1, 1, 1, −1, 1, −1, 1, −1, 1, −1, −1, −1, 1, 1, 1, −1, 1, −1, 1, −1, 1, −1, −1, −1, 1, 1, 1, −1, 1, −1, −1, −1, 1, 1, 1, −1, 1, −1, 1, −1, −1, −1, 1, 1, 1, −1, 1, −1, 1, −1, 1, −1, −1, −1, 1, 1, 1, −1, 1, −1, 1, −1, 1, −1, −1, −1, 1, 1, 1, −1, 1, −1, 1, −1, −1, −1, 1} | 0 to 15 |

TABLE 25

BPSK sequence with a length of 159

| Sequence name | BPSK sequence | Channel number |
|---|---|---|
| $\vec{Z}_{24}$ | {1, 1, −1, −1, 1, 1, 1, 1, −1, 1, −1, 1, −1, −1, −1, −1, 1, 1, −1, −1, 1, 1, −1, −1, 1, 1, 1, 1, −1, 1, −1, 1, −1, −1, −1, −1, 1, 1, −1, −1, 1, 1, −1, −1, 1, 1, 1, 1, −1, 1, −1, 1, −1, −1, −1, −1, 1, 1, −1, −1, 1, 1, −1, −1, 1, 1, 1, 1, −1, 1, −1, 1, −1, −1, −1, −1, 1, 1, −1, −1, 1, 1, −1, −1, 1, 1, 1, 1, −1, 1, −1, 1, −1, −1, −1, −1, 1, 1, −1, −1, 1, 1, −1, −1, 1, 1, 1, 1, −1, 1, −1, 1, −1, −1, −1, −1, 1, 1, −1, −1, 1, 1, −1, −1, 1, 1, 1, 1, −1, 1, −1, 1, −1, −1, −1, −1, 1, 1, −1, −1, 1, 1, −1, −1, 1, 1, 1, 1, −1, 1, −1, 1, −1, −1, −1, −1, 1, 1, −1} | 0 to 15 |

TABLE 26

BPSK sequence with a length of 191

| Sequence name | BPSK sequence | Channel number |
|---|---|---|
| $\vec{Z}_{25}$ | {1, −1, 1, −1, −1, −1, 1, 1, 1, −1, 1, −1, 1, −1, 1, −1, −1, −1, 1, 1,<br>1, −1, 1, −1, 1, −1, 1, −1, −1, −1, 1, 1, 1, −1, 1, −1, 1, −1,<br>1, −1, −1, −1, 1, 1, 1, −1, 1, −1, 1, −1, 1, −1, −1, −1, 1, 1, 1, −1,<br>1, −1, 1, −1, 1, −1, −1, −1, 1, 1, 1, −1, 1, −1, 1, −1, 1, −1, −1, −1,<br>1, 1, 1, −1, 1, −1, 1, −1, 1, −1, −1, −1, 1, 1, 1, −1, 1, −1, 1, −1,<br>1, −1, −1, −1, 1, 1, 1, −1, 1, −1, 1, −1, 1, −1, −1, −1, 1, 1, 1, −1, 1, −1,<br>1, −1, 1, −1, −1, −1, 1, 1, 1, −1, 1, −1, 1, −1, 1, −1, −1, −1, 1, 1,<br>1, −1, 1, −1, 1, −1, 1, −1, −1, −1, 1, 1, 1, −1, 1, −1, 1, −1,<br>1, −1, −1, −1, 1, 1, 1, −1, 1, −1, 1, −1, 1, −1, −1, −1, 1, 1,<br>1, −1, 1, −1, 1, −1, 1, −1, −1, 1, 1, 1, −1, 1} | 0 to 15 |

TABLE 27

BPSK sequence with a length of 319

| Sequence name | BPSK sequence | Channel number |
|---|---|---|
| $\vec{Z}_{26}$ | {1, 1, −1, −1, 1, 1, 1, 1, −1, 1, −1, 1, −1, −1, −1, −1, 1, 1, −1, −1,<br>1, 1, −1, −1, 1, 1, 1, 1, −1, 1, −1, 1, −1, −1, −1, −1, 1, 1, −1, −1,<br>1, 1, −1, −1, 1, 1, 1, 1, −1, 1, −1, 1, −1, −1, −1, −1, 1, 1, −1, −1,<br>1, 1, −1, −1, 1, 1, 1, 1, −1, 1, −1, 1, −1, −1, −1, −1, 1, 1, −1, −1,<br>1, 1, −1, −1, 1, 1, 1, 1, −1, 1, −1, 1, −1, −1, −1, −1, 1, 1, −1, −1,<br>1, 1, −1, −1, 1, 1, 1, 1, −1, 1, −1, 1, −1, −1, −1, −1, 1, 1, −1, −1,<br>1, 1, −1, −1, 1, 1, 1, 1, −1, 1, −1, 1, −1, −1, −1, −1, 1, 1, −1, −1,<br>1, 1, −1, −1, 1, 1, 1, 1, −1, 1, −1, 1, −1, −1, −1, −1, 1, 1, −1, −1,<br>1, 1, −1, −1, 1, 1, 1, 1, −1, 1, −1, 1, −1, −1, −1, −1, 1, 1, −1, −1,<br>1, 1, −1, −1, 1, 1, 1, 1, −1, 1, −1, 1, −1, −1, −1, −1, 1, 1, −1, −1,<br>1, 1, −1, −1, 1, 1, 1, 1, −1, 1, −1, 1, −1, −1, −1, −1, 1, 1, −1, −1,<br>1, 1, −1, −1, 1, 1, 1, 1, −1, 1, −1, 1, −1, −1, −1, −1, 1, 1, −1, −1,<br>1, 1, −1, −1, 1, 1, 1, 1, −1, 1, −1, 1, −1, −1, −1, −1, 1, 1, −1, −1,<br>1, 1, −1, −1, 1, 1, 1, 1, −1, 1, −1, 1, −1, −1, −1, −1, 1, 1, −1, −1,<br>1, 1, −1, −1, 1, 1, 1, 1, −1, 1, −1, 1, −1, −1, −1, −1, 1, 1, −1, −1,<br>1, 1, −1, −1, 1, 1, 1, 1, −1, 1, −1, 1, −1, −1, −1, 1, 1, −1} | 0 to 15 |

It should be noted that 0 to 15 in Table 17 and Table 19 to Table 27 indicate that any one of the channels 0 to 15 is an available transmission channel of the sequence. It can be learned from Table 16 to Table 27 that, in this application, available channels of some sequences are limited. This manner helps avoid a false alarm problem caused by an existing device, that is, helps be compatible with an existing device. Specifically, if the third sequence in this application is applied to all channels, because some third sequences are highly correlated with sequences including absolute values of Ipatov sequences used on some existing channels, where for ease of description, these third sequences are collectively referred to as fifth sequences, and these channels are collectively referred to as second channels below, when a new device generates a PPDU #3 based on the predefined fifth sequence and sends the PPDU #3 through the second channel, if an existing receiving end device uses an OOK demodulation mode, correlation detection is performed based on the predefined Ipatov sequence. Because the fifth sequence is highly correlated with the Ipatov sequence, the existing receiving end device easily considers that the PPDU #3 is a signal frame sent by the transmitting end to the existing receiving end device, and may further parse a PHR field and a physical layer payload field. However, the PPDU #3 is not sent to the existing receiving end device. In other words, false detection is caused, and overheads and energy are wasted. When an existing transmitting end device generates a PPDU #4 based on the predefined Ipatov sequence and sends the PPDU #4 through the second channel, the new device still performs cross-correlation detection by using the predefined fifth sequence. A case is similar. Therefore, this case can be avoided by limiting available channels of some sequences.

It should be understood that the sequences in Table 16 to Table 27 are merely examples. The third sequence may be any sequence in Table 16 to Table 27, or may be equivalent deformation of any sequence in Table 16 to Table 27, provided that the side lobe of the periodic autocorrelation function of the third sequence is the constant value. This is not limited in this application.

For example, the equivalent deformation may be performing a cyclic shift operation on any sequence in Table 16 to Table 27, performing a reversal operation on any sequence in Table 16 to Table 27, or performing a cyclic shift operation and a reversal operation on any sequence in Table 16 to Table 27 to form a new sequence. The reversal operation may also be understood as a head-to-tail inversion operation or an inverted operation. For example, a result of the reversal operation on a sequence {a, b, c, d, e} is {e, d, c, b, a}. It is assumed that a length of the third sequence is L, and there are 2L types of equivalent deformation of the first sequence, including the third sequence.

Optionally, when the sequence is represented, a symbol "+" may be used to represent 1, and a symbol "−" may be used to represent −1, that is, 1 in Table 16 to Table 27 may be replaced with the symbol "+", and −1 may be replaced with the symbol "−".

Optionally, in this embodiment, in S310, that the transmitting end generates the PPDU includes: generating the SYNC field and the SFD field based on the basic symbol $S_i$, where the PPDU includes the SHR, and the SHR includes the SYNC field and the SFD field. The SYNC field includes K basic symbols, K is a positive integer, and the SFD field is generated based on the basic symbol $S_i$ and the preset sequence.

For example, a sequence may be first selected from Table 16 to Table 27, the selected sequence is denoted as $\vec{Z}_i$ (an example of the third sequence), and then the SHR is constructed according to the following steps:

(1) The selected sequence $\vec{Z}_i$ is extended to generate the basic symbol $S_i$ to adapt to a corresponding PRE A process of generating $S_i$ is expressed by using a mathematical formula as follows:

$$S_i = \vec{Z}_i \otimes \delta_L(n)$$

$\otimes$ represents a Kronecker product, where $$\delta_L(n) = \begin{cases} 1 & n = 0 \\ 0 & n = 1, 2, \cdots, L-1 \end{cases}.$$

(2) According to a specification in a standard, the basic symbol is repeated for a specified quantity K of times, to obtain the synchronization field SYNC. That is, SYNC={$S_i$, $S_i$, ..., $S_i$}. K is a positive integer.

(3) The SFD field is added. The SFD field may be obtained by extending the basic symbol $S_i$ by using the preset sequence. For example, the preset sequence may be {0, 1, 0, −1, 1, 0, 0, −1}, that is, SFD=$S_i \otimes$ {0, 1, 0, −1, 1, 0, 0, −1}.

The SHR that is finally obtained is $$SHR = [SYNC, SFD] = [S_i, S_i, \cdots, S_i, SFD].$$

It should be understood that, in step (1), when the basic symbol $S_i$ is generated based on the sequence $\vec{Z}_i$, equivalent deformation may be first performed on the sequence $\vec{Z}_i$ to obtain an equivalent deformation sequence of the sequence $\vec{Z}_i$, and then $S_i$ is generated based on the equivalent deformation sequence. The equivalent deformation includes performing the cyclic shift operation and/or the reversal operation on the sequence $\vec{Z}_i$.

It should be further understood that the SFD may have many different designs, and step (3) is merely used as an example. This is not limited in this application.

According to the method in this embodiment of this application, the third sequence used to generate the basic symbol is the BPSK sequence, that is, includes only two types of elements: −1 and 1, and the side lobe of the periodic cross-correlation function of the third sequence is the constant value, so that the receiving end can implement synchronization based on the correlation detection result.

In addition, because the BPSK sequence has no value 0 compared with an Ipatov sequence, more pulses can be sent during SHR sending by using the BPSK sequence, to help improve receiving performance, reduce a packet error rate, and increase a transmission distance, thereby improving system performance and coverage.

Figure 8:
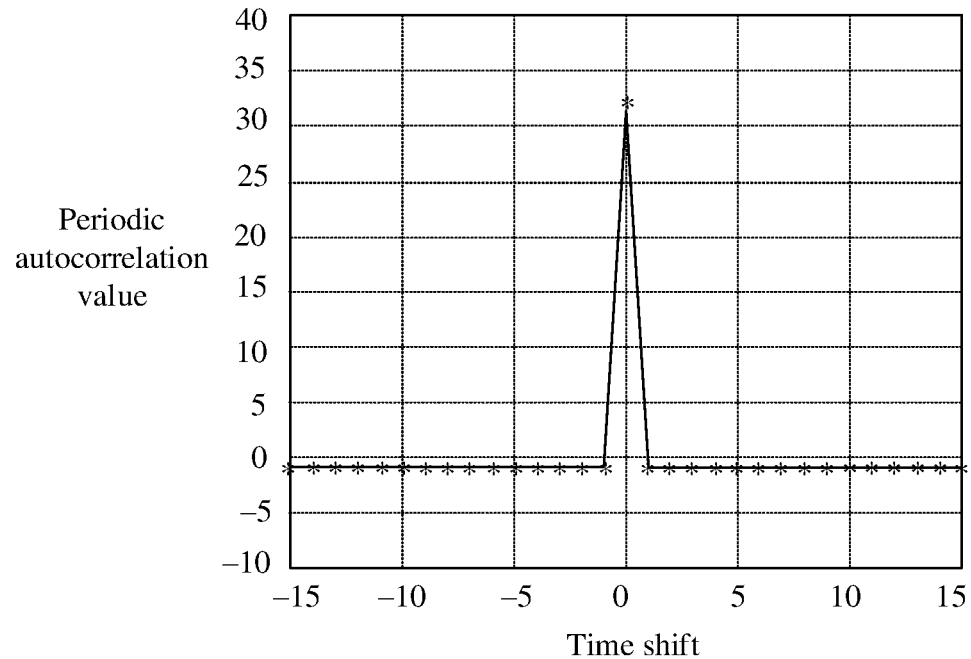
FIG. 8 shows a periodic autocorrelation function of a BPSK sequence with a length of 31 according to an embodiment of this application.

For example, a BPSK m-sequence with a length of 31 is used as an example. If the transmitting end sends a BPSK m-sequence, and the receiving end performs periodic autocorrelation on a same sequence, an autocorrelation output result is shown in FIG. 8. It can be learned from FIG. 8 that an autocorrelation value after a shift is −1, and an autocorrelation value without a shift is 31, which has high partition, that is, a side lobe is a constant value −1, and there is only one peak value. In addition, a ratio of the peak value to the side lobe further increases as a sequence length increases. Therefore, in this application, the SHR is designed by using good autocorrelation of the BPSK m-sequence, so that a good correlation characteristic can be maintained to implement synchronization between the transmitting device and the receiving device, and a quantity of transmitted pulses is also increased to improve receiving performance.

In another embodiment, the third sequence in the method 300 is a sequence consisting of 1, 0, and −1, and the side lobe of the periodic autocorrelation function of the third sequence is 0, that is, the constant value in S310 is 0.

According to the method in the foregoing embodiment, the third sequence used to generate the synchronization header field and used by the receiving end to perform correlation detection is the sequence consisting of 1, 0, and −1, and the side lobe of the periodic autocorrelation function of the third sequence is 0, so that the receiving end can implement synchronization based on the correlation detection result.

In addition, because the side lobe of the periodic autocorrelation function of the third sequence is 0, there is an optimal periodic autocorrelation characteristic. Using the sequence enables the receiving end to have a strong capability of resisting multipath interference, to help improve receiving performance, thereby improving system performance and coverage.

In an implementation of this embodiment, the third sequence may be generated in the following manner:

Manner 1: The third sequence is represented as {x(0), x(1), x(2), ..., x(L−1)} where a length L of the third sequence may be determined according to a formula (1):

$$L = \frac{p^m - 1}{p - 1}, \tag{1}$$

where m is an odd number, and p is an odd prime number.

For example, when m=5 and p=3, a sequence with a length of 121 may be generated; when m=3 and p=11, a sequence with a length of 133 may be generated; when m=3 and p=13, a sequence with a length of 183 may be generated; when m=3 and p=17, a sequence with a length of 307 may be generated; and when m=3 and p=19, a sequence with a length of 381 may be generated.

An $(i+1)^{th}$ element x(i) in the third sequence may be generated according to the following formula (2):

$$x(i) = \begin{cases} (-1)^{i+k}, & Tr(\alpha^i) = \alpha^{Lk} \\ 0, & Tr(\alpha^i) = 0 \end{cases}, \tag{2}$$

where

α is any primitive element on a finite field GF($p^m$), $$Tr(\alpha^i) = \sum_{0}^{m-1} \alpha^{iq^n}$$

is a trace function on the finite field GF($p^m$), k enables Tr($\alpha^i$)=$\alpha^{Lk}$, a value of k is 0, 1, 2, . . . , p−1, and a value of i is 0, 1, 2, . . . , L−1.

For example, sequences $\vec{A}_1$, $\vec{A}_2$, $\vec{A}_3$, $\vec{A}_4$, $\vec{A}_5$, $\vec{A}_6$, and $\vec{A}_7$ in Table 28 are sequences with different lengths generated according to the foregoing formula (1) and formula (2).

When m=5 and p=3, a sequence $\vec{A}_1$ with a length L=121 is generated;

when m=3 and p=11, a sequence $\vec{A}_2$ with a length of L=133 is generated;

when m=3 and p=13, a sequence $\vec{A}_3$ with a length L=183 is generated;

when m=3 and p=17, a sequence $\vec{A}_4$ with a length L=307 is generated;

when m=3 and p=19, a sequence $\vec{A}_5$ with a length of L=381 is generated;

when m=3 and p=23, a sequence $\vec{A}_6$ with a length L=553 is generated; and when m=3 and p=31, a sequence $\vec{A}_7$ with a length L=993 is generated.

Side lobes of periodic autocorrelation functions of these sequences are all 0, and there is an optimal periodic autocorrelation characteristic, and may be used to design the SHR.

Manner 2: The third sequence is generated based on a sequence a (which may also be referred to as a sixth sequence) and a sequence b (which may also be referred to as a seventh sequence). Both the sequence a and the sequence b are sequences including 1, 0, and −1. A length of the sequence a is $L_1$, a length of the sequence b is $L_2$, and $L_1$ and $L_2$ are mutually prime, that is, a greatest common divisor of $L_1$ and $L_2$ is 1. A sequence c (which may also be referred to as a sixth sequence) is formed by using $L_2$ copies of the sequence a, and a sequence d (which may also be referred to as a ninth sequence) is formed by using $L_1$ copies of the sequence b. Lengths of a sequence $a_1$ and a sequence $b_1$ are both $L_1*L_2$. A sequence with a length of $L_1*L_2$ may be formed by correspondingly multiplying elements of the sequence $a_1$ by elements of the sequence $b_1$. The sequence also has an optimal autocorrelation characteristic, and may be used to design the SHR. For example, the sequence a is represented as {$a_1$, $a_2$, . . . $a_{L1}$}, and the sequence b is represented as {$b_1$, $b_2$, . . . , $b_{L2}$}. In this case, the sequence c obtained by using $L_2$ copies of the sequence a is {$a_1$, $a_2$, . . . , $a_{L1}$, $a_1$, $a_2$, . . . , $a_{L1}$, . . . (including $L_2$-3 $a_1$, $a_2$, . . . , $a_{L1}$), $a_1$, $a_2$, . . . , $a_{L1}$}, the sequence d obtained by using $L_1$ copies of the sequence b is {$b_1$, $b_2$, . . . , $b_{L2}$, $b_1$, $b_2$, . . . (including $L_1$-3 $b_1$, $b_2$, . . . , $b_{L2}$), $b_{L2}$, . . . $b_1$, $b_2$, . . . , $b_{L2}$}, and a $j^{th}$ element of the third sequence is obtained by multiplying a $j^{th}$ element of the sequence c by a $j^{th}$ element of the sequence d, where a value off is 1, 2, . . . , $L_1*L_2$.

For example, $\vec{A}_8$, $\vec{A}_9$, and $\vec{A}_{10}$ in Table 28 are sequences with different lengths obtained in Manner 2.

A length of the sequence $\vec{A}_8$ is 546, the sequence $\vec{A}_8$ is generated by using a sequence $\vec{A}_{81}$ with a length of 6 and a sequence $\vec{A}_{82}$ with a length of 91, the sequence $\vec{A}_{81}$ is {1, 0, −1, 1, 0, 1}, and the sequence $\vec{A}_{82}$ is generated in Manner 1, where m=3 and p=9.

A length of the sequence $\vec{A}_9$ is 1023, the sequence $\vec{A}_9$ is generated by using a sequence $\vec{A}_{91}$ with a length of 31 and a sequence $\vec{A}_{92}$ with a length of 33, the sequence $\vec{A}_{91}$ is {1, 0, 1, 1, 0, 0, 1, 1, −1, 1, −1, 0, 0, 0, 1, 1, 0, 1, −1, −1, 0, 1, 0, −1, 0, 0, 0, 0, −1, 0, 0}, and the sequence $\vec{A}_{92}$ is {1, 1, 1, 1, 0, 1, 1, −1, 1, −1, 1, 0, 1, −1, 0, 0, −1, 0, −1, −1, 1, 1, 1, 0, −1, 1, 0, −1, 1, 1, −1, −1, 0}.

A length of the sequence $\vec{A}_{10}$ is 1023, the sequence $\vec{A}_{10}$ is generated by using a sequence $\vec{A}_{101}$ with a length of 31 and a sequence $\vec{A}_{102}$ with a length of 33, the sequence $\vec{A}_{101}$ is {1, 0, 1, 1, 1, −1, 0, −1, −1, −1, 0, 1, −1, 1, 1, −1, 0, 1, −1, 1, −1, 1, 1, 1, −1, −1, 1, 1, 1, 0, 0}, and the sequence $\vec{A}_{102}$ is {1, 1, 1, 1, 0, 1, 1, −1, 1, −1, 1, 0, 1, −1, 0, 0, −1, 0, −1, −1, 1, 1, 1, 0, −1, 1, 0, −1, 1, 1, −1, −1, 0}. In other words, the sequence $\vec{A}_{102}$ and the sequence $\vec{A}_{92}$ are a same sequence.

TABLE 28

| Sequence name | Sequence | Channel number |
| --- | --- | --- |
| $\vec{A}_1$ | 1, 0, 0, 0, −1, 1, 0, 0, −1, 0, 1, 0, −1, −1, 1, 1, −1, 1, 0, −1, 0, 0, 1, −1, −1, 0, 1, 0, 1, −1, 1, 1, 1, 0, 0, −1, −1, 1, 0, −1, 1, 0, 1, −1, 0, 1, 1, 0, −1, 1, −1, 1, −1, 0, 0, 0, 0, −1, 0, 0, 0, −1, −1, 0, 0, −1, 1, −1, 0, −1, 0, 0, −1, −1, 0, −1, 1, 1, −1, −1, 0, −1, 0, 1, −1, −1, −1, −1, 1, 0, 1, 1, 0, 1, 1, −1, 1, 1, −1, 0, 0, −1, 0, −1, 0, −1, −1, −1, −1, −1, 1, 1, 1, 1, 0, −1, −1, −1, 1, −1, 1 | 0 to 15 |
| $\vec{A}_2$ | −1, 0, −1, −1, 1, 1, 1, 1, 1, 1, 1, 0, −1, 1, 1, −1, −1, −1, 0, −1, −1, 1, −1, −1, −1, 1, −1, −1, −1, 0, 1, −1, −1, −1, 1, 1, −1, 1, −1, 1, 1, 1, −1, −1, 1, 0, −1, 1, 1, 1, 0, 0, −1, 1, 1, 1, 1, 1, −1, 1, −1, −1, −1, 1, 0, 1, 1, −1, −1, 1, 1, 1, 1, −1, 1, 1, −1, 1, 1, 1, −1, −1, 1, 1, 1, 1, −1, −1, −1, 1, 0, −1, 1, 1, −1, 1, 1, −1, 1, 1, 1, 1, −1, 1, 1, −1, 1, 1, −1, 1, 1, 1, 1, 1, −1, 0, −1, −1, 1, 0, 1, 1, −1, 1, −1, −1, −1 | 0 to 15 |
| $\vec{A}_3$ | −1, 0, 1, −1, 1, 1, 1, 1, 1, 0, 1, 1, 1, −1, 0, −1, −1, −1, −1, −1, 1, 1, −1, 1, 1, 1, −1, −1, 1, 0, −1, 1, −1, −1, 1, −1, −1, 1, 1, −1, −1, −1, −1, −1, 1, 1, 1, −1, 1, −1, −1, 1, −1, 1, 1, 1, 1, 1, −1, 0, 1, −1, 1, 1, 1, −1, 0, −1, −1, −1, 0, 1, −1, 1, −1, −1, −1, 1, 1, 1, −1, −1, 1, −1, 1, −1, −1, −1, −1, 1, 1, 1, −1, 1, −1, −1, 1, 1, −1, 1, 1, 1, 1, 0, −1, 1, −1, 1, −1, −1, 1, 1, −1, −1, 1, 1, −1, 1, 1, −1, −1, 1, 0, −1, −1, 1, 1, −1, −1, −1, −1, −1, 1, −1, −1, 1, −1, −1, −1, 0, −1, −1, 1, 1, −1, −1, −1, −1, −1, 1, −1, −1, 1, −1, 1, −1, −1, −1, 1, 0, 1, 1, 1, 1, −1, −1, −1, 0, 0, −1, 0, −1, −1, −1, 1, −1, −1, −1, 1, 1, −1, −1 | 0 to 15 |

TABLE 28-continued

| Sequence name | Sequence | Channel number |
|---|---|---|
| $\vec{A}_4$ | 1, 0, −1, 1, −1, 1, −1, 1, −1, −1, 1, 1, 1, 0, 1, 1, 1, 0, −1, 1, −1, −1, 1, <br> 1, 1, −1, 1, 1, 1, −1, −1, 1, 1, −1, −1, −1, −1, 1, 1, 1, −1, 0, −1, −1, −1, <br> 1, −1, 1, 1, 1, −1, 1, −1, 1, 1, 1, 1, −1, 1, −1, 1, −1, −1, −1, −1, −1, <br> 1, −1, −1, 1, 1, 1, 0, −1, 1, −1, −1, 1, −1, −1, −1, 1, 0, 1, 1, −1, −1, <br> 1, 1, 1, −1, −1, −1, −1, 1, 1, 1, −1, −1, 1, −1, 1, 1, −1, 0, 1, −1, 1, 1, 1, −1, −1, <br> 1, −1, 1, −1, 1, 1, −1, −1, −1, 1, 1, −1, −1, 1, 1, 1, 1, −1, −1, −1, −1, <br> 1, −1, 1, −1, −1, 1, 1, −1, −1, −1, 1, −1, 1, −1, −1, −1, −1, 1, 1, −1, −1, <br> 1, −1, 1, −1, 1, −1, −1, −1, −1, −1, −1, 1, 1, −1, −1, 1, 1, 1, −1, −1, <br> 1, −1, −1, 1, 0, 1, 1, 1, 1, 0, −1, 1, −1, 1, −1, −1, −1, 0, 0, −1, <br> 0, −1, −1, −1, −1, −1, 1, −1, 1, −1, 1, −1, −1, −1, −1, 1, 1, 1, −1, −1, 1, −1, −1, <br> 1, 1, 1, 1, 1, 0, 1, 1, −1, −1, −1, 0, 1, −1, 1, −1, 1, 1, −1, −1, 1, 1, 1, <br> 1, 0, 1, 1, 1, −1, 0, 1, −1, 1, −1, −1, −1, 1, −1, 1, 1, 1, −1, −1, −1, −1, −1, <br> 1, −1, −1, 1, 0, −1, 1, −1, −1, 1, −1, 1, 1, −1, 1, −1, −1, 1, −1, −1, −1, <br> 1, 1, 1, 1, −1, 0, −1, −1, −1, −1, 1, 1, −1, 1, −1, −1, −1, −1, 1, 1, <br> 1, −1, −1 | 0 to 15 |
| $\vec{A}_5$ | 1, 0, −1, 1, 1, 1, −1, −1, −1, 1, −1, −1, −1, 1, 1, 1, 1, −1, 0, −1, −1, <br> 1, 0, −1, 1, 1, 1, −1, 1, 1, −1, 1, −1, −1, −1, −1, 1, −1, 1, −1, 1, −1, 1, <br> 1, 1, −1, −1, −1, −1, 1, −1, 1, −1, −1, 1, 0, 1, 1, −1, −1, 1, −1, −1, 1, 1, <br> 1, −1, 1, 1, 1, 1, 1, −1, 1, −1, 1, −1, 1, 1, 1, −1, −1, −1, 1, 1, 1, <br> 1, 1, −1, 1, 1, 1, 1, 1, −1, 1, −1, −1, 1, −1, 1, 1, 1, −1, 1, 1, −1, 1, −1, <br> 1, 1, 1, 1, 1, −1, 1, 1, −1, 1, −1, 1, 1, 1, 0, 1, 1, −1, −1, 1, −1, 1, − <br> 1, −1, 1, −1, 1, −1, −1, −1, 1, 1, 1, 1, 1, 1, 1, −1, −1, −1, 0, 1, −1, −1, <br> −1, −1, 0, −1, −1, 1, −1, 1, 1, 1, −1, 1, 1, −1, 1, −1, 1, 1, 1, −1, −1, 1, 1, <br> 1, −1, 1, 1, −1, −1, 1, 1, 1, 1, 1, −1, 0, −1, 1, −1, 1, −1, 1, −1, <br> 1, −1, −1, −1, 1, −1, 1, −1, −1, −1, −1, −1, −1, 0, 0, −1, −1, −1, −1, −1, <br> 1, −1, 1, −1, 1, 1, 1, 1, −1, −1, 1, 1, −1, 1, 1, 1, 0, 0, 1, 0, −1, 1, 1, <br> 1, −1, −1, −1, −1, 0, 1, −1, −1, 1, 0, 1, 1, −1, 1, 1, 1, 1, 1, 1, −1, −1, 1, 1, <br> 1, −1, 1, 1, −1, 1, 1, −1, −1, −1, −1, 1, 1, 1, −1, 1, −1, 1, −1, <br> 1, −1, −1, −1, −1, 1, 1, −1, 1, −1, −1, −1, 1, 1, 1, 0, −1, 1, 1, −1, −1, 1, −1, −1, −1, <br> 0, −1, −1, 1, −1, 1, 1, −1, −1, 1, 1, 1, −1, −1, 1, 1, −1, −1, 1, 0, −1, <br> 1, 1, −1, −1, −1, 1, 1, 1, −1, −1, −1, −1, 1, −1, 1, −1, 1, 1, −1, −1, 1, 0, <br> 1, 1, −1, −1, −1, 1, 0, −1, 1, 1, −1, 1, 1, 1, 0, 1, 1, −1, −1, −1, 1, −1, <br> 1, −1, −1, −1 | 0 to 15 |
| $\vec{A}_6$ | −1, 0, 1, −1, −1, −1, −1, 1, 1, −1, −1, −1, −1, 1, 1, 1, −1, 1, −1, −1, −1, −1, −1, <br> 0, −1, −1, 1, −1, 1, 1, 1, 1, 1, 1, −1, 1, −1, 1, 1, 1, 1, −1, 1, <br> 1, −1, 1, 1, −1, −1, −1, −1, 1, 0, 1, 1, −1, −1, 1, −1, −1, 1, −1, 1, −1, 1, −1, <br> 1, 1, −1, −1, 1, −1, 1, 1, −1, 1, 1, 1, −1, −1, −1, −1, 1, 1, 1, −1, 1, <br> 1, 1, −1, 0, 1, −1, −1, 1, −1, 1, −1, 1, −1, −1, 1, 1, −1, 1, 1, 1, −1, 0, <br> 1, −1, −1, 1, 1, 1, −1, −1, 1, 1, −1, 0, −1, −1, 1, 1, −1, 1, −1, 1, −1, −1, <br> 1, 1, 1, −1, −1, 1, 1, −1, −1, 1, 1, 1, −1, 1, 1, 1, −1, 1, 1, 1, −1, 0, <br> 1, −1, −1, −1, 1, −1, −1, 1, 1, −1, 0, 1, −1, −1, −1, 1, −1, 1, 1, −1, 0, <br> 1, −1, −1, −1, 0, 1, −1, −1, −1, 1, 1, 1, 0, −1, 1, 1, −1, −1, 1, 1, 1, −1, 1, −1, −1, <br> 1, −1, 1, −1, 1, 1, 1, 1, −1, −1, 1, −1, −1, 1, −1, 1, 1, 1, −1, 1, 1, 1, <br> 1, 1, −1, 0, −1, −1, 1, −1, −1, −1, −1, −1, 0, 1, −1, −1, 1, −1, 1, 1, 1, <br> 1, −1, −1, −1, 1, 1, −1, 1, 1, −1, 1, −1, 1, 1, −1, 1, 1, 1, −1, −1, −1, −1, <br> 1, −1, 1, −1, 1, −1, −1, 1, 0, 1, 1, −1, −1, −1, 1, −1, 1, 1, 1, 1, −1, <br> 1, 1, 1, −1, −1, −1, 1, −1, 1, 1, 1, −1, −1, 1, 1, 1, 1, 1, 1, −1, −1, 1, <br> 1, 1, 1, 1, 1, −1, 1, −1, −1, −1, −1, 1, 1, 1, 1, −1, 1, 1, 1, 1, −1, −1, <br> 1, 1, 1, −1, −1, −1, −1, 1, −1, −1, 1, 1, −1, −1, 1, 1, −1, 1, 1, 1, −1, <br> 1, −1, 1, 1, 1, 0, −1, 1, 1, 1, 1, 1, 1, −1, 1, 1, 1, −1, −1, 1, −1, 1, <br> 1, −1, −1, 1, 1, 1, 1, 1, 1, 1, −1, −1, −1, 1, 1, −1, 1, −1, 1, 1, −1, −1, −1, −1, <br> 1, −1, −1, −1, 0, −1, −1, 1, 0, 1, 1, −1, 1, −1, −1, −1, 1, −1, <br> 1, −1, 1, 1, 1, 1, −1, −1, −1, −1, −1, 0, −1, −1, 1, 1, 1, −1, 0, −1, 1, −1, −1, <br> 1, 1, 1, 1, −1, 1, 1, −1, 1, 1, 1, −1, −1, −1, −1, −1, 1, −1, 1, −1, <br> 1, −1, −1, 1, 1, 1, 1, −1, −1, −1, 1, −1, 1, 1, −1, −1, 1, −1, 1, −1, 1, <br> 1, 1, −1, −1, 1, 1, −1, 1, 1, −1, 1, 1, −1, −1, 1, 1, 1, 1, −1, −1, −1, 1, <br> 1, 1, 0, 0, 1, 0, −1, 1, 1, 1, 1, −1, −1, −1, −1, −1, 1, 1, −1, 0, −1, −1, <br> 1, −1, −1, −1, −1, 1, −1, −1, 1, −1, 1, 1, 1, 1, −1, 1, 1, 0, 1, 1, −1, −1 | 0 to 15 |
| $\vec{A}_7$ | 1, 0, 1, 1, −1, 1, −1, −1, 1, 1, 1, −1, 0, 1, −1, −1, −1, 1, 1, −1, −1, <br> 1, 1, 1, 1, 1, 1, 1, 1, −1, 0, −1, −1, 1, −1, 1, −1, 1, 1, 1, −1, 1, −1, 1, 1, <br> 1, 1, −1, 0, 1, −1, −1, 1, 1, −1, 1, −1, 1, 1, 1, 1, 1, −1, 1, 1, 1, −1, 1, <br> 1, −1, 1, −1, 1, 1, 1, −1, 1, −1, 1, 1, −1, 1, 1, −1, 1, −1, −1, −1, −1, 1, <br> 1, 1, 1, 0, 1, 1, −1, −1, 1, −1, 1, 1, −1, −1, 1, 1, 1, 1, −1, 1, −1, <br> 1, −1, 1, −1, 1, −1, −1, −1, 1, −1, −1, −1, 1, −1, 1, 1, −1, −1, −1, 1, <br> 1, 1, 0, 1, 1, −1, −1, 1, −1, 1, 1, −1, −1, −1, 1, 1, −1, 1, −1, 1, −1, <br> 1, −1, 1, −1, 1, −1, −1, 1, 1, 1, 1, 1, 1, −1, 1, 1, 1, 1, 1, −1, <br> 1, 1, −1, −1, 1, 1, −1, −1, −1, 1, 1, 1, −1, 1, 1, −1, 1, 1, 1, 1, −1, <br> 1, 1, −1, 1, −1, 1, −1, −1, 1, 1, 1, 1, −1, 1, −1, 1, −1, 1, −1, 1, <br> 1, 1, −1, 1, 1, −1, −1, −1, 1, 1, 1, 1, −1, 1, −1, 1, 1, −1, 1, 1, 1, <br> 1, 1, −1, −1, −1, 1, −1, −1, −1, −1, 1, 1, 1, −1, −1, 1, −1, 1, 1, 1, −1, 1, −1, −1, <br> 1, 1, 1, 1, 1, 1, −1, 1, 1, 1, 1, −1, 1, 1, 1, 1, −1, <br> 1, −1, 1, −1, −1, 1, 1, −1, 1, 1, −1, 1, 1, 0, −1, 1, 1, 1, 1, −1, −1, −1, <br> 1, −1, 1, 1, 1, −1, −1, −1, 1, 1, 1, −1, −1, −1, 1, 0, −1, 1, 1, 1, −1, <br> 1, −1, −1, −1, −1, −1, −1, 1, −1, −1, −1, −1, −1, 0, 1, −1, −1, 1, 1, −1, <br> 1, −1, 1, −1, −1, 1, 1, −1, −1, −1, 1, 1, 1, 1, 1, 0, 1, 1, −1, 1, 1, 1, −1, <br> 1, −1, 1, 1, −1, −1, 1, −1, −1, 1, 1, 1, −1, 1, 1, −1, 1, 1, 1, 1, 1, | 0 to 15 |

TABLE 28-continued

| Sequence name | Sequence | Channel number |
|---|---|---|
| | 1, 1, -1, -1, 1, 1, -1, 0, -1, -1, 1, 1, -1, -1, 1, 0, 1, 1, -1, -1, -1, 1, -1, | |
| | 1, -1, -1, 1, -1, 1, -1, 1, -1, 1, 1, -1, 1, -1, -1, -1, -1, 1, -1, -1, | |
| | 1, -1, 1, -1, -1, 1, 1, -1, 1, 1, 1, 1, -1, -1, 1, 1, 1, 1, -1, 1, -1, 1, | |
| | 1, -1, -1, -1, -1, 1, 1, 1, -1, -1, -1, -1, -1, 1, -1, 1, 1, -1, 1, 1, 1, -1, | |
| | 1, -1, -1, 1, -1, -1, -1, -1, 1, -1, 1, 1, -1, -1, 1, 1, 1, -1, -1, -1, -1, | |
| | 1, -1, 1, 1, 1, 1, 1, 1, 1, 1, 1, -1, 0, -1, -1, 1, 1, 1, 0, 0, 1, 0, -1, | |
| | 1, 1, -1, 1, -1, 1, -1, 1, -1, 1, 1, -1, 0, 1, -1, -1, -1, -1, -1, 1, 1, | |
| | 1, 1, -1, -1, -1, 1, 1, 1, 1, -1, -1, 1, 1, -1, 1, 1, 1, -1, 1, 1, 1, -1, -1, | |
| | 1, -1, 1, -1, 1, 1, -1, -1, -1, -1, -1, -1, 1, -1, -1, -1, 1, 1, 1, -1, -1, | |
| | 1, 0, -1, 1, 1, 1, 0, -1, 1, 1, 1, 1, 1, -1, -1, -1, -1, -1, -1, -1, | |
| | 1, -1, -1, -1, 1, -1, -1, -1, 1, -1, -1, 1, 0, 1, 1, -1, -1, 1, -1, 1, -1, 1, | |
| | 1, 1, -1, 1, -1, 1, -1, 1, 1, 1, -1, 1, -1, 1, 1, 1, 0, -1, 1, 1, 1, -1, -1, | |
| | 1, -1, 1, -1, 1, -1, 1, 1, -1, -1, -1, 1, 1, 1, 0, 1, 1, -1, 1, 1, 1, -1, | |
| | 1, -1, 1, 1, -1, 0, 1, -1, -1, 1, -1, -1, 1, 1, 1, -1, -1, -1, 1, 1, 1, | |
| | 1, 1, 1, -1, -1, -1, 1, 1, 1, -1, -1, 1, -1, 1, -1, -1, -1, -1, -1, 1, 1, 1, | |
| | 1, 1, 1, 1, 1, 1, -1, -1, 1, 1, -1, 1, 1, -1, 1, -1, -1, -1, -1, 0, 1, -1, -1, | |
| | 1, 1, 1, -1, -1, -1, 1, -1, -1, 1, -1, -1, 1, 1, -1, -1, -1, 1, | |
| | 1, -1, -1, -1, -1, -1, 0, -1, -1, 1, 1, 1, -1, 1, 1, 1, 1, -1, 0, 1, -1, -1, 1, -1, | |
| | 1, -1, -1, -1, -1, 1, 1, -1, 1, -1, 1, 1, -1, 1, -1, -1, -1, -1, 0, 1, -1, -1, -1, | |
| | 1, 1, -1, -1, -1, -1, -1, -1, -1, 1, 1, 1, 1, 1, -1, 1, 1, -1, -1, | |
| | 1, -1, -1, 1, 1, -1, -1, 1, 0, 1, 1, -1, 1, -1, -1, 1, -1, 1, 1, 1, 1, -1, -1, -1, -1, | |
| | 1, 1, -1, -1, -1, 1, 1, -1, -1, -1, -1, 1, 1, 1, 1, 1, -1, 1, -1, -1, -1, -1, | |
| | 1, -1, -1, -1, 1, -1, -1, -1, -1, 1, 1, 1, 0, 1, 1, -1, 1, -1, | |
| | 1, -1, 1, -1, -1, -1, 1, 1, 1, -1, -1, 1, 1, 1, -1, 1, -1, -1, -1, -1, 1, -1, | |
| | 1, 1, -1, -1, 1, -1, -1, -1, -1, -1, 1, 1, -1, 1, -1, 1, 1, -1, 1, | |
| | 1, -1, -1, -1, -1, 1, 0, 1, 1, -1, 1, 1, -1, 1, 1, 1, 0, -1, 1, 1, 1, -1, -1, 1, -1, 1, | |
| | 1, -1, 1, 1, 1, 1, -1, -1, 1, -1, 1, 1, 1, -1, 1, -1, -1, -1, 0, -1, -1 | |
| $\vec{A}_8$ | -1, 0, -1, 1, 0, 1, -1, 0, -1, -1, 0, 1, -1, 0, -1, 1, 0, -1, 1, 0, 1, -1, 0, | 0 to 15 |
| | 1, -1, 0, -1, 1, 0, 1, 1, 0, 1, 1, 0, -1, 1, 0, 0, 1, 0, -1, 1, 0, 1, -1, 0, 0, | |
| | 1, 0, -1, 1, 0, -1, -1, 0, -1, 1, 0, -1, 0, 0, 1, 0, 0, -1, 1, 0, 1, -1, 0, | |
| | 0, -1, 0, 1, 1, 0, 1, 0, 0, 1, -1, 0, 1, -1, 0, 1, 1, 0, 1, 0, 0, 0, 1, 0, 1, 1, 0, | |
| | 1, 1, 0, -1, 1, 0, -1, 1, 0, 1, -1, 0, 1, -1, 0, 1, 1, 0, 1, 1, 0, 1, 1, 0, -1, -1, | |
| | 0, 1, -1, 0, 0, 0, 0, -1, -1, 0, 0, -1, 0, 1, 0, 0, -1, 1, 0, 1, -1, 0, 0, -1, | |
| | 1, 0, -1, -1, 0, 1, -1, 0, 1, -1, 0, 1, -1, 0, -1, 0, 0, -1, -1, 0, -1, 0, -1, 1, | |
| | 0, -1, -1, 0, 1, 1, 0, -1, -1, 0, 1, 1, 0, 1, 0, 0, 1, 1, 0, 1, 0, 1, -1, 0, -1, | |
| | 0, 1, 1, 0, 1, 1, 0, -1, -1, 0, -1, 1, 0, 1, -1, 0, 1, 1, 0, -1, 1, 0, 1, 1, 0, -1, | |
| | 0, 0, 1, -1, 0, -1, 0, 0, -1, 1, 0, -1, 1, 0, 1, 1, 0, 1, 1, 0, 1, -1, 0, | |
| | 0, -1, 0, 0, 1, 0, -1, -1, 0, -1, -1, 0, 1, 1, 0, 1, -1, 0, 0, 1, 0, -1, 1, 0, | |
| | 1, 1, 0, 1, 1, 0, 0, -1, 0, 1, 1, 0, -1, -1, 0, 1, -1, 0, -1, -1, 0, 1, 1, 0, | |
| | 1, 1, 0, -1, -1, 0, -1, -1, 0, 1, 1, 0, -1, 1, 0, -1, 1, 0, 1, 1, 0, 0, 1, 0, | |
| | 1, 1, 0, -1, -1, 0, 0, 1, 0, 1, 1, 0, 1, -1, 0, 1, 1, 0, 1, 0, 0, -1, 0, 0, 1, | |
| | 1, 0, -1, -1, 0, 0, -1, 0, -1, 1, 0, -1, 0, 0, -1, 1, 0, -1, -1, 0, -1, 1, | |
| | 0, -1, 0, 0, 0, 1, 0, -1, 1, 0, -1, 1, 0, 1, 1, 0, 1, 1, 0, -1, -1, 0, -1, -1, | |
| | 0, -1, 1, 0, -1, 1, 0, -1, 1, 1, 0, 1, -1, 0, -1, -1, 0, 0, 0, 1, -1, 0, 0, -1, | |
| | 0, -1, 0, 0, 1, 1, 0, -1, -1, 0, 1, 1, 0, 1, -1, 0, -1, -1, 0, -1, -1, | |
| | 0, -1, -1, 0, 1, 0, 0, 1, -1, 0, 1, 1, 0, 1, -1, 0, -1, 1, 0, 1, -1, 0, -1, 1, 0, -1, | |
| | 0, 0, -1, 1, 0, -1, -1, 0, 1, -1, 0, -1, 1, 0, -1, 1, 0, 1, -1, 0, 1, 1, | |
| | 0, -1, -1, 0, -1, 1, 0, 1, 1, 0, -1, 1, 1, 0, 1, 0, 0, 0, -1, 0, 1, 0, 0, 1, 1, | |
| | 0, 1, 1, 0, -1, 1, 0, -1, 1, 0, -1, -1, 0, 0, -1, 0, 0, 1, 0, 1, -1, 0, 1, -1, | |
| | 0, -1, 1, 0, -1, -1, 0, 0, 1, 0, 1, 1, 0, -1, 1, 0, -1, 1, 0, 0 | |
| $\vec{A}_9$ | 1, 0, 1, 1, 0, 0, 1, -1, -1, -1, -1, 0, 0, 0, 0, 0, 0, 1, 1, 0, 1, 0, 0, 0, | 0 to 15 |
| | 0, 0, 0, -1, 0, 0, -1, 0, 1, 1, 0, 0, 0, 1, -1, -1, -1, 0, 0, 0, 1, -1, 0, 0, | |
| | 1, 0, 0, -1, 0, -1, 0, 0, 0, 0, 0, 0, 0, 1, 0, -1, 0, 0, 0, 1, 1, 0, 1, 0, 1, -1, 0, | |
| | 0, 0, 1, 0, 0, -1, 0, 0, 0, 0, 1, 0, 0, 0, 0, 1, 0, 0, -1, 0, 1, -1, 0, 0, 1, | |
| | 1, -1, 1, 0, 0, 0, 0, 1, -1, 0, 0, -1, 1, 0, 0, 0, 0, 0, 0, 0, -1, 0, 0, 1, | |
| | 0, -1, 1, 0, 0, -1, 0, -1, 1, -1, 0, 0, 0, 1, -1, 0, -1, -1, 0, 0, -1, 0, 0, | |
| | 0, 0, 0, 0, -1, 0, 0, 0, 0, 0, 1, 0, 0, 0, 1, -1, 1, 0, -1, 0, 0, 0, 0, 1, 0, -1, -1, | |
| | 1, 0, 0, 0, 1, 0, 0, 0, 0, 1, 0, 0, 1, 0, 0, -1, 0, 0, -1, 1, -1, -1, 1, 0, | |
| | 0, 0, 1, 1, 0, 1, -1, 1, 0, -1, 0, 0, 0, 0, 0, 1, 0, 0, -1, 0, 1, 1, 0, 0, 1, | |
| | 0, 1, 1, -1, 0, 0, 0, 1, 1, 0, 1, 0, -1, 0, -1, 0, 1, 0, 0, 0, 0, 0, 0, 0, 0, -1, | |
| | 1, 0, 0, 0, -1, -1, 0, 1, 0, 0, 0, -1, 0, 0, 1, 1, -1, 0, 1, 0, 0, 0, | |
| | 0, 0, -1, 0, 0, 0, 0, -1, 0, 0, 1, 1, 0, -1, -1, 0, 0, 0, 1, -1, 0, 0, -1, -1, | |
| | 0, 1, 0, -1, 0, 0, 0, 0, -1, 0, 0, -1, 0, 0, -1, 0, 0, -1, 1, -1, 1, 0, 0, | |
| | 0, 0, -1, 1, 0, -1, 1, 0, 0, 1, 0, -1, 0, 0, 0, 0, -1, 0, 0, 0, 0, -1, 0, 0, 0, | |
| | 0, -1, 1, 1, -1, 0, 0, 0, 1, 0, 0, 1, -1, 1, 0, 0, 0, -1, 0, 0, 0, 0, -1, 0, 0, -1, | |
| | 0, 0, 1, 0, 0, 0, -1, 0, -1, 1, 0, 0, 0, -1, 0, 0, 1, -1, 0, 0, -1, 0, 0, | |
| | 0, 0, 0, 0, 0, 0, 0, -1, 0, -1, 1, 0, 0, -1, 0, 0, -1, 0, 0, 0, 0, 1, 1, 0, -1, -1, | |
| | 0, 0, 1, 0, 1, 0, 0, 0, 0, -1, 0, 0, 1, 0, -1, 1, 0, 0, 0, 1, 1, 0, 0, 0, 0, | |
| | 0, -1, 1, 0, 1, 0, 1, 0, 0, 0, -1, 0, 0, 0, 0, -1, 0, 0, 1, 0, 1, 1, 0, 0, -1, | |
| | 1, 0, 1, 1, 0, 0, 0, 0, -1, 0, 1, -1, -1, 0, -1, 0, 0, 0, 0, 0, 0, 0, 1, 0, 0, 1, | |
| | 0, 1, 0, 0, 0, -1, 1, 1, 0, 0, 0, 0, 0, -1, 0, -1, 1, -1, 0, 1, 0, 0, | |
| | 0, 0, -1, 0, 0, 0, 0, 1, 1, 0, 0, 1, 1, 1, 1, 1, 0, 0, 0, -1, 0, 0, -1, 0, 1, 0, | |
| | 1, 0, -1, 0, 0, 0, 0, 1, 0, 0, -1, 0, 0, 1, 0, 0, 1, 0, -1, 1, 1, 0, 0, 0, 0, 1, | |
| | 0, 0, 0, 1, 0, -1, 0, -1, 0, 0, 0, 0, -1, 0, 0, 1, 0, -1, -1, 0, 0, 1, 1, -1, | |
| | 0, -1, 0, 0, 0, -1, 1, 0, 1, 1, 0, 0, -1, 0, 1, 0, 0, 0, 0, 0, 0, 0, 0, 1, 1, | |
| | 0, 0, 0, 1, -1, 1, -1, 0, 0, 0, -1, 1, 0, 1, 0, -1, 0, 0, 0, 1, 0, 0, 0, 0, -1, | |

TABLE 28-continued

| Sequence name | Sequence | Channel number |
|---|---|---|
| | 0, 0, -1, 0, 0, -1, 0, 0, -1, -1, 0, 1, -1, 0, 0, 0, 1, 1, 0, 1, 1, -1, 0, 1, 0, 0, 0, 0, 0, 0, 1, 0, 0, 1, 0, -1, 1, 0, 0, 1, 1, 1, -1, 0, 0, 0, 0, 1, 0, 0, 1, 1, -1, 0, 1, 0, -1, 0, 0, 0, 0, 0, 0, 1, 0, 1, 0, 0, 0, 0, -1, -1, 1, 1, 0, 0, 0, 1, 1, 0, 0, -1, -1, 0, 1, 0, -1, 0, 0, 0, 0, 0, 0, -1, 0, 1, 1, 0, 0, -1, 1, 0, -1, -1, 0, 0, 0, 0, 1, 0, 1, -1, 0, 0, 1, 0, -1, 0, 0, 0, 0, 1, 0, 0, -1, 0, -1, -1, 0, 0, 1, 0, 1, 1, 0, 0, 0, 0, -1, -1, 0, 1, -1, -1, 0, 0, 0, -1, 0, 0, 0, 0, 0, 0, 0, 0, 0, 0, -1, 0, 0, 0, 1, 1, -1, 0, 1, 0, 0, 0, 1, 1, 0, -1, 0, -1, 0, 1, 0, 0, 0, 0, 0, 1, 0, 0, 1, 0, 0, 0, 0, 0, -1, -1, -1, 1, -1, 0, 0, 0, 0, -1, 0, 1, 1, 1, 0, 1, 0, -1, 0, 0, 0, 0, 1, 0, 0, 1, 0, 1, -1, 0, 0, -1, 0, 1, -1, -1, 0, 0, 0, 1, 0, -1, -1, -1, 0, -1, 0, -1, 0, 0, 0, 0, -1, 0, 0, 1, 0, 1, 0, 0, 0, 0, 0, 1, 0, 1, 0, 0, 0, 1, 0, 0, 1, 0, 1, 0, 0, 1, 0, 1, 0, 1, 0, 0, 0, 0, -1, 0, 0, 1, 0, 1, -1, 0, 0, 1, -1, 0, 0, 1, 0, 0, 0, 1, 1, 0, 0, 1, -1, 0, -1, 0, -1, 0, 0, 0, 0, -1, 0, 0, 0, 0, 1, -1, 0, 0, 1, 0, -1, -1, 0, 0, 0, 0, -1, -1, 0, 1, -1, 0, 0, 1, 0, 1, 0, 0, 0, 0, 0, 0, 1, 0, 0, 1, 0, 0, 1, -1, -1, 0, -1, 0, 0, 0, -1, 0, 0, -1, -1, -1, 0, 0, 0, -1, 0, 0, 0, 0, 1, 0, 0 | |
| $\vec{A}_{10}$ | 1, 0, 1, 1, 0, -1, 0, 1, -1, 1, 0, 0, -1, -1, 0, 0, 0, 0, 1, -1, -1, 1, 1, 0, 1, -1, 0, -1, 1, 0, 0, -1, 0, 1, 1, 1, -1, 0, -1, -1, 1, 0, -1, -1, 0, 1, 1, 0, 0, 1, 0, 1, -1, 1, 1, -1, 0, -1, 1, 0, 0, 0, 1, 0, -1, 0, 1, -1, 0, -1, 0, -1, 0, -1, -1, -1, 1, 0, 0, -1, 0, 0, 1, 0, -1, -1, -1, -1, 1, 0, -1, 0, 0, -1, 0, 1, -1, -1, 0, 0, -1, -1, -1, 0, 1, -1, -1, 1, 1, 0, 0, -1, -1, 0, 0, -1, 0, -1, 1, 1, 1, 1, 0, 0, 1, 0, -1, 1, 1, 1, 0, 0, -1, -1, 0, 1, 0, 1, 1, 1, 0, -1, -1, 0, -1, -1, 0, 0, 1, 0, -1, -1, 1, 0, 0, 0, 0, 1, 0, -1, -1, 0, 0, 1, 0, 0, 1, -1, 1, 0, -1, 0, -1, -1, -1, -1, 0, 1, -1, 0, 0, -1, 0, -1, 0, 0, 1, 0, 0, -1, 1, 0, 0, -1, -1, 1, 0, 0, -1, 1, 1, -1, 0, 1, -1, -1, -1, -1, 1, 0, -1, 1, 0, 0, -1, 0, 0, -1, 0, 1, 1, 0, 1, 0, 0, 1, -1, 0, -1, 1, 0, 1, -1, 0, 1, 0, 1, -1, -1, 1, -1, -1, 0, 1, -1, 0, 0, 0, 0, -1, 1, 1, 1, -1, 0, 1, -1, 0, 0, 0, 1, -1, -1, -1, 1, -1, 0, 0, 0, 0, 0, -1, -1, -1, 0, -1, 0, 1, 0, 0, 1, 1, 1, 1, 0, 0, -1, 1, -1, 1, 0, 1, -1, 1, 1, -1, 1, 0, 0, -1, 0, 0, -1, 0, 1, 0, -1, -1, -1, 0, -1, -1, 0, -1, -1, 0, -1, 1, 1, 0, -1, 1, 1, 1, 0, -1, 1, -1, 1, 0, 0, 0, 0, -1, 0, 0, 1, 1, 1, -1, 0, 1, 0, -1, 1, 0, 0, 1, -1, 0, 1, 1, 0, 0, 1, 1, 1, -1, 1, 0, 0, 1, 1, 1, 1, 0, 0, 1, 0, -1, -1, 0, 1, 1, 0, 0, 0, -1, -1, 0, 1, 0, -1, 1, 0, 0, 1, 0, 1, 0, 1, -1, 1, 0, 1, 0, 0, 0, 1, 1, -1, -1, 1, 0, -1, -1, 0, -1, -1, 1, 0, 0, 0, 0, 1, 0, -1, 1, 1, 1, 1, 0, 0, 1, 0, -1, -1, -1, 0, -1, -1, 0, -1, -1, 0, -1, -1, 0, 1, 0, -1, 1, 0, 0, 1, -1, -1, 1, 0, 1, 1, -1, -1, 0, 1, 1, 0, 0, -1, 0, 0, 1, -1, 0, 0, 1, 0, 1, 0, 1, 0, 1, -1, 1, 1, 0, 1, 0, 0, 0, 1, 1, -1, -1, 1, 0, -1, -1, 1, 1, 1, 0, -1, -1, 1, 0, -1, 1, 0, 0, -1, 0, -1, -1, 0, 0, 1, 1, 1, -1, 1, 0, 1, 1, 1, 1, 0, 0, 1, 0, -1, 1, 0, -1, -1, 1, 0, 1, 0, 1, 0, -1, 1, 0, 1, 0, 1, -1, 1, 1, 0, 1, -1, 1, 1, 1, 0, 0, 1, 1, 1, 1, 1, 1, 1, 0, 1, 1, 0, 0, -1, 0, 0, 0, 1, 0, 1, 0, -1, 0, 1, -1, -1, 0, -1, 0, 1, 1, -1, 0, 0, 0, -1, 1, 1, 1, -1, 1, 1, 0, -1, -1, 0, 0, 0, 0, -1, 0, 1, 1, 1, 1, 0, 0, -1, 0, 1, 0, 1, 1, -1, 0, -1, 0, 1, -1, 0, -1, 1, -1, 1, 1, -1, 0, 1, -1, 0, 0, -1, 0, -1, -1, 1, -1, 0, 0, 1, -1, 0, -1, -1, -1, -1, 1, 1, 0, 1, -1, -1, -1, 1, -1, 1, 1, 1, 1, 1, -1, -1, 1, 0, 0, 1, 1, -1, 0, -1, -1, -1, 1, 1, 0, 1, -1, 0, -1, 1, 0, 0, 1, 0, 1, 1, 1, 1, 0, 0, 0, 0, -1, 0, -1, 1, 0, -1, -1, 0, 0, 1, 0, -1, 1, -1, 0, -1, 0, 1, -1, 1, 1, 0, -1, -1, 1, 1, -1, 0, 0, 1, 0, 0, 0, -1, 0, 0, 1, -1, 0, 0, 1, 1, 0, 1, 0, 1, 0, 1, 1, -1, 0, 1, 1, 1, -1, 0, 1, 1, -1, 0, 0, 1, 0, 1, -1, 0, 0, 0, 1, 1, 0, 1, -1, 0, -1, -1, 0, -1, -1, 1, 1, -1, 0, 1, -1, -1, 1, 0, 1, 0, 0, 1, 0, 1, 0, 1, 1, 0, 0, 1, 0, 0, -1, -1, 1, 1, 0, 0, 1, 0, -1, -1, 1, -1, -1, 0, -1, 1, 1, 1, 0, 0, 1, 0, 1, -1, 1, 0, 0, 1, 0, 0, 1, 0, 0, -1, 1, -1, 1, 1, 0, 0, 0, -1, 1, 0, 0, 1, 1, 0, -1, 1, 1, 1, 0, 0, 0, 0, 1, -1, 1, 1, 0, 0, -1, 1, 0, 0, 1, 0, -1, 1, 0, 1, -1, 0, 1, 1, 0, -1, -1, -1, -1, -1, 0, 0, 0, 0, 1, 0, 0, 1, 1, 1, 0, 1, -1, 0, 0, -1, 0, 0, -1, 0, 0, -1, -1, 1, -1, 0, -1, 1, 0, 1, 1, 1, -1, 0, 0 | 0 to 15 |

It should be noted that Table 28 further shows channel numbers of target channels respectively corresponding to the sequences $\vec{A}_1$, $\vec{A}_2$, $\vec{A}_3$, $\vec{A}_4$, $\vec{A}_5$, $\vec{A}_6$, $\vec{A}_7$, $\vec{A}_8$, $\vec{A}_9$, and $\vec{A}_{10}$. The channel numbers refer to transmission channels that may be used for each sequence. 0 to 15 in Table 28 indicate that any one of the channels 0 to 15 is an available transmission channel of the sequence.

It should be understood that the sequences in Table 28 are merely an example. The third sequence may be any sequence in Table 28, or may be equivalent deformation of any sequence in Table 28, provided that the side lobe of the periodic autocorrelation function of the third sequence is 0. This is not limited in this application.

For example, the equivalent deformation includes at least one of the following: a cyclic shift operation, a reversal operation, a negation operation, and a d-times sampling operation, where d is a positive integer. The negation operation means replacing 1 in the sequence with −1, and replacing −1 with 1. For a sequence with a length of L, the d-times sampling operation is to form an intermediate sequence by using d copies of the sequence, and extract an element at a fixed location from every d elements of the intermediate sequence to form a sequence with a length of L. For example, a 3-times sampling operation is performed on a sequence {a, b, c, d, e}. To be specific, an intermediate sequence {a, b, c, d, e, a, b, c, d, e, a, b, c, d, e} is formed by using three copies of the sequence {a, b, c, d, e}, and an element at a fixed location is extracted from every three elements of the intermediate sequence, that is, an element at a fixed location is extracted from {a, b, c}, {d, e, a}, {b, c, d}, {e, a, b}, and {c, d, e}. For example, if an element in a middle location is extracted, an obtained sequence is {b, e, c, a, d}.

In addition, Manner 1 and Manner 2 are merely examples of manners of generating the third sequence. The third sequence may alternatively be generated in another manner, provided that the side lobe of the periodic autocorrelation function of the generated third sequence is 0. A specific generation manner is not limited in this application.

Optionally, when the sequence is represented, a symbol "+" may be used to represent 1, and a symbol "−" may be used to represent −1, that is, 1 in Table 28 may be replaced with the symbol "+", and −1 may be replaced with the symbol Optionally, in this embodiment, in S310, that the transmitting end generates the PPDU includes: generating the SYNC field and the SFD field based on the basic symbol $S_i$, where the PPDU includes the SHR, and the SHR includes the SYNC field and the SFD field. The SYNC field includes K basic symbols, K is a positive integer, and the SFD field is generated based on the basic symbol S, and the preset sequence.

For example, a sequence may be first selected from Table 28, the selected sequence is denoted as $\vec{A}_i$ (an example of the third sequence), and then the SHR is constructed according to the following steps:

(1) The selected sequence $\vec{A}_i$ is extended to generate the basic symbol $S_i$ to adapt to a corresponding PRE A process of generating $S_i$ is expressed by using a mathematical formula as follows:

$$S_i = \vec{A}_i \otimes \delta_L(n)$$

⊗ represents a Kronecker product, where $$\delta_L(n) = \begin{cases} 1 & n = 0 \\ 0 & n = 1, 2, \cdots, L-1 \end{cases}.$$

(2) According to a specification in a standard, the basic symbol is repeated for a specified quantity K of times, to obtain the synchronization field SYNC. That is, SYNC={$S_i$, $S_i$, ..., $S_i$}. K is a positive integer.

(3) The SFD field is added. The SFD field may be obtained by extending the basic symbol $S_i$ by using the preset sequence. For example, the preset sequence may be {0, 1, 0, −1, 1, 0, 0, −1}, that is, SFD=$S_i$⊗{0, 1, 0, −1, 1, 0, 0, −1}.

The SHR that is finally obtained is $$SHR = [SYNC, SFD] = [S_i, S_i, \cdots, S_i, SFD].$$

It should be understood that, in step (1), when the basic symbol $S_i$ is generated based on the sequence $\vec{A}_i$, equivalent deformation may be first performed on the sequence $\vec{A}_i$ to obtain an equivalent deformation sequence of the sequence $\vec{A}_i$, and then $S_i$ is generated based on the equivalent deformation sequence. The equivalent deformation includes at least one of the following: a cyclic shift operation, a reversal operation, a negation operation, and a d-times sampling operation.

It should be further understood that the SFD may have many different designs, and step (3) is merely used as an example. This is not limited in this application.

According to the method in this embodiment of this application, all side lobes of the periodic autocorrelation function of the third sequence used to generate the basic symbol are 0, and there is an optimal periodic autocorrelation characteristic, so that the receiving end can implement synchronization based on the correlation detection result.

In addition, because the side lobe of the periodic autocorrelation function of the third sequence is 0, there is an optimal periodic autocorrelation characteristic. Using the sequence enables the receiving end to have a strong capability of resisting multipath interference, to help improve receiving performance, thereby improving system performance and coverage.

Figure 9:
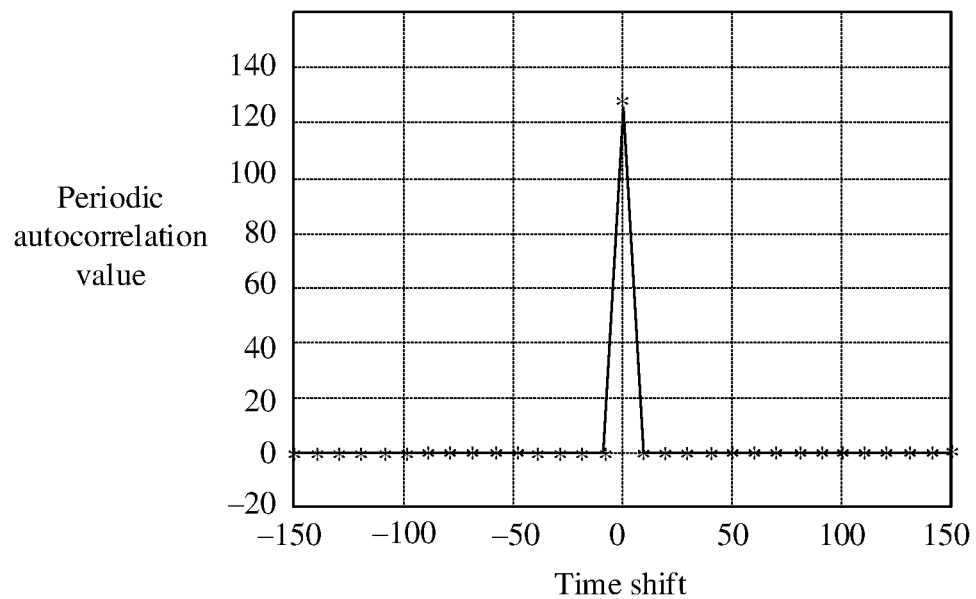
FIG. 9 shows a periodic autocorrelation function of a third sequence with a length of 133 according to an embodiment of this application.

For example, the sequence $\vec{A}_2$ in Table 28 is used as an example. If the transmitting end uses the sequence $\vec{A}_2$ to design the SHR, and the receiving end uses the same sequence to perform periodic autocorrelation, an autocorrelation output result is shown in FIG. 9. It can be learned from FIG. 9 that an autocorrelation value after a shift is 0, and a cross-correlation value without a shift is 120, which has high partition, that is, a side lobe of an autocorrelation function is a constant value 0, and there is only one peak value. Therefore, in this application, the SHR is designed by using the sequence whose side lobe of the autocorrelation function is 0, so that a good correlation characteristic can be maintained to implement synchronization between the transmitting device and the receiving device, and a capability of resisting multipath interference of the receiving end can also be enhanced to improve receiving performance.

The foregoing describes in detail the method for transmitting a physical layer protocol data unit provided in embodiments of this application with reference to FIG. 1 to FIG. 9.

An embodiment of this application provides an apparatus for transmitting a physical layer protocol data unit. In a possible implementation, the apparatus is configured to implement the steps or the procedures corresponding to the receiving end in the foregoing method embodiments. In another possible implementation, the apparatus is configured to implement the steps or the procedures corresponding to the transmitting end in the foregoing method embodiments.

Figure 10:
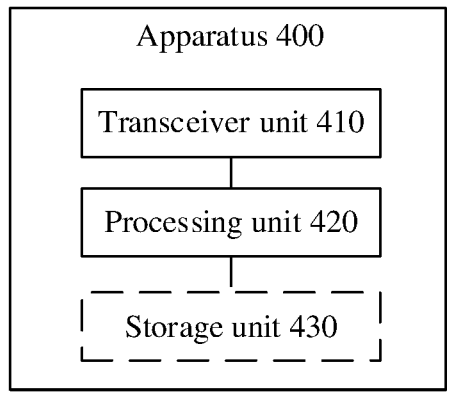
FIG. 10 is a schematic block diagram of an apparatus for transmitting a physical layer protocol data unit according to an embodiment of this application.
Figure 11:
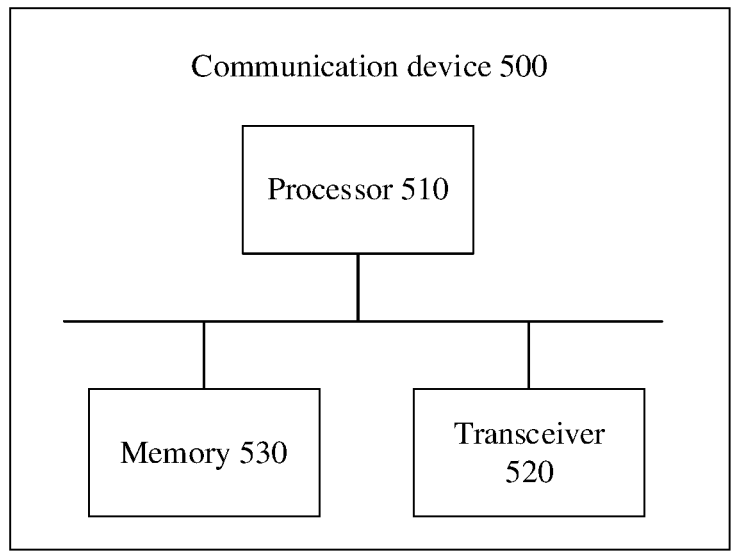
FIG. 11 is a schematic block diagram of a communication device according to an embodiment of this application.

The following describes an apparatus for transmitting a physical layer protocol data unit provided in embodiments of this application with reference to FIG. 10 and FIG. 11.

FIG. 10 is a schematic block diagram of an apparatus for transmitting a physical layer protocol data unit according to an embodiment of this application. As shown in FIG. 10, the apparatus 400 may include a transceiver unit 410 and a processing unit 420. The transceiver unit 410 may communicate with the outside, and the processing unit 420 is configured to perform data processing. The transceiver unit 410 may also be referred to as a communication interface or a communication unit.

In a possible design, the apparatus 400 may be the transmitting end device in the method embodiments, or may be a chip configured to implement a function of the transmitting end in the method embodiments. The apparatus 400 may include units configured to perform the method performed by the transmitting end in FIG. 4 or FIG. 7. In addition, the units in the apparatus 400 and the foregoing other operations and/or functions are respectively used to implement corresponding procedures of the transmitting end in FIG. 4 and FIG. 7. The processing unit 420 is configured to perform a processing-related operation of the transmitting end in the method embodiments, for example, S210 or S310. The transceiver unit 410 is configured to perform a transmitting and receiving-related operation of the transmitting end in the method embodiments, for example, S220 or S320.

It should be understood that the foregoing content is merely used an example for understanding. The apparatus 400 can further implement other steps, actions, or methods related to the transmitting end in the method embodiments. Details are not described herein.

It should be understood that a specific process in which the units perform the foregoing corresponding steps is described in detail in the method embodiments. For brevity, details are not described herein.

In another possible design, the apparatus 400 may be the receiving end device in the method embodiments, or may be a chip configured to implement a function of the receiving end in the method embodiments. The apparatus 400 may include units configured to perform the method performed by the receiving end in FIG. 4 or FIG. 7. In addition, the units in the apparatus 400 and the foregoing other operations and/or functions are respectively used to implement corresponding procedures of the receiving end in FIG. 4 and FIG. 7. The processing unit 420 is configured to perform a processing-related operation of the receiving end in the method embodiments, for example, S230 or S330. The transceiver unit 410 is configured to perform a transmitting and receiving-related operation of the receiving end in the method embodiments, for example, S220 or S320.

It should be understood that the foregoing content is merely used an example for understanding. The apparatus 400 can further implement other steps, actions, or methods related to the receiving end in the method embodiments. Details are not described herein.

It should be understood that a specific process in which the units perform the foregoing corresponding steps is described in detail in the method embodiments. For brevity, details are not described herein.

It should be further understood that the transceiver unit 410 in the apparatus 400 may correspond to a transceiver 520 in a communication device 500 shown in FIG. 11, and the processing unit 420 in the apparatus 400 may correspond to a processor 510 in the communication device 500 shown in FIG. 11.

It should be further understood that when the apparatus 400 is a chip, the chip includes a transceiver unit and a processing unit. The transceiver unit may be an input/output circuit or a communication interface. The processing unit may be a processor integrated on the chip, a microprocessor, or an integrated circuit.

Optionally, the apparatus 400 further includes a storage unit 430. The storage unit 430 is configured to store instructions.

It should be understood that the transceiver unit 410 may include a receiving unit 411 and/or a sending unit 412. The receiving unit 411 is configured to perform a receiving function in the transceiver unit 410. For example, a sending unit of the transmitting end may be configured to send a PPDU on a target channel. The sending unit 412 is configured to perform a sending function in the transceiver unit 410. For example, a receiving unit of the receiving end may be configured to receive the PPDU on the target channel.

FIG. 11 is a schematic block diagram of a communication device 500 according to an embodiment of this application. As shown in FIG. 11, the communication device 500 includes at least one processor 510 and a transceiver 520. The processor 510 is coupled to a memory, and is configured to execute instructions stored in the memory, to control the transceiver 520 to send a signal and/or receive a signal. Optionally, the communication device 500 further includes a memory 530, configured to store instructions.

It should be understood that the processor 510 and the memory 530 may be integrated into one processing apparatus. The processor 510 is configured to execute program code stored in the memory 530, to implement the foregoing functions. During specific implementation, the memory 530 may alternatively be integrated into the processor 510, or may be independent of the processor 510.

It should be further understood that the transceiver 520 may include a receiver (which is also referred to as a receiver machine) and a transmitter (which is also referred to as a transmitter machine). The transceiver 520 may further include an antenna. There may be one or more antennas. The transceiver 520 may be a communication interface or an interface circuit.

When the communication device 500 is a chip, the chip includes a transceiver unit and a processing unit. The transceiver unit may be an input/output circuit or a communication interface. The processing unit may be a processor integrated on the chip, a microprocessor, or an integrated circuit. An embodiment of this application further provides a processing apparatus, including a processor and an interface. The processor may be configured to perform the methods in the foregoing method embodiments.

It should be understood that the processing apparatus may be a chip. For example, the processing apparatus may be a field programmable gate array (FPGA), an application specific integrated chip (ASIC), a system on chip (SoC), a central processing unit (CPU), a network processor (NP), a digital signal processing circuit (DSP), a microcontroller (MCU), a programmable controller (PLD), or another integrated chip.

In an implementation process, steps in the foregoing methods may be implemented by a hardware integrated logic circuit in the processor, or by using instructions in a form of software. The steps of the method disclosed with reference to embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

An embodiment of this application further provides a computer-readable storage medium. The computer-readable storage medium stores computer instructions used to implement the method performed by the transmitting end or the receiving end in the foregoing method embodiments.

An embodiment of this application further provides a computer program product including instructions. The instructions are executed by a computer, so that the computer implements the method performed by the transmitting end or the receiving end in the foregoing method embodiments.

This application further provides a system. The system includes the transmitting end and the receiving end, for example, includes one or more FFDs and/or one or more RFDs.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer instructions are loaded and executed on a computer, all or a part of the procedures or functions according to embodiments of this application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid state disk (SSD)), or the like.

In embodiments of this application, the word "example" or "for example" is used to represent giving an example, an illustration, or a description. Any embodiment or design solution described as an "example" in this application should not be explained as being more preferred or having more advantages than another embodiment or design solution. Specifically, the term "example" is used to present a concept in a specific manner.

It should be understood that, an "embodiment" mentioned throughout this specification means that particular features, structures, or characteristics related to this embodiment are included in at least one embodiment of this application. Therefore, embodiments in the entire specification do not necessarily refer to a same embodiment. In addition, these particular features, structures, or characteristics may be combined in one or more embodiments in any appropriate manner.

It should be understood that sequence numbers of processes do not mean execution sequences in embodiments of this application. The execution sequences of the processes should be determined based on functions and internal logic of the processes, and should not be construed as any limitation on the implementation processes of embodiments of this application. Names of all nodes and messages in this application are merely names set for ease of description in this application, and may be different in an actual network. It should not be understood that names of various nodes and messages are limited in this application. On the contrary, any name that has a function that is the same as or similar to that of the node or the message used in this application is considered as a method or an equivalent replacement in this application, and falls within the protection scope of this application.

It should be further understood that, in this application, "when" and "if" mean that UE or a base station performs corresponding processing in an objective situation, but do not constitute any limitation on time, do not require the UE or the base station to perform a determining action during implementation, and do not mean other limitations either.

It should be noted that, in embodiments of this application, "presetting", "preconfiguring", or the like may be implemented by prestoring corresponding code or a table in a device (for example, a terminal device), or in another manner that may indicate related information. A specific implementation of "presetting", "preconfiguring", or the like is not limited in this application, for example, a preset rule or a preset constant in embodiments of this application.

In addition, the terms "system" and "network" in this specification may be used interchangeably in this specification. The term "and/or" in this specification describes only an association relationship between associated objects and represents that three relationships may exist. For example, A and/or B may represent the following three cases: Only A exists, both A and B exist, and only B exists.

The term "at least one of . . . " in this specification represents all or any combination of the listed items. For example, "at least one of A, B, and C" may represent the following six cases: A exists alone, B exists alone, C exists alone, A and B coexist, B and C coexist, and A, B, and C coexist. In this specification, "at least one" means one or more. "A plurality of" means two or more.

It should be understood that in embodiments of this application, "B corresponding to A" represents that B is associated with A, and B may be determined based on A. However, it should be further understood that determining B based on A does not mean that B is determined based only on A. B may alternatively be determined based on A and/or other information. The terms "include", "have", and their variants all mean "include but are not limited to", unless otherwise specifically emphasized in another manner.

It should be understood that, in various embodiments of this application, first, second, and various numbers are merely used for distinguishing for ease of description, and are not used to limit the scope of embodiments of this application. For example, different information is distinguished.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division, and may be other division during actual implementation. For example, a plurality of units or components may be combined or may be integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or a part of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for transmitting a physical layer protocol data unit (PPDU), the method which is applied to an electronic device comprising:
   generating a synchronization header field based on a first sequence, wherein a side lobe of a periodic cross-correlation function of the first sequence and a second sequence is a constant value, the first sequence is a binary sequence consisting of 1 and 0, and the second sequence is a binary phase shift keying sequence corresponding to the first sequence; and
   sending the PPDU on a target channel, wherein the PPDU comprises the synchronization header field.

2. The method according to claim 1, wherein the synchronization header field comprises a synchronization field and a start-of-frame delimiter field, the synchronization field is generated based on a basic symbol, the start-of-frame delimiter field is generated based on the basic symbol and a preset sequence, and the basic symbol is generated based on the first sequence.

3. The method according to claim 1, wherein the first sequence is an m-sequence.

4. The method according to claim 1, wherein a channel number of the target channel is any one of 0, 1, 2, 3, 5, 6, 8, 9, 10, 12, 13, and 14, and the first sequence is:
   {1, 0, 0, 0, 0, 1, 1, 0, 1, 0, 1, 0, 0, 1, 0, 0, 0, 1, 0, 1, 1, 1, 1, 1, 0, 1, 1, 0, 0, 1, 1}.

5. The method according to claim 1, wherein a channel number of the target channel is any one of 4, 7, 11, and 15, and the first sequence is:
   {1, 0, 0, 0, 1, 0, 1, 0, 1, 1, 1, 0, 1, 1, 0, 0, 0, 1, 1, 1, 1, 1, 0, 0, 1, 1, 0, 1, 0, 0}; or
   {0, 1, 0, 1, 1, 0, 1, 0, 1, 0, 0, 0, 1, 1, 1, 0, 1, 1, 1, 1, 1, 0, 0, 1, 0, 0, 1, 1, 0, 0, 0}.

6. The method according to claim 1, wherein a channel number of the target channel is any one of 1, 2, 3, 4, 5, 6, 7, 8, 9, 10, 11, 12, 13, 14, and 15, and the first sequence is any one of the following:
   {0, 1, 0, 1, 0, 1, 1, 0, 0, 1, 1, 0, 1, 1, 1, 0, 1, 1, 0, 1, 0, 0, 1, 0, 0, 1, 1, 1, 0, 0, 0, 0, 1, 0, 1, 1, 1, 1, 0, 0, 1, 0, 1, 0, 0, 0, 1, 1, 0, 0, 0, 0, 1, 0, 0, 0, 0, 0, 1, 1, 1, 1, 1, 1};
   {0, 1, 1, 0, 1, 0, 0, 0, 1, 0, 0, 0, 0, 1, 0, 1, 1, 0, 0, 1, 0, 1, 0, 1, 0, 0, 1, 0, 0, 1, 1, 1, 1, 0, 0, 0, 0, 0, 1, 1, 0, 1, 1, 1, 0, 0, 1, 1, 0, 0, 0, 1, 1, 1, 1, 0, 1, 0, 1, 1, 1, 1, 1, 1}; or
   {0, 0, 1, 0, 1, 0, 1, 0, 0, 0, 1, 1, 0, 0, 1, 1, 1, 1, 0, 1, 1, 1, 0, 1, 0, 1, 1, 0, 1, 0, 0, 1, 1, 0, 1, 0, 1, 1, 0, 0, 0, 1, 1, 0, 0, 0, 0, 0, 1, 0, 0, 1, 0, 0, 0, 1, 0, 0, 0, 0, 0, 1, 1, 1, 1, 1, 1, 1}.

7. The method according to claim 1, wherein a channel number of the target channel is any one of 0 to 15, and the first sequence is any one of the following:
   {1, 1, 1, 1, 1, 1, 1, 0, 0, 1, 0, 0, 1, 0, 0, 0, 0, 1, 1, 0, 0, 0, 0, 0, 0, 1, 0, 1, 1, 0, 1, 1, 1, 0, 0, 0, 1, 0, 1, 0, 0, 0, 0, 0, 1, 1, 1, 0, 1, 1, 0, 1, 0, 0, 1, 1, 1, 1, 0, 0, 0, 0, 0, 1, 0, 0, 1, 1, 0, 1, 1, 0, 1, 0, 0, 0, 1, 0, 0, 0, 1, 1, 0, 1, 1, 0, 1, 0, 0, 0, 1, 0, 0, 0, 1, 1, 1, 1, 1, 0, 1, 0, 1, 0, 1, 0, 1, 0, 1, 1, 1, 0, 0, 0, 0, 1, 1, 1, 1, 1, 0};
   {0, 0, 1, 0, 0, 0, 0, 1, 0, 1, 0, 0, 1, 1, 1, 1, 1, 0, 1, 0, 1, 0, 1, 0, 1, 1, 1, 0, 0, 0, 0, 0, 0, 1, 1, 0, 0, 0, 0, 1, 0, 1, 0, 1, 1, 0, 0, 1, 1, 0, 0, 1, 0, 0, 1, 0, 1, 1, 1, 1, 1, 0, 1, 1, 1, 1, 1, 0, 0, 0, 1, 1, 0, 1, 1, 1, 0, 1, 1, 0, 0, 1, 0, 1, 0, 1, 0, 0, 1, 0, 1, 0, 0, 0, 1, 1, 0, 0, 1, 1, 1, 0, 0, 0, 1, 1, 0, 1, 1, 0, 0, 0, 0, 1, 0, 0, 0, 1, 1, 1, 1, 0, 1, 0, 0, 0, 1, 1, 1, 0, 1, 0, 1, 0, 0, 0, 1, 1, 0, 1, 0, 0, 1, 1, 1, 1, 0, 0, 0, 1, 0, 0, 0, 1, 0, 1, 1, 1, 0, 1, 1, 0, 0, 0, 0, 1, 1, 1, 1, 1, 0, 1, 0, 0, 0, 0, 0, 1, 1, 0, 1, 0, 0, 1, 0, 0, 1, 1, 0, 0, 0, 1, 0, 1, 0, 1, 0, 0, 0, 1, 1, 1, 0, 1, 0, 0, 0, 0, 1, 0, 0, 0, 0, 1, 0, 0, 0, 0, 0, 0, 0, 1, 0, 0, 0, 0, 0, 0, 1, 0, 1, 1, 1, 1, 1, 1};
   {0, 1, 0, 1, 1, 0, 0, 0, 0, 0, 0, 1, 1, 1, 0, 1, 1, 0, 0, 0, 0, 0, 0, 1, 1, 0, 0, 0, 1, 1, 1, 1, 1, 1, 0, 0, 1, 0, 1, 0, 1, 1, 1, 0, 0, 0, 1, 1, 0, 0, 1, 1, 0, 0, 0, 0, 1, 1, 1, 0, 1, 1, 0, 1, 1, 0, 1, 1, 0, 0, 0, 1, 1, 0, 1, 1, 0, 1, 0, 0, 0, 1, 1, 1, 0, 1, 0, 0, 0, 0, 0, 1, 1, 0, 0, 0, 0, 1, 0, 1, 1, 0, 1, 1, 0, 0, 1, 0, 0, 1, 1, 1, 1, 0, 1, 0, 1, 1, 1, 0, 1, 1, 1, 0, 1, 0, 0, 0, 1, 0, 1, 0, 1, 0, 1, 0, 0, 1, 0, 1, 0,
0, 0, 0, 0, 0, 0, 1, 1, 0, 0, 0, 1, 0, 0, 0, 0, 0, 1, 1, 1, 1,
0, 1, 0, 1, 0, 0, 0, 1, 1, 0, 0, 1, 0, 0, 0, 0, 1, 0, 1, 1, 1,
1, 1, 0, 1, 0, 0, 1, 0, 0, 1, 0, 0, 0, 1, 0, 0, 1, 1, 0, 1, 1,
0, 1, 0, 1, 0, 1, 1, 1, 1, 0, 1, 1, 0, 0, 0, 0, 0, 0, 1, 0, 0, 1,
0, 1, 1, 1, 0, 0, 0, 1, 0, 1, 1, 0, 0, 1, 0, 1, 1, 0, 1, 0, 0, 0,
1, 1, 1, 1, 0, 0, 1, 1, 0, 0, 1, 1, 1, 0, 0, 0, 1, 1, 1, 1, 1,
1, 1};
{0, 1, 0, 1, 0, 0, 0, 0, 1, 1, 1, 0, 0, 1, 1, 1, 1, 0, 0, 0, 0, 1,
1, 0, 1, 1, 0, 0, 1, 1, 1, 0, 1, 0, 0, 0, 1, 1, 1, 1, 1, 0, 1, 1, 1,
0, 0, 0, 1, 1, 1, 0, 1, 0, 0, 0, 0, 0, 0, 0, 0, 0, 1, 1, 1, 1, 1, 0,
0, 0, 1, 0, 0, 1, 0, 1, 0, 0, 0, 1, 0, 0, 0, 1, 0, 1, 1, 0, 1,
0, 1, 0, 1, 1, 1, 0, 0, 1, 0, 0, 0, 1, 1, 0, 0, 1, 0, 0, 0, 1, 0,
0, 1, 1, 1, 0, 0, 0, 0, 0, 0, 1, 0, 0, 0, 0, 0, 1, 0, 0, 1, 1, 0,
1, 1, 1, 1, 0, 0, 1, 1, 0, 0, 1, 1, 1, 0, 1, 1, 1, 1, 1, 1, 0,
0, 1, 0, 1, 1, 0, 0, 1, 0, 1, 0, 1, 1, 0, 1, 1, 0, 1, 0, 0, 0, 1,
0, 0, 0, 0, 0, 1, 1, 0, 0, 0, 1, 1, 0, 1, 0, 1, 1, 0, 0, 0, 1,
0, 1, 0, 1, 0, 1, 0, 0, 1, 1, 0, 0, 0, 0, 0, 1, 0, 1, 1, 1, 0,
1, 0, 1, 1, 1, 1, 1, 0, 1, 1, 0, 1, 1, 1, 0, 1, 1, 0, 0, 0, 0,
1, 0, 1, 0, 0, 1, 0, 1, 1, 1, 1, 0, 1, 0, 0, 1, 1, 1, 1, 1, 1,
1, 1};
{0, 0, 1, 1, 0, 1, 1, 1, 1, 0, 1, 1, 1, 0, 1, 0, 0, 0, 0, 0, 0,
1, 0, 1, 0, 1, 1, 0, 0, 0, 1, 1, 0, 0, 1, 1, 1, 0, 0, 0, 0, 0,
0, 1, 1, 1, 1, 1, 0, 1, 0, 0, 1, 0, 1, 0, 1, 0, 0, 1, 0, 0, 0,
0, 0, 1, 0, 0, 0, 0, 1, 1, 1, 0, 1, 1, 1, 1, 1, 1, 1, 0, 1, 1, 0,
0, 0, 0, 1, 1, 0, 0, 0, 1, 1, 0, 1, 0, 0, 0, 0, 0, 0, 1, 1, 0,
1, 0, 0, 0, 1, 0, 1, 0, 0, 1, 1, 0, 1, 0, 1, 0, 0, 0, 0, 1, 0,
1, 1, 1, 0, 0, 1, 1, 1, 1, 1, 0, 1, 0, 1, 1, 1, 1, 1, 0, 0, 0, 1,
1, 1, 0, 0, 1, 0, 1, 0, 0, 0, 0, 1, 1, 1, 1, 0, 0, 0, 0, 1, 0, 0,
1, 0, 0, 1, 0, 1, 1, 1, 1, 0, 0, 1, 0, 0, 0, 1, 0, 0, 0, 1, 1,
0, 1, 1, 0, 1, 1, 1, 0, 0, 0, 0, 1, 0, 1, 1, 0, 0, 1, 1, 0, 0, 1,
0, 1, 1, 0, 1, 1, 0, 0, 0, 1, 0, 0, 1, 1, 1, 0, 1, 0, 1, 0, 1, 0,
1, 1, 1, 0, 1, 1, 0, 1, 0, 1, 1, 0, 1, 0, 0, 0, 1, 1, 1, 1, 1, 1,
1, 1};
{0, 0, 0, 1, 1, 0, 0, 0, 1, 0, 1, 0, 1, 0, 1, 0, 0, 0, 0, 1, 0, 0,
0, 0, 1, 1, 0, 0, 1, 1, 0, 0, 0, 0, 0, 1, 1, 1, 1, 1, 0, 1, 1,
1, 0, 1, 1, 1, 1, 1, 1, 0, 1, 0, 1, 0, 0, 0, 1, 0, 1, 1, 0, 1, 0,
1, 0, 1, 1, 0, 0, 1, 1, 0, 0, 1, 0, 0, 1, 1, 0, 0, 1, 0, 0, 0,
0, 1, 0, 1, 1, 1, 0, 0, 0, 1, 0, 0, 0, 1, 1, 1, 1, 0, 0, 1, 0,
1, 1, 1, 0, 0, 0, 0, 1, 0, 1, 0, 0, 0, 1, 1, 0, 1, 0, 1, 0, 1, 1,
1, 1, 0, 0, 1, 1, 1, 1, 0, 1, 1, 0, 0, 1, 0, 1, 0, 1, 0, 1, 1, 1,
0, 1, 0, 1, 1, 0, 1, 1, 1, 0, 0, 1, 1, 0, 1, 0, 0, 1, 1, 0, 1,
1, 0, 1, 0, 0, 0, 0, 1, 0, 0, 1, 1, 1, 0, 1, 1, 0, 1, 1, 0, 0, 0, 0,
0, 1, 1, 1, 0, 1, 0, 0, 1, 0, 0, 1, 0, 0, 0, 0, 0, 1, 0, 1, 1,
0, 0, 0, 1, 1, 1, 0, 0, 0, 0, 0, 0, 1, 1, 0, 1, 1, 1, 1, 1, 0, 1,
0, 0, 0, 0, 0, 0, 0, 1, 0, 0, 1, 0, 1, 0, 0, 1, 1, 1, 1, 1, 1,
1, 1};
{0, 1, 0, 1, 0, 1, 1, 1, 0, 0, 0, 1, 1, 1, 0, 0, 1, 0, 0, 1, 1, 0, 1,
0, 1, 0, 0, 0, 0, 1, 1, 0, 1, 1, 1, 0, 0, 0, 0, 0, 0, 1, 1, 0, 0, 0,
0, 0, 1, 1, 1, 0, 0, 0, 1, 1, 0, 0, 1, 1, 0, 0, 0, 1, 0, 0, 0, 0,
1, 1, 0, 1, 0, 0, 1, 1, 1, 1, 1, 0, 1, 0, 0, 1, 0, 0, 0, 1, 0, 1,
0, 1, 1, 0, 1, 1, 0, 0, 0, 0, 0, 0, 1, 1, 1, 1, 1, 1, 0, 0,
1, 0, 1, 0, 0, 1, 0, 1, 1, 0, 1, 0, 1, 1, 1, 1, 0, 0, 0, 1,
0, 1, 1, 0, 0, 1, 0, 0, 0, 0, 1, 0, 1, 0, 0, 0, 1, 0, 0, 1, 0,
0, 1, 0, 1, 0, 1, 0, 1, 0, 0, 1, 1, 0, 0, 1, 0, 1, 1, 1, 0, 1,
0, 0, 0, 1, 1, 1, 0, 1, 1, 0, 0, 1, 1, 1, 1, 1, 0, 1, 1, 0, 1,
0, 0, 0, 0, 0, 0, 1, 0, 0, 0, 0, 0, 1, 0, 1, 1, 1, 1, 0, 1, 1,
1, 0, 1, 1, 1, 1, 0, 0, 0, 0, 1, 0, 0, 1, 1, 1, 0, 1, 0, 1, 1,
0, 0, 0, 1, 1, 1, 1, 0, 0, 1, 1, 0, 1, 1, 0, 1, 1, 1, 1, 1, 1,
1, 1}; or
{0, 1, 1, 0, 1, 0, 0, 1, 1, 0, 0, 0, 0, 1, 0, 1, 0, 1, 0, 0, 0,
0, 0, 0, 1, 0, 1, 1, 0, 0, 1, 1, 1, 0, 1, 1, 0, 0, 1, 0, 0, 0,
0, 0, 1, 0, 0, 0, 0, 1, 0, 0, 1, 1, 1, 1, 1, 0, 1, 0, 1, 1, 1,
1, 0, 1, 0, 0, 0, 1, 0, 1, 0, 0, 1, 0, 1, 1, 1, 0, 0, 0, 1, 0,
0, 0, 0, 1, 0, 1, 0, 1, 0, 1, 0, 0, 0, 1, 1, 0, 0, 1, 0, 1,
1, 0, 1, 0, 1, 0, 1, 0, 1, 1, 0, 1, 1, 0, 0, 0, 0, 1, 0, 1, 1,
1, 1, 0, 0, 1, 1, 0, 0, 0, 0, 0, 0, 0, 1, 1, 0, 1, 1, 1, 0, 1, 0, 0, 1, 0, 0, 0, 1, 1, 1, 1, 1, 1, 0, 0, 0, 0, 0, 1, 1, 1, 0,
1, 0, 1, 0, 0, 1, 1, 0, 1, 0, 1, 1, 0, 0, 0, 0, 1, 1, 0, 0, 0,
1, 1, 0, 1, 0, 0, 0, 0, 1, 1, 1, 1, 0, 0, 0, 1, 1, 1, 1, 0, 0, 1,
1, 1, 1, 0, 1, 1, 1, 0, 0, 1, 0, 0, 1, 1, 0, 0, 1, 1, 0, 1, 1,
0, 1, 1, 1, 1, 0, 0, 1, 0, 1, 0, 1, 1, 1, 0, 1, 1, 1, 1, 1, 1,
1, 1}.

8. A method for receiving a physical layer protocol data unit (PPDU), the method which is applied to an electronic device comprising:
receiving the PPDU on a target channel, wherein the PPDU comprises a synchronization header field; and
performing correlation detection on the synchronization header field based on a first sequence, wherein a side lobe of a periodic cross-correlation function of the first sequence and a second sequence is a constant value, the first sequence is a binary sequence consisting of 1 and 0, and the second sequence is a binary phase shift keying sequence corresponding to the first sequence.

9. The method according to claim 8, wherein the synchronization header field comprises a synchronization field and a start-of-frame delimiter field, the synchronization field is generated based on a basic symbol, the start-of-frame delimiter field is generated based on the basic symbol and a preset sequence, and the basic symbol is generated based on the first sequence.

10. The method according to claim 8, wherein the first sequence is an m-sequence.

11. The method according to claim 8, wherein a channel number of the target channel is any one of 0, 1, 2, 3, 5, 6, 8, 9, 10, 12, 13, and 14, and the first sequence is:
{1, 0, 0, 0, 0, 1, 1, 0, 1, 0, 1, 0, 0, 1, 0, 0, 0, 1, 0, 1, 1, 1, 1, 1, 0, 1, 1, 0, 0, 1, 1}.

12. The method according to claim 8, wherein a channel number of the target channel is any one of 4, 7, 11, and 15, and the first sequence is:
{1, 0, 0, 0, 0, 1, 0, 1, 0, 1, 1, 1, 0, 1, 1, 0, 0, 0, 1, 1, 1, 1, 1, 0, 0, 1, 1, 0, 1, 0, 0}; or
{0, 1, 0, 1, 1, 0, 1, 0, 1, 0, 0, 0, 0, 1, 1, 1, 0, 1, 1, 1, 1, 1, 0, 0, 1, 0, 0, 1, 1, 0, 0, 0, 0}.

13. The method according to claim 8, wherein a channel number of the target channel is any one of 1, 2, 3, 4, 5, 6, 7, 8, 9, 10, 11, 12, 13, 14, and 15, and the first sequence is any one of the following:
{0, 1, 0, 1, 0, 1, 1, 0, 0, 1, 1, 0, 1, 1, 1, 0, 1, 1, 0, 1, 0, 0, 1, 0, 0, 1, 1, 1, 0, 0, 0, 1, 0, 1, 1, 1, 1, 1, 0, 0, 1, 0, 1, 0, 0, 0, 1, 1, 0, 0, 0, 0, 1, 0, 0, 0, 0, 0, 0, 1, 1, 1, 1, 1};
{0, 1, 1, 0, 1, 0, 0, 0, 1, 0, 0, 0, 0, 1, 0, 1, 1, 0, 0, 1, 0, 1, 1, 0, 1, 0, 0, 0, 1, 1, 1, 1, 0, 1, 1, 0, 0, 0, 0, 0, 1, 1, 0, 1, 1, 1, 0, 0, 1, 1, 0, 0, 1, 1, 1, 0, 1, 0, 1, 1, 1, 1, 1, 1, 1}; or
{0, 0, 1, 0, 1, 0, 1, 0, 0, 0, 1, 1, 0, 0, 1, 1, 1, 1, 0, 1, 1, 1, 0, 1, 0, 1, 1, 0, 0, 1, 1, 0, 1, 1, 0, 0, 0, 0, 1, 0, 0, 1, 0, 0, 0, 0, 1, 1, 1, 0, 0, 0, 0, 0, 1, 0, 1, 1, 1, 1, 1, 1}.

14. The method according to claim 8, wherein a channel number of the target channel is any one of 0 to 15, and the first sequence is any one of the following:
{1, 1, 1, 1, 1, 1, 0, 0, 1, 0, 0, 1, 0, 0, 0, 0, 1, 1, 0, 0, 0,
0, 0, 0, 1, 0, 1, 1, 0, 1, 1, 0, 0, 0, 1, 0, 1, 0, 0, 0, 0, 0,
1, 1, 1, 0, 1, 1, 0, 1, 0, 0, 1, 1, 1, 1, 0, 0, 0, 0, 1, 0, 0,
1, 1, 0, 1, 1, 1, 0, 1, 0, 0, 0, 1, 0, 0, 0, 1, 1, 0, 1, 0, 1,
1, 0, 0, 1, 1, 1, 0, 0, 1, 1, 0, 0, 1, 0, 1, 1, 1, 1, 1, 0, 1, 0,
1, 0, 0, 1, 0, 1, 0, 1, 0, 1, 1, 1, 0, 0, 0, 1, 1, 1, 1, 1, 0};
{0, 0, 1, 0, 0, 0, 0, 1, 0, 1, 0, 0, 1, 1, 1, 1, 1, 0, 1, 0, 1, 0,
1, 0, 1, 1, 1, 0, 0, 0, 0, 0, 1, 1, 0, 0, 0, 1, 0, 1, 0, 1, 1,
0, 0, 1, 1, 0, 0, 1, 0, 1, 1, 1, 1, 1, 1, 0, 1, 1, 1, 1, 1, 0, 0,
1, 1, 0, 1, 1, 1, 0, 1, 1, 0, 0, 1, 0, 1, 0, 1, 0, 0, 0, 1, 0,
1, 0, 0, 0, 1, 0, 0, 1, 0, 1, 1, 0, 1, 0, 0, 0, 1, 1, 0, 0, 0, 1,
1, 1, 0, 0, 1, 1, 1, 0, 1, 1, 0, 0, 0, 0, 0, 1, 0, 0, 0, 1, 0, 1, 1, 1, 0, 1, 0, 1, 1, 1, 1, 0, 1, 1, 0, 1, 1,
1, 1, 1, 0, 0, 0, 0, 1, 1, 0, 1, 0, 0, 1, 1, 0, 1, 0, 1, 1, 0,
1, 1, 0, 1, 0, 1, 0, 0, 0, 0, 1, 0, 0, 1, 1, 1, 0, 1, 1, 0,
0, 1, 0, 0, 1, 0, 0, 1, 1, 0, 0, 0, 0, 0, 1, 1, 1, 0, 1, 0,
0, 1, 0, 0, 0, 1, 1, 0, 0, 1, 0, 0, 0, 0, 0, 0, 1, 0,
1, 1, 0, 0, 1, 1, 1, 1, 0, 1, 0, 0, 0, 0, 1, 1, 1, 1, 1,
1, 1};
{0, 1, 0, 0, 1, 0, 0, 0, 0, 0, 0, 1, 1, 1, 0, 1, 1, 0, 0, 0, 0,
0, 0, 1, 0, 0, 1, 1, 0, 1, 0, 0, 0, 0, 0, 1, 1, 0, 1, 0, 1, 1,
1, 0, 0, 0, 0, 1, 0, 1, 1, 1, 1, 0, 0, 1, 0, 0, 0, 1, 1, 1, 1, 0,
0, 0, 1, 0, 1, 1, 0, 0, 1, 0, 0, 1, 0, 0, 1, 1, 1, 0, 1, 0, 1,
1, 0, 1, 1, 0, 1, 0, 0, 1, 1, 1, 1, 0, 1, 1, 0, 1, 1, 1, 0, 1,
0, 0, 0, 1, 1, 0, 1, 1, 0, 0, 1, 1, 1, 0, 0, 1, 0, 1, 1, 0, 1,
0, 1, 0, 0, 1, 0, 1, 1, 1, 0, 1, 1, 1, 1, 1, 0, 1, 1, 1, 0, 0,
1, 1, 0, 0, 0, 0, 1, 1, 0, 0, 1, 0, 1, 0, 1, 0, 0, 0, 1, 0, 1,
0, 1, 1, 1, 1, 1, 1, 0, 0, 1, 1, 1, 1, 0, 0, 0, 0, 0, 1, 0,
1, 0, 0, 0, 0, 1, 0, 0, 0, 0, 1, 1, 1, 1, 0, 0, 0, 1, 1, 0, 0,
0, 1, 0, 0, 0, 1, 0, 0, 1, 0, 1, 0, 0, 1, 1, 0, 0, 1, 1, 0, 1,
1, 1, 1, 0, 1, 0, 1, 0, 1, 0, 1, 1, 0, 0, 0, 1, 1, 1, 1, 1, 1,
1, 1};
{0, 1, 1, 1, 1, 0, 0, 0, 0, 0, 0, 1, 0, 1, 0, 0, 1, 1, 0, 0, 0, 0,
1, 0, 0, 0, 1, 1, 1, 1, 1, 0, 0, 1, 0, 1, 0, 1, 1, 0, 0, 0, 1,
1, 1, 0, 0, 0, 0, 1, 1, 1, 0, 1, 1, 0, 1, 1, 0, 0, 1, 1, 0, 1,
0, 1, 1, 0, 1, 1, 1, 1, 1, 0, 0, 0, 1, 1, 0, 1, 0, 0, 0, 0,
1, 1, 0, 1, 1, 1, 0, 0, 1, 0, 0, 1, 1, 1, 1, 0, 1, 0, 1, 1, 1, 0,
1, 1, 1, 0, 1, 0, 0, 0, 1, 0, 1, 0, 1, 0, 0, 1, 0, 1, 0,
0, 0, 0, 0, 0, 1, 1, 0, 0, 0, 1, 0, 0, 0, 0, 0, 1, 1, 1, 1,
0, 1, 0, 1, 0, 0, 0, 1, 1, 0, 0, 1, 0, 0, 0, 0, 1, 0, 1, 1, 1,
1, 1, 0, 1, 0, 0, 1, 0, 0, 0, 1, 0, 0, 0, 1, 0, 0, 1, 1, 0, 1, 1,
0, 1, 0, 1, 0, 1, 1, 1, 1, 0, 1, 1, 0, 0, 0, 0, 0, 1, 0, 0, 1,
0, 1, 1, 0, 0, 0, 1, 0, 1, 1, 0, 0, 1, 0, 1, 1, 0, 1, 0, 0, 0,
1, 1, 1, 1, 0, 0, 1, 1, 0, 0, 1, 1, 1, 0, 0, 1, 1, 1, 1, 1, 1,
1, 1};
{0, 1, 0, 1, 0, 0, 0, 0, 1, 1, 1, 0, 0, 1, 1, 1, 1, 0, 0, 0, 0, 1,
1, 0, 1, 1, 0, 0, 1, 1, 0, 1, 0, 0, 0, 1, 1, 1, 1, 0, 1, 1, 1,
0, 0, 0, 1, 1, 1, 0, 1, 0, 0, 0, 0, 0, 0, 1, 1, 1, 1, 1, 0,
0, 0, 1, 0, 0, 1, 0, 1, 1, 0, 0, 0, 1, 0, 0, 0, 1, 0, 1, 1, 0, 1,
0, 1, 0, 1, 1, 0, 0, 1, 0, 0, 0, 1, 1, 0, 0, 1, 0, 0, 1, 0,
0, 1, 1, 1, 0, 0, 0, 0, 0, 1, 0, 0, 0, 0, 1, 0, 0, 1, 1, 0,
1, 1, 1, 1, 0, 0, 1, 1, 0, 0, 1, 1, 1, 0, 1, 1, 1, 1, 1, 1, 0,
0, 1, 0, 1, 1, 0, 0, 1, 0, 1, 0, 1, 1, 0, 1, 1, 0, 1, 0, 0, 1,
0, 0, 0, 0, 0, 1, 1, 0, 0, 0, 1, 1, 0, 1, 0, 1, 1, 0, 0, 0, 1,
0, 1, 0, 1, 0, 1, 0, 0, 1, 1, 0, 0, 0, 0, 0, 1, 0, 1, 1, 1, 0,
1, 0, 1, 1, 1, 1, 1, 0, 1, 1, 0, 1, 1, 1, 0, 1, 1, 0, 0, 0, 0,
1, 0, 1, 0, 0, 1, 0, 1, 1, 1, 1, 0, 1, 0, 0, 1, 1, 1, 1, 1, 1,
1, 1};
{0, 0, 1, 1, 0, 1, 1, 1, 1, 0, 1, 1, 1, 0, 1, 0, 0, 0, 0, 0, 0,
0, 1, 1, 0, 1, 1, 0, 0, 0, 1, 1, 0, 0, 1, 1, 1, 0, 0, 0, 0, 0,
0, 1, 1, 1, 1, 1, 0, 1, 0, 0, 1, 0, 1, 0, 1, 0, 0, 1, 0, 0, 0,
0, 0, 1, 0, 0, 0, 0, 1, 1, 1, 0, 1, 1, 1, 1, 1, 1, 0, 1, 1, 0, 0, 0, 0, 1, 1, 0, 0, 0, 1, 0, 0, 1, 1, 0, 0, 0, 0, 0, 1, 1, 0,
1, 0, 0, 0, 1, 0, 1, 0, 0, 1, 1, 0, 1, 0, 1, 0, 0, 0, 0, 1, 0,
1, 1, 1, 0, 0, 1, 1, 1, 1, 0, 1, 0, 1, 1, 1, 1, 1, 0, 0, 0, 1,
1, 1, 0, 0, 1, 0, 1, 0, 0, 0, 1, 1, 1, 0, 0, 0, 0, 1, 0, 0,
1, 0, 0, 1, 0, 1, 1, 1, 1, 0, 0, 1, 0, 0, 0, 1, 0, 0, 0, 1, 1,
0, 1, 1, 0, 1, 1, 1, 0, 0, 0, 1, 0, 1, 1, 0, 0, 1, 1, 0, 0, 1,
0, 1, 1, 0, 1, 1, 0, 0, 1, 0, 0, 1, 1, 1, 0, 1, 0, 1, 0, 1, 0,
1, 1, 1, 0, 1, 1, 0, 1, 0, 1, 1, 0, 1, 0, 0, 1, 1, 1, 1, 1, 1,
1, 1};
{0, 0, 0, 1, 1, 0, 0, 0, 1, 0, 1, 0, 1, 0, 0, 0, 0, 1, 0, 0,
0, 0, 1, 1, 0, 0, 1, 1, 0, 0, 0, 0, 0, 1, 1, 1, 1, 1, 0, 1, 1,
1, 0, 1, 1, 1, 1, 1, 1, 0, 1, 0, 1, 0, 0, 1, 0, 1, 1, 0, 1, 0,
1, 0, 1, 1, 0, 0, 1, 1, 1, 0, 0, 1, 0, 0, 1, 1, 0, 0, 1, 0, 0,
0, 1, 0, 1, 1, 0, 0, 0, 1, 0, 0, 0, 1, 1, 1, 1, 0, 0, 1, 0,
1, 1, 1, 0, 0, 0, 0, 1, 0, 1, 0, 0, 0, 1, 1, 0, 1, 0, 1, 1,
1, 1, 1, 0, 0, 1, 1, 1, 1, 0, 1, 1, 0, 0, 1, 0, 1, 0, 1, 1, 1,
0, 1, 0, 1, 1, 0, 1, 1, 1, 0, 1, 0, 0, 0, 1, 1, 0, 1, 0, 1,
1, 0, 1, 0, 0, 0, 1, 0, 0, 1, 1, 1, 0, 1, 0, 1, 0, 1, 1, 0, 0,
0, 0, 1, 1, 1, 0, 1, 0, 0, 1, 0, 0, 1, 0, 0, 0, 0, 0, 1, 0, 1, 1,
0, 0, 0, 1, 1, 1, 0, 0, 0, 0, 0, 1, 1, 0, 1, 1, 1, 1, 0, 1,
0, 0, 0, 0, 0, 0, 1, 0, 0, 1, 0, 1, 0, 0, 1, 1, 1, 1, 1, 1,
1, 1};
{0, 1, 0, 1, 0, 1, 1, 1, 0, 0, 1, 1, 1, 0, 0, 1, 0, 0, 1, 1, 0, 1,
0, 1, 0, 0, 0, 0, 1, 1, 0, 1, 0, 1, 1, 1, 0, 0, 0, 0, 0, 1, 1, 0, 0,
0, 0, 1, 1, 1, 0, 0, 0, 1, 1, 0, 0, 1, 1, 0, 0, 0, 1, 0, 0, 0,
1, 1, 0, 1, 0, 0, 1, 1, 1, 1, 0, 1, 0, 0, 1, 0, 0, 0, 0, 1, 0, 1,
0, 1, 1, 0, 1, 1, 0, 0, 0, 0, 0, 0, 1, 1, 1, 1, 1, 1, 0, 0,
1, 0, 1, 0, 0, 1, 0, 1, 1, 0, 1, 0, 1, 1, 1, 1, 1, 0, 0, 0, 1,
0, 1, 1, 0, 0, 1, 0, 0, 0, 0, 0, 1, 0, 1, 0, 0, 0, 0, 1, 0, 0, 1, 0,
0, 1, 0, 1, 0, 1, 0, 0, 1, 1, 0, 0, 1, 0, 1, 1, 1, 1, 0, 1,
0, 0, 0, 1, 1, 1, 0, 1, 1, 0, 0, 1, 1, 1, 1, 1, 0, 1, 1, 0, 1,
0, 0, 0, 0, 0, 0, 1, 0, 0, 0, 0, 0, 1, 0, 1, 1, 1, 1, 0, 1, 1,
1, 0, 1, 1, 1, 0, 0, 0, 0, 1, 0, 0, 1, 1, 1, 0, 1, 0, 1, 1,
0, 0, 0, 1, 1, 1, 1, 0, 0, 1, 1, 0, 1, 1, 0, 1, 1, 1, 1, 1, 1,
1, 1}; or
{0, 1, 1, 0, 1, 0, 0, 0, 1, 1, 0, 0, 0, 0, 1, 0, 1, 0, 1, 0, 0, 0, 0,
0, 0, 0, 1, 0, 1, 1, 0, 0, 1, 1, 1, 1, 0, 0, 1, 0, 0, 0, 0,
0, 0, 0, 1, 0, 0, 0, 0, 1, 0, 0, 1, 1, 1, 1, 1, 0, 1, 0, 1, 1, 1,
1, 0, 1, 0, 0, 0, 1, 0, 1, 0, 0, 1, 0, 1, 1, 1, 0, 0, 0, 1, 0,
0, 0, 1, 0, 0, 1, 0, 0, 1, 0, 1, 0, 0, 0, 1, 1, 0, 0, 1, 0, 1,
1, 0, 1, 0, 1, 0, 1, 0, 1, 1, 0, 1, 1, 0, 0, 0, 1, 0, 1, 1, 1,
1, 1, 0, 0, 1, 1, 0, 0, 0, 0, 0, 0, 1, 1, 0, 1, 1, 1, 0, 1,
0, 0, 1, 0, 0, 0, 1, 1, 1, 1, 1, 1, 0, 0, 0, 0, 0, 1, 1, 1, 0,
1, 0, 1, 0, 0, 1, 1, 0, 1, 0, 1, 1, 0, 0, 0, 0, 1, 1, 0, 0, 0,
1, 1, 0, 1, 0, 0, 0, 0, 1, 1, 1, 1, 0, 0, 0, 1, 1, 1, 0, 0, 1,
1, 1, 1, 0, 1, 1, 1, 0, 0, 1, 0, 0, 1, 1, 0, 0, 1, 1, 0, 1, 1,
0, 1, 1, 1, 1, 0, 0, 1, 0, 1, 0, 1, 1, 1, 0, 1, 1, 1, 1, 1, 1,
1, 1}.

* * * * *